US008412618B2

(12) United States Patent
Robertson et al.

(10) Patent No.: US 8,412,618 B2
(45) Date of Patent: Apr. 2, 2013

(54) SYSTEM FOR MANAGING CONSTRUCTION PROJECT BIDDING

(75) Inventors: Dave Robertson, Vancouver (CA); Sharandeep Sekhon, Burnaby (CA); Baohua Gu, Coquitlam (CA); Dariusz Czarkowski, Surrey (CA)

(73) Assignee: Infinite Source Systems Corporation, Vancouver, BC (CA)

( * ) Notice: Subject to any disclaimer, the term of this patent is extended or adjusted under 35 U.S.C. 154(b) by 0 days.

(21) Appl. No.: 13/210,881

(22) Filed: Aug. 16, 2011

(65) Prior Publication Data

US 2013/0046672 A1 Feb. 21, 2013

(51) Int. Cl.

| | |
|---|---|
| ***G06Q 30/06*** | (2012.01) |
| ***G06Q 20/02*** | (2012.01) |
| ***G06Q 40/04*** | (2012.01) |
| ***G06Q 40/06*** | (2012.01) |
| ***G06Q 40/02*** | (2012.01) |
| ***G06Q 50/16*** | (2012.01) |

(52) U.S. Cl. ............................. 705/37; 705/80; 705/313

(58) Field of Classification Search ........................ None
See application file for complete search history.

(56) References Cited

U.S. PATENT DOCUMENTS

| | | | | |
|---|---|---|---|---|
| 5,243,515 | A * | 9/1993 | Lee | 705/37 |
| 6,393,410 | B1 * | 5/2002 | Thompson | 705/37 |
| 6,446,053 | B1 * | 9/2002 | Elliott | 705/400 |
| 7,460,653 | B2 * | 12/2008 | Brahm et al. | 379/88.19 |
| 7,644,007 | B2 * | 1/2010 | Elazouni | 705/7.26 |
| 7,797,210 | B2 * | 9/2010 | Eichhorn et al. | 705/35 |
| 8,195,523 | B1 * | 6/2012 | Lark et al. | 705/26.3 |
| 8,346,582 | B1 * | 1/2013 | Davis et al. | 705/7.11 |
| 2001/0056355 | A1 * | 12/2001 | Moriyama et al. | 705/1 |
| 2002/0013704 | A1 * | 1/2002 | Finney | 704/246 |
| 2002/0032665 | A1 * | 3/2002 | Creighton et al. | 705/76 |
| 2002/0049642 | A1 * | 4/2002 | Moderegger et al. | 705/26 |
| 2002/0059128 | A1 * | 5/2002 | Pesch | 705/37 |
| 2002/0138847 | A1 * | 9/2002 | Abrams et al. | 725/105 |
| 2002/0147674 | A1 * | 10/2002 | Gillman | 705/37 |
| 2002/0156668 | A1 * | 10/2002 | Morrow et al. | 705/8 |
| 2002/0165723 | A1 * | 11/2002 | Kroeger | 705/1 |
| 2003/0101127 | A1 * | 5/2003 | Cornelius | 705/37 |
| 2003/0105726 | A1 * | 6/2003 | Itoh et al. | 705/80 |
| 2003/0130948 | A1 * | 7/2003 | Algiene et al. | 705/44 |
| 2003/0225683 | A1 * | 12/2003 | Hill et al. | 705/37 |
| 2004/0039681 | A1 * | 2/2004 | Cullen et al. | 705/37 |
| 2004/0093583 | A1 * | 5/2004 | McAnaney et al. | 717/103 |
| 2004/0205014 | A1 * | 10/2004 | Kaltner | 705/37 |

(Continued)

OTHER PUBLICATIONS

Legal Framework of Overseas Contracting Services Sector; International Journal of Business and Social Science vol. 2 No. 12; Jul. 2011; 16-pages.*

(Continued)

*Primary Examiner* — Gregory Johnson
(74) *Attorney, Agent, or Firm* — Knobbe Martens Olson & Bear LLP

(57) ABSTRACT

A system is disclosed that facilitates construction project bidding over a computer network. In one aspect, a construction project supervisor system may verify one or more aspects of bidder information before bidding. A bidder may submit payment information, an electronic mail address, and a telephone number to be verified. Verification may include utilizing the payment information to process a payment, and/or sending a verification code to the electronic mail address and/or telephone number. In one embodiment, the issuance of a bid bond associated with the prospective bid may be required to complete the verification process.

27 Claims, 28 Drawing Sheets

U.S. PATENT DOCUMENTS

| | | | | |
|---|---|---|---|---|
| 2004/0210490 | A1* | 10/2004 | Almstead et al. | 705/26 |
| 2005/0039115 | A1* | 2/2005 | Gordon et al. | 715/505 |
| 2005/0108232 | A1* | 5/2005 | Rockey | 707/8 |
| 2005/0131800 | A1* | 6/2005 | Parks et al. | 705/37 |
| 2005/0131924 | A1* | 6/2005 | Jones | 707/100 |
| 2005/0188299 | A1* | 8/2005 | Furman et al. | 715/513 |
| 2005/0234811 | A1* | 10/2005 | Herman et al. | 705/37 |
| 2005/0240519 | A1* | 10/2005 | Aiken et al. | 705/39 |
| 2005/0246278 | A1* | 11/2005 | Gerber et al. | 705/44 |
| 2005/0289051 | A1* | 12/2005 | Allin et al. | 705/40 |
| 2006/0085322 | A1* | 4/2006 | Crookshanks | 705/37 |
| 2006/0149658 | A1* | 7/2006 | Smith | 705/37 |
| 2006/0265308 | A1* | 11/2006 | Jennings | 705/37 |
| 2006/0271385 | A1* | 11/2006 | Hochbaum | 705/1 |
| 2007/0174078 | A1* | 7/2007 | Silva et al. | 705/1 |
| 2007/0179877 | A1* | 8/2007 | Sforzo | 705/35 |
| 2007/0255644 | A1* | 11/2007 | Elder | 705/37 |
| 2008/0077593 | A1* | 3/2008 | Abrams et al. | 707/9 |
| 2008/0082385 | A1* | 4/2008 | Busch et al. | 705/8 |
| 2008/0103958 | A1* | 5/2008 | Walker | 705/37 |
| 2008/0221964 | A1* | 9/2008 | Berkovitz et al. | 705/9 |
| 2008/0288364 | A1* | 11/2008 | Harris | 705/26 |
| 2009/0030835 | A1* | 1/2009 | Burns et al. | 705/37 |
| 2009/0233579 | A1* | 9/2009 | Castell et al. | 455/411 |
| 2009/0299868 | A1* | 12/2009 | O'Leary | 705/26 |
| 2010/0017255 | A1* | 1/2010 | Gramza et al. | 705/9 |
| 2010/0042556 | A1* | 2/2010 | Erickson | 705/500 |
| 2010/0082496 | A1* | 4/2010 | Hutson, Jr. | 705/80 |
| 2010/0114971 | A1* | 5/2010 | Weisflog | 707/802 |
| 2010/0131409 | A1* | 5/2010 | Lawyer et al. | 705/44 |
| 2010/0153293 | A1* | 6/2010 | Fox et al. | 705/347 |
| 2010/0161495 | A1* | 6/2010 | Olson et al. | 705/80 |
| 2010/0185547 | A1* | 7/2010 | Scholar | 705/80 |
| 2011/0082780 | A1* | 4/2011 | Nagaram et al. | 705/35 |
| 2011/0106648 | A1* | 5/2011 | Kim | 705/26.3 |
| 2011/0213631 | A1* | 9/2011 | Mislavsky | 705/7.11 |
| 2011/0307347 | A1* | 12/2011 | Jentsch | 705/26.4 |
| 2012/0005033 | A1* | 1/2012 | Baldwin et al. | 705/26.1 |

OTHER PUBLICATIONS

Today's Challenging Economy Demands Better Surety Bond Practices; Niland, Tom; Construction Accounting & Taxation; May/Jun. 2010; 20, 3; 4-pages.*

Keeping those financial houses in order: CPAs build construction niche; Gillette, Becky; The Mississippi Business Journal28. 34 (Aug. 21, 2006); 6-pages.*

Competitive sealed proposal process: A new approach in facilities . . . ; Groppel, Larry D; Tucker, John; Owens, Wesley; Youngblood, Regina; Journal of Facilities Management; 2005; 3, 4; 18-pages.*

* cited by examiner

1100

1300

1400

2200

2300

2700

2800

SYSTEM FOR MANAGING CONSTRUCTION PROJECT BIDDING

BACKGROUND

Generally described, the field of construction project management and bidding has traditionally been characterized by complex business processes involving the exchange and maintenance of a large number of physical documents. A typical construction project bidding process begins with the costly discovery and investigation of new construction projects by third party "lead finders," who sell leads and information on new construction projects to interested general contractors. Other projects may be advertised in various publications or through invitations to bid directed at known contractors. A contractor aware of a new project may typically access physical copies of project documents (e.g., blueprints, specifications, structural requirements, site surveys, etc.) at a planroom provided by a local construction association or third party organization. In other cases, a project owner may send costly physical copies of documents directly to interested contractors.

During the bid process, potential bidders (e.g., contractors) are typically provided with a specified period of time during which they may evaluate the project, determine quantities, and arrange for bids from sub-trades and suppliers. Bidders may be provided with a bid form by the project owner, allowing the bidder to specify determined prices and other required information. The bid form and any other required information is typically formally submitted in hardcopy to the project owner in a prescribed format. Depending upon the process specified the bid may also include amendments, bonds, or other documents that are submitted separately.

The sheer number of physical documents and process requirements involved in the development and bidding of a new construction project have the tendency to make construction project management a costly and byzantine affair. The project discovery and notification process is often haphazard and may leave out potentially interested contractors. Even where contractors have been notified, the physical distribution and storage of physical project documents may impose significant cost and inconvenience on both the project owners and interested bidders. Project owners are often forced to either maintain single copies of documents in a physical document planroom, or prepare and distribute multiple copies of blueprints and other project documents at great expense. Bidders may be forced to physically travel to a document planroom to view documents and prepare bids. During the bidding process itself, bids may be submitted with incomplete or insufficient information, and parties may disagree about bidding process requirements or closing times. The formal submission of hardcopy bid forms presents yet another cost and potential source of confusion and error for potential bidders.

BRIEF SUMMARY

A system is disclosed that facilitates construction project bidding, document distribution, and project management over a computer network. The system enables a project supervisor to efficiently transmit new project information and associated construction project files to one or more planroom provider systems. Each planroom provider system may make project information and associated construction project files available for transfer and viewing by one or more potential bidders connected to the planroom provider system over a public or private network. The planroom provider system(s) may provide a reference or link back to the project supervisor system to enable the potential bidder to bid on the construction project once the project information and project files have been reviewed.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION OF SPECIFIC EMBODIMENTS

Figure 1:
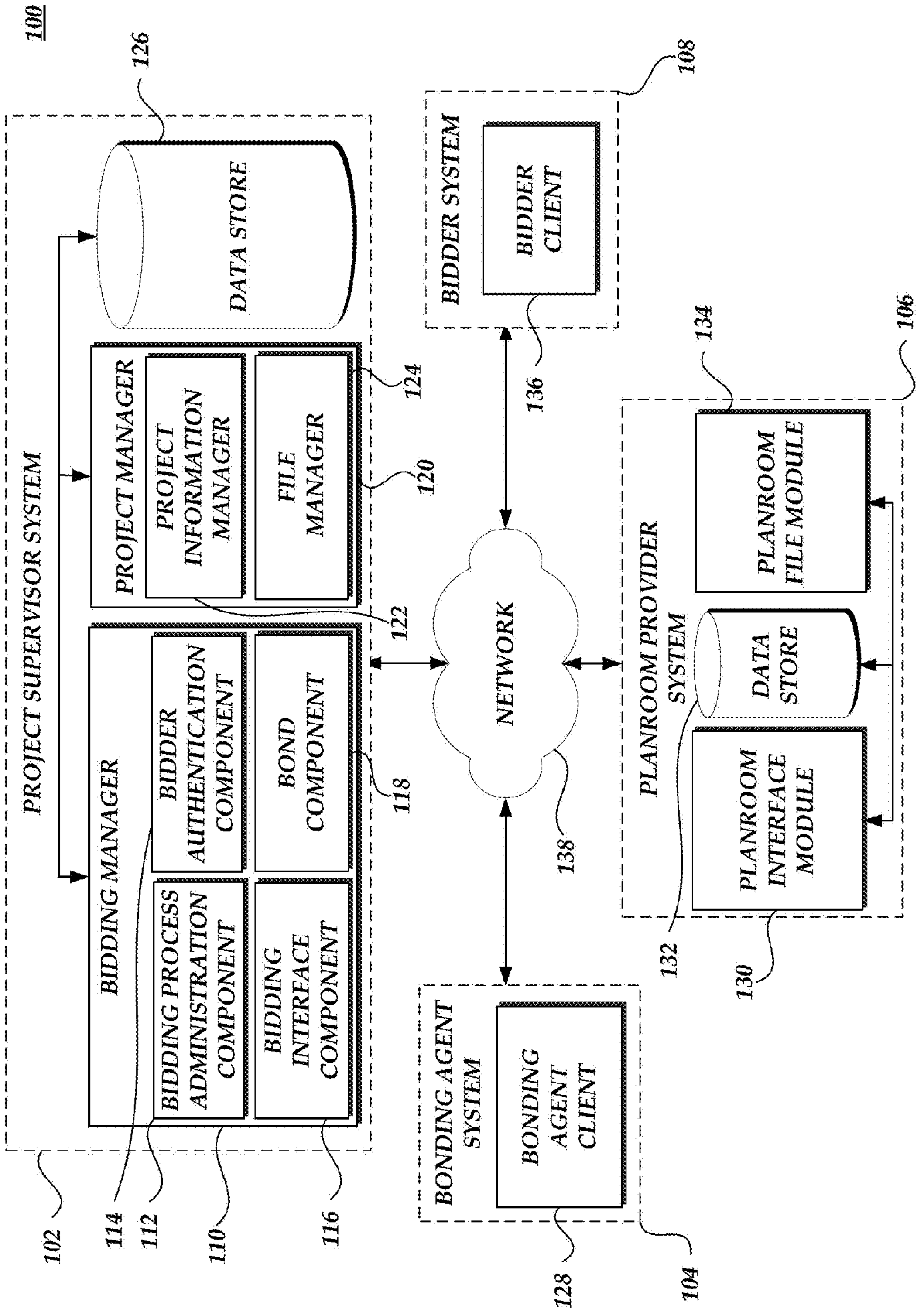
FIG. 1 is a block diagram depicting an illustrative computing environment for managing construction project information and bidding.

Specific embodiments of the inventive subject matter will now be described with reference to the drawings. Nothing in the following description is intended to imply that any particular feature or characteristic of the disclosed systems and methods is essential. The scope of protection is defined by the claims.

Generally described, aspects of the present disclosure relate to construction project bidding and management processes implemented on one or more computing devices. In one aspect, a project supervisor system associated with a project supervisor (e.g., an entity or individual such as a construction project owner, a developer or property owner, a project manager, an authorized agent, etc.), transmits new project information and associated construction project files to one or more planroom provider systems associated with respective construction associations, government entities, or other third-party planroom providers. Illustratively, a project supervisor system may be provided, implemented, or managed by a project supervisor directly, or by a construction association, local, regional, or national government agency, or any other third-party bidding management service provider. Each planroom provider system may make project information and associated construction project files available for transfer and viewing by one or more bidder systems associated with respective potential bidders (e.g., contractors) and connected to the planroom provider system over a public or private network. The planroom provider system may provide a reference or link back to the project supervisor system to enable a potential bidder to bid on the construction project once the project information and project files have been reviewed.

Benefits of the disclosed systems and methods will be apparent to one skilled in the relevant art. In some embodiments, the system allows a project owner or related entity to automatically and easily synchronize relevant construction project information with any number of third-party or associated planrooms, without the expense and overhead of providing and maintaining consistent physical copies of documents at multiple physical locations or scanning physical blueprints and other documents into digital format. Illustratively, a project owner may quickly and cheaply update, add, or remove files from multiple planrooms simultaneously, keeping documents consistent and synchronized between any number of digital locations. Still further, in various embodiments a project owner may utilize flexible bidding process creation tools to create an easily accessible and convenient electronic bidding process fully under the control of the project owner, yet easily accessible to potential bidders viewing documents or other information associated with a construction project at any number of different construction project planrooms. For example, the bidding process may automatically and consistently present information and verify requirements for a valid bid, without the need to distribute static paper bid forms or other documents, and without the difficulties presented by inaccurate cutoff times or submitted bids with potentially invalid or missing information. Embodiments of the system may allow a project owner to automatically and easily authenticate a potential bidder before the bid is submitted, reducing the potential of invalid or frivolous bids, and without the need to manually verify bidder information.

From the perspective of a construction project bidder, in some embodiments, the system enables a bidder to easily and cheaply obtain project documents and submit bids and attachments in an tightly integrated and automated project bidding environment, without the need to travel to a physical location to view documents or prepare, print, and deliver lengthy bid forms or documents to a project owner. Still further, in various embodiments the system allows a bidder to easily obtain and include a bid bond issued directly by their surety provider to the project owner, without the need for a separate issuance process or additional physical documents or requirements.

For the purposes of illustration, a potential bidder may use a web browser or other client connected to a planroom provider system over a network or local connection to browse one or more files associated with any number of different projects. The potential bidder may thus be provided information on one or more upcoming construction projects through a single, easily accessible interface. In one embodiment, a potential bidder looking for more detailed information on a particular project may view, download, or otherwise access documents associated with each project through a browser interface provided by the planroom provider system. In other embodiment, a potential bidder may view, download, or access project documents through any other type of client or standalone document viewer. For example, a potential bidder desiring to view documents associated with a project may be provided with construction document viewer software by a planroom provider system or other software provider. Illustratively, the construction document viewer software may be configured to connect to a planroom provider system directly or over a network to provide easy access to project documents of interest.

Subsequent to accessing project information at a planroom provider system, a potential bidder interested in bidding on a particular project may follow a link or other reference provided by the planroom provider system to access a bidding manager associated with the project. For example, one or more projects in a list of available projects provided by a planroom provider system may each have a corresponding link associated with a bidding option. A potential bidder accessing one of these links may be redirected to a bidding interface (e.g., a web page or software client interface) provided by a bidding manager corresponding to a project supervisor system associated with the corresponding project. Illustratively, the bidding manager may be provided, implemented, or managed by a project supervisor, a construction association, local, regional, or national government agency, or any other third-party bidding management service provider.

Illustratively, a bidding manager may manage a bidding process for one or more construction projects in order to allow bidding of the projects by potential bidders. A project supervisor accessing a bidding manager may create a new bidding process by entering electronic bid form information corresponding to a project. The bid form information may include information such as a description and/or a closing time. The bidding process may further be associated with one or more bid requirements corresponding to bidding information required for a valid bid on the project. For example, the project supervisor may specify that a successful bid be required to include such information as a base bid price, one or more special prices such as separate or alternative prices, one or more unit prices, one or more custom defined prices, stipulated sum information, one or more documents, a bid bond, a bidder agreement or confirmation, etc. The bid requirements and other bid form information may be processed by the bidding manager to generate a custom bidding interface associated with the bidding process. In one embodiment, a bidding interface may be one or more web pages or other browser forms for entry of information by a potential bidder. In various other embodiments, a bidding interface may be a downloadable document, text form, or any other data entry interface provided through a software client or third party application. The project supervisor may open the bidding process by making the bidding interface accessible by potential bidders through the bidding manager.

A potential bidder accessing a bidding manager may be required to verify one or more pieces of associated information before being provided with a bidding interface associated with a particular project. In one embodiment, the bidding manager may require verification that a payment made by the bidder is authorized, that a phone number provided by the bidder is valid, and that an e-mail address provided by the bidder is valid. A potential bidder may be required to verify each form of information prior to being provided with the bidding interface. Subsequent to the verification of bidder information, the bidding manager may provide the bidding interface to the bidder, including any bid form information and bid requirements. The bidder may bid by entering bidding information in accordance with the bid requirements. Once all required bidding information has been entered, the bidder may confirm and submit his bid. Illustratively, the bidding manager may separately verify that all required bidding information has been entered correctly, and/or may send the completed bid to a third party for validation. Subsequent to the bid closing time, the bidding manager may stop accepting new bids, and may display the results of the bidding process to the project supervisor and/or one or more third parties.

In one embodiment, a bid form may be associated with a bid bond requirement. In one aspect, a bidder may satisfy a bid bond requirement by providing bond request information and contact information of a bonding agent to the bidding manager. The bidding manager may provide a bond request notification to the bonding agent based on the provided contact information. Illustratively, the bond request notification may include a link or other reference to the bidding manager. Following the link or other reference to the bidding manager, the bonding agent may be provided with bond request information associated with the bidder. Subsequent to being provided with bond request information associated with the bidder, the bonding agent may issue the bid bond to the bidding manager. For example, the bonding agent may provide a digital copy of the bid bond to the bidding manager to be associated with the bidder.

FIG. 1 is a block diagram depicting an illustrative computing environment 100 for managing construction project information and bidding. In one embodiment, the computing environment 100 may include a number of logical systems 102, 110, 114, and 118 implemented on one or more physical computing devices and connected over one or more networks 138. Illustratively, the network 138 may be a global internet or general communication network with one or more components external to the computing environment 100, or any private, semi-private, or public network.

Specifically, for purposes of example, illustrative computing environment 100 may include a project supervisor system 102 associated with a construction project supervisor (e.g., an entity or individual such as a construction project owner, a developer or property owner, a project manager, an authorized agent, etc.). Although a single project supervisor system 102 is depicted here for purposes of illustration, a computing environment may include any number of project supervisor systems 102 or related functionality or components associated with one or more construction project supervisors. In one embodiment, all the components and functionalities of the project supervisor system 102 may be provided, maintained, and/or implemented by the construction project supervisor. In another embodiment, one or more components or functionalities of the project supervisor system may be provided by a third party such as a construction association, a local, regional, or national government entity, a third party bidding management service provider, etc. Illustratively, a construction project supervisor may have a user account or other relationship with a third party service provider allowing access to one or more functionalities or components provided by the third party. For example, a project supervisor system 102 may be provided entirely by a third party bidding management service provider, and a project supervisor may have an account with the third party bidding management service provider allowing access to various project supervisor system functionality. Illustratively, bidding management and project interfaces provided to a bidder system 108 may include branding and/or a custom design corresponding to the project supervisor or a related entity. Illustratively, the project supervisor may be required to pay a fee and/or be a member of one or more associations or groups in order to gain access to the project supervisor system 102.

Although project supervisor system 102 is depicted here for purposes of illustration as implementing or providing one or more distinct or logical functionalities or components, one of skill in the relevant art will appreciate that any functionality or component described herein may be implemented, distributed, or replicated across any number of different physical and/or logical systems or computing devices. Project supervisor system 102 and/or any associated functionality or component as described herein may be further connected over one or more public or private networks 138 to various other physical or logical systems such as bonding agent system 104, planroom provider system 106, bidder system 108, etc. Specifically, for the purposes of example, project supervisor system 102 may include one or more computing systems provided by a project supervisor or planroom provider, one or more computing systems provided by a content delivery network, network computing service provider, bidding management service provider or other third party service provider, a personal computing device connected to one or more computing systems over a network 138 (e.g., a laptop of a project supervisor connected to another component of the project supervisor system 102 or a planroom provider system 106), and/or any combination thereof.

Project supervisor system 102 may include a bidding manager 110 for managing bidding on a construction project. For example, bidding manager 110 may provide interfaces and functionality to support bidding processes including, but not limited to, the creation of new bidding processes and/or bidding interfaces, the verification of potential bidder information, the issuance and/or management of bid bonds, the provision of bid requirements and interfaces to bidders, the collection and verification of bid information, the display and/or aggregation of bid information, etc. Bidding manager 110 may include a bidding process administration component 112 to provide interfaces and functionality to allow a project supervisor or other authorized party to create bidding processes and associated bidding interfaces for a particular project. In one embodiment, bidding process administration component 112 may provide various other functionality, including bid process and/or bidding interface management, the display, summarization, and/or aggregation of entered bids, distribution of bidding information and entered bids to one or more interested parties or bid verification entities, or any other functionality dealing with the management of the bidding process.

Bidding manager 110 may further include a bidder authentication component 114 to provide interfaces and functionality for the verification of bidder information and/or authentication of potential bidders. For the purposes of example, an illustrative bidder information verification routine is described below with reference to FIG. 9. Bidding manager 110 may further include a bidding interface component 116 to provide bidding interfaces and functionality to one or more bidder systems 108. For example, bidding interface component 116 may generate bidding interfaces from bidding process information and/or bid requirements provided by a project supervisor. Bidding interface component 116 may further manage the provision and/or distribution of bidding interfaces. For example, bidding interface component 116 may provide a bidding interface to one or more bidder systems 108 over network 138 in response to a request to bid or the successful verification of bidder information by bidder authentication component 114. Bidding manager 110 may further provide a bond component 118 to provide interfaces and functionality for the issuance and management of bid bonds. Illustratively, a bid bond may represent a third-party guarantee that a bidder will undertake a successfully bid project. An illustrative bid bond issuance routine is described below with reference to FIGS. 4 and 10 below.

Project supervisor system 102 may further include a project manager 120 for managing construction project information and associated documents. For example, project manager 120 may obtain project information corresponding to one or more construction projects from a project supervisor. In various embodiments, project manager 120 may further manage the provision and distribution of files associated with construction projects. Illustratively, project manager 120 may include a project information manager 122 to provide project information management interfaces and functionality to a project supervisor. For example, project information manager 122 may provide a new project interface to a project supervisor, obtain project information corresponding to a new project, and associate the project information with a new project. In one embodiment, project information manager 122 may provide new project information to a planroom provider system 106 over a network 138, and may update stored project information in response to updates by a project supervisor.

Project manager 120 may further include a file manager 124. Illustratively, file manager 124 may manage the selection, distribution, and storage of files by a project supervisor. For example, file manager 124 may provide a browser interface or software client to a project supervisor to enable selection of one or more electronic files associated with a project. Illustratively, files may be obtained from one or more storage devices associated with a project supervisor, and/or may be obtained from any type of local or remote data store associated with a third party entity or document provider. Subsequent to files being selected by a project supervisor, file manager 124 may transfer or otherwise store selected files remotely or locally in a data store 126 or other storage device, and/or may manage the transfer of files to a planroom provider system 106. In another embodiment, a browser interface or software client under the control of a project supervisor may transfer files directly from a first storage device or data store to a planroom provider system 106, data store 126, or other local or remote storage device. Illustratively, file manager 124 may further manage data consistency, backups, and updates to project files. For example, in one embodiment file manager 124 may provide file management interfaces and functionality to a project supervisor and/or automatically distribute and/or update copies of project files in response to a change to an existing file or addition of a new file associated with a project.

Project supervisor system 102 may still further include a data store 126. Illustratively data store 126 may store any type of data or information associated with the management of construction projects or bidding processes by bidding manager 110, project manager 120, or other component associated with project supervisor system 102. Illustratively, this information may include, but is not limited to, bid form and bid requirement information, bidder accounts and other bidder information, project information, files associated with projects or a project supervisor, bidding information associated with one or more bids, bid bond information, bonding agent information, and any other information associated with any component or functionality of project supervisor system 102. Data store 126 may correspond to any number of local or remote storage devices connected directly or over one or more public or private networks. Data store 126 may be distributed across one or more node or device and/or employ any of the various storage methodologies known in the art. Illustratively, one or more logical components of data store 126 may be provided by a project supervisor and/or any number of third party storage providers.

Computing environment 100 may include a bonding agent system 104. Illustratively, bonding agent system 104 may be associated with a bonding agent for issuing bonds for potential bidders. Illustratively, a bonding agent may be an entity that provides bid bonds to potential bidders in order to meet construction project bidding requirements. For the purposes of brevity, actions described as associated with a bonding agent may in one embodiment be understood as being performed by, to, or at a bonding agent system 104 corresponding to the bonding agent. As described above, a bid bond may be a third party guarantee of performance on a construction project by a bidding contractor. Although a single bonding agent system 104 is depicted herein for purposes of illustration, a computing environment may include any number of bonding agent systems 104 or related functionality or components corresponding to any number of associated bonding agents. In one embodiment, all the components and functionalities of the bonding agent system 104 may be provided, maintained, and/or implemented by the associated bonding agent. In another embodiment, one or more components or functionalities of the bonding agent system 104 may be provided by a third party such as a construction association, a local, regional, or national government entity, a third party bidding management service provider, etc. Although bonding agent system 104 is depicted here for purposes of illustration as implementing or providing one or more distinct or logical functionalities or components, one of skill in the relevant art will appreciate that any functionality or component described herein may be implemented, distributed, or replicated across any number of different physical and/or logical systems or computing devices.

Illustratively, bonding agent system 104 may include a bonding agent client 128. In one embodiment, bonding agent client may connect to one or more components or systems of computing environment 100 over network 138. Illustratively, bonding agent client 128 may provide, process, and/or display a bonding agent interface for obtaining, providing, and/or managing a bid bond associated with a bidder. An illustrative bond creation routine is described below with reference to FIG. 10.

Computing environment 100 may further include a planroom provider system 106. Illustratively, a planroom provider system 106 may be associated with a planroom provider for managing project information and related files. As discussed above, a planroom provider may be a construction association, a local, regional, or national government entity, a project supervisor, a contractor, a reprographer, or any other third-party entity. As described above, in one embodiment, a planroom provider system may obtain information and files associated with one or more projects from any number of project supervisors or associated project supervisor systems. The planroom provider system may then provide information and files to any number of bidder systems associated with potential construction project bidders. In one embodiment, the planroom provider system may additionally provide bidding request information to one or more bidder systems. Illustratively, this bidding request information may include information enabling or allowing a bidder system to access a bidding manager 110 or other system to allow bidding on a construction project. For example, a planroom provider system may provide information and files associated with a construction project to one or more bidder systems, as well as a link to a network resource provided by a bidding manager and configured to allow the potential bidders associated with the bidder systems to bid on the construction project.

Although a single planroom provider system 106 is depicted herein for purposes of illustration, a computing environment may include any number of planroom provider systems 106 or related functionality or components corresponding to any number of associated planroom providers. In one embodiment, all the components and functionalities of a planroom provider system 106 may be provided, maintained, and/or implemented by an associated planroom provider. In another embodiment, one or more components or functionalities of the planroom provider system 106 may be provided by a third-party construction association, government entity, a bidding management service provider, etc. Although planroom provider system 106 is depicted here for purposes of illustration as implementing or providing one or more distinct or logical functionalities or components, one of skill in the relevant art will appreciate that any functionality or component described herein may be implemented, distributed, or replicated across any number of different physical and/or logical systems or computing devices. Specifically, in one embodiment, all functionalities herein ascribed to a planroom provider system 106 may be performed by a project supervisor system 102. For example, a project supervisor system 102 may obtain, store, and manage construction project information additionally or as an alternative to publishing construction project information and files to a planroom provider system 106 as described herein. With regards to this specific embodiment, the project supervisor system 102 may provide the construction project information and files directly to potential bidders, and may directly manage the provisioning of construction project files as well as the bidding process.

Planroom provider system 106 may include a planroom interface module 130 for providing, processing, and/or managing a planroom interface. In one embodiment, a planroom interface module 130 may provide interfaces allowing potential bidders to access construction project information and/or related documents. For example, planroom interface module 130 may provide interfaces or interface components (e.g., web pages or other browser interfaces, interface configuration information for a stand-alone client, etc.) to a bidder system 108 connected to planroom provider system 106 over network 138. In a further embodiment, planroom interface module 130 may manage the interface between one or more project supervisor systems 102 and the planroom provider system. For example, planroom interface module 130 may verify that a project supervisor associated with project supervisor system 102 is authorized to publish project information and related files to the planroom provider system 106. The planroom interface module 130 may further manage the transfer of project information and/or related documents from project supervisor system 102 across network 138.

Planroom provider system 106 may further include a data store 132 and planroom file module 134. Data store 132 may correspond to any number of local or remote storage devices connected directly or over one or more public or private networks. Data store 132 may be distributed across one or more nodes or devices and/or employ any of various storage methodologies known in the art. Illustratively, one or more logical components of data store 132 may be provided by a project supervisor and/or any number of third party storage providers. Illustratively, planroom file module 134 may communicate with data store 132 to manage and store project information and/or related project files. Construction project files may include any type of digital information relating to or associated with a construction project, including but not limited to, blueprints, plans, diagrams, specifications, structural requirements, site surveys, inspection reports, permits, pictures, schedules, requirements, safety documents, requisitions, contractual requirements, or any other type of file or digital document.

Computing environment 100 may further include a bidder system 108 associated with a potential construction project bidder. Illustratively, a potential construction project bidder may be a general contractor, a sub-contractor, or any other individual or entity interested in bidding on a construction project. A bidder system 108 may be any combination of hardware and/or software capable of communicating with project supervisor system 102 and/or planroom provider system 106 over a network 138. For example a bidder system 108 may include any type of computing device including a desktop or laptop computer, a mobile computing device (e.g., a tablet or smartphone), a limited purpose computer (e.g., a game system or home internet gateway), or any other kind of computing device. Illustratively, a bidder system 108 may include one or more bidder clients 136 implemented in software and/or hardware. In one embodiment, a bidder client 136 may be a web browser connected to project supervisor system 102 and/or planroom provider system 106 over network 138 such as a global internet. Illustratively, a bidder client 138 may communicate with project supervisor system 102 and/or planroom provider system 106 to provide one or more interfaces for tasks associated with bidding and viewing information regarding one or more construction projects.

Although a single bidder system 108 is depicted herein for purposes of illustration, a computing environment may include any number of bidder systems 108 or related functionality or components corresponding to any number of potential bidders. In one embodiment, all the components and functionalities of a bidder system 108 may be provided, maintained, and/or implemented by an associated bidder. In another embodiment, one or more components or functionalities of the bidder system 108 may be provided by a third-party construction association, government entity, a bidding management service provider, etc. Although bidder system 108 is depicted here for purposes of illustration as implementing or providing one or more distinct or logical functionalities or components, one of skill in the relevant art will appreciate that any functionality or component described herein may be implemented, distributed, or replicated across any number of different physical and/or logical systems or computing devices.

Figure 2:
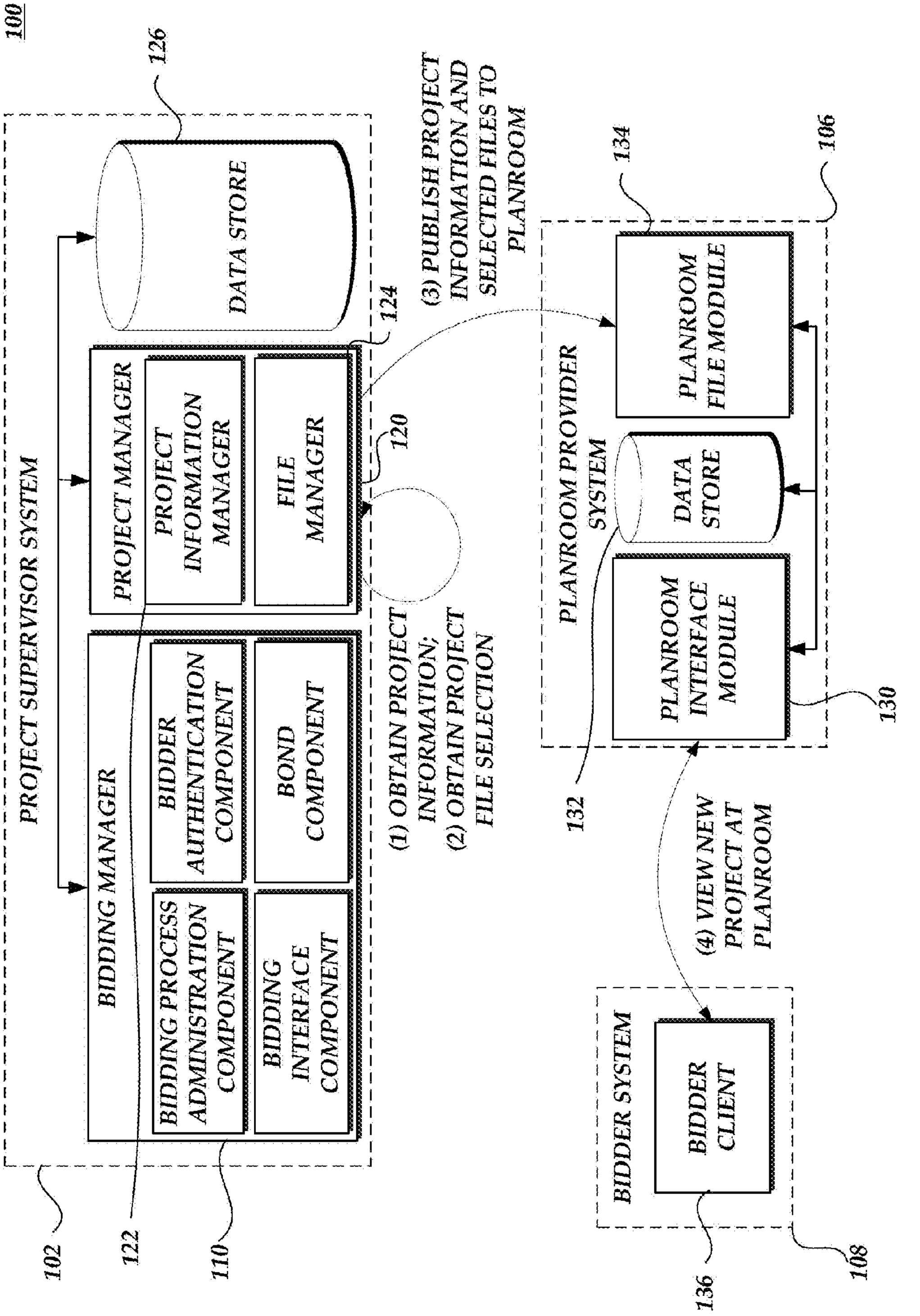
FIG. 2 is a block diagram of the computing environment of FIG. 1 depicting the illustrative publication of construction project information to a planroom provider system.

FIG. 2 is a block diagram of the illustrative computing environment of FIG. 1 further depicting the illustrative publication of construction project information to a planroom provider system 106. For the purpose of illustration, the publication of construction project information to a planroom provider system may be at the behest of a project supervisor wishing to make information and files associated with a new construction project accessible by contractors and other potential bidders. For the purpose of this example, we will assume that the project supervisor is authorized to provide and publish construction project information and related files. In an alternate embodiment, a project supervisor may first have to log on to a project supervisor system 102 or otherwise verify that he is authorized to provide and/or publish information or files to a planroom provider system 106.

Returning to the example, the project supervisor system 102 may obtain project information from a project supervisor or other source. Project information may include information such as a date that the information was posted, a date that the information was last changed, a project location, information identifying a project supervisor making changes or entering information, a project host, a reference number, a project address, a project description or name, bid process summary information such as close time, a bid location and/or any bid process description or related requirements, and/or any other information related to a construction project. An illustrative user interface for entering project information is described below with reference to FIG. 11.

The project supervisor system 102 may further obtain a selection of project files related to or associated with the construction project. Illustratively, these construction project files may exist in any storage location and/or be obtained from any source. For example, project files may be selected or uploaded from a computing device or system associated with the project supervisor, may be generated from data entered or identified by a project supervisor (e.g., scanned or otherwise entered from hard copies of documents), may be stored on a data store 126 associated with the project supervisor system 102, may be stored on a data store 132 associated with a planroom provider system 106, and/or may be stored on, generated from, or obtained from any other source. In one embodiment, a project supervisor may select one or more existing project files stored on a data store 126 or 132 associated with a planroom provider 106 or project supervisor system 102. In another embodiment, a project supervisor may select one or more existing project files from a personal computing device or other storage location. In a further embodiment, project supervisor system 102 may automatically select one or more project files based on the construction project information and the file contents or associated information. In a still further embodiment, a project supervisor may select one or more project files by providing hard copies of documents to a document entry service to be scanned or otherwise entered into an electronic form. Illustratively, project files may be selected or obtained from one or any combination of sources or computing devices.

The project supervisor system 102 may publish project information and/or selected files to a planroom provider system 106 (e.g., through a planroom file module 134) automatically or at the request of a project supervisor. Illustratively, a project supervisor system 102 may publish information and/or files to any number of planroom provider systems 106 associated with one or more planroom providers. For example, an area may have several construction associations, each of which acts as a planroom provider and maintains a corresponding planroom provider system 106. In order to ensure that his construction project is seen by as many contractors as possible, a project supervisor may cause the project supervisor system 102 to publish information and files to each of the planroom provider systems 106 associated with the several construction associations. In one embodiment, a planroom provider may allow any project supervisor to publish project information and/or files to their associated planroom provider system 106. In another embodiment, a planroom provider may require that a project supervisor pay a fee or be otherwise authorized to publish project information and/or files to their associated planroom provider system 106. For example, a construction association may require that a project supervisor or associated entity be a member of the construction association before publishing to an associated planroom provider system 106. As another example, a local government entity may require that a project supervisor or related entity pay a fee or be on a list of government approved project supervisors before publishing to an associated planroom provider system 106.

Illustratively, each planroom provider system 106 may have project information and associated files published to it from any number of project supervisor systems 102 associated with any number of project supervisors. Allowing multiple project supervisor systems 102 to publish to a planroom provider system 106 may allow a planroom provider system 106 to act as an aggregator or clearinghouse for construction projects, and allows potential bidders to browse and gather information on projects from a range of different project supervisors at a single planroom provider system 106.

Publishing project information and/or associated files to a planroom provider system 106 may comprise forming an association between the information and/or files and a construction project record at the planroom provider system 106. Subsequent to information and/or files being published at a planroom provider system 106, the information and/or files may be made available to one or more bidder system 108. A project supervisor system 102 may publish information and/or files to a planroom provider system 106 in any of a number of ways, including uploading or transferring information and/or files from a data store 126, causing the upload or transfer of information and/or files from another storage location (e.g., a device of a project supervisor, or a third party network storage location), selecting or identifying files already stored at a planroom provider system 106 (e.g., documents stored at a data store 132), causing physical files provided to a planroom provider or document entry service to be converted to an electronic form and/or transferred to a planroom provider system 106, or any other method of providing or identifying the selected files to the planroom provider system 106. In one embodiment, the project supervisor system 102 may not be directly involved in publishing information and/or files to a planroom provider system 106. For example, a project supervisor may access a planroom provider system 106 and upload, enter, identify, or transfer information or files directly from a computing device or remote storage location. Illustratively, a planroom provider system 106 may or may not store or obtain project information and/or one or more associated files directly. For example, a project supervisor system 102 may publish information and/or files by providing a planroom provider system 106 with a reference or electronic address associated with information and/or files stored in a data store 126 associated with the project supervisor system 102 or stored in any number of other local or remote storage locations.

Illustratively, project information and/or any number of related files may be published to a planroom provider system 106 in any one or combination of the methodologies discussed above. For example, a project supervisor system 102 may transfer project information and a first set of associated files to a planroom provider system 106 over a network 138, but may only transfer electronic addresses of a second set of associated files. In one embodiment, planroom provider system 106 may retrieve files associated with the electronic address, and store the retrieved files and the files transferred by project supervisor system 102 in a data store 132. In another embodiment, planroom provider system 106 may store the project information, files, and electronic addresses at data store 132, and may provide a combination of files and electronic addresses of files to a requesting bidder system 108.

Project information and/or associated files may further be published in one or more steps and in any order. For example, in one embodiment, a project supervisor system 102 may transfer project information corresponding to a first project to a planroom provider system 106 at a first point in time, transfer one or more associated files to publish at a second point in time, and cause a set of associated blueprints in hardcopy to be converted to electronic form and provided to publish at a third point in time. As a continued example, a project supervisor may at a fourth point in time select one or more related documents currently associated with a second project and already stored by the planroom provider system 106 (e.g., site diagrams that are common to both projects) to also be published for the first project.

In one embodiment, project information and/or associated files may be added or published, modified, or removed from a project at any point in time. Illustratively, adding, modifying, or removing information and/or files may include replacing or modifying information, changing an association between a project and information or a file, and/or deleting information or a file. To continue the above example, seeing that one or more of the files at the planroom provider system 106 are outdated, the project supervisor may choose to upload one or more updated files from a computing device (e.g., a personal laptop) to the planroom provider system 106 to replace the outdated files. Illustratively, the planroom provider system 106 may overwrite the existing files with the updated files, or may continue to store the existing files and may simply change an association to associate the updated files with the project instead of the existing files. As another example, a project supervisor may choose to remove one or more files from a planroom provider system 106. Illustratively, in response to a request to remove one or more files, the planroom provider system 106 may delete the requested removed files, may remove an association between the project and the requested removed files, and/or may make the files inaccessible to one or more bidder systems in any other way. In one embodiment, a planroom provider system 106 may remove an association between a file and a first project while leaving an association between the file and a second project intact.

In one embodiment, a planroom provider system 106 may place limits on a project supervisor's ability to modify information and/or files associated with a project. For example, a planroom provider system 106 may prevent a project supervisor from making changes to project information or associated files after bidding has begun on the corresponding project, in order to ensure that all bidders are presented with the same information. Illustratively, these limitations may correspond to legal requirements or rules set by a construction association or government entity associated with the planroom provider system 106.

Subsequent to project information and/or associated files being published at the planroom provider system 106, the project information and/or associated files may be made available to any number of bidder systems 108 associated with one or more potential bidders (e.g., contractors). For example, a potential bidder may access a planroom provider system 106 with a bidder client 136 implemented on a bidder system 108. For the purposes of brevity, actions described as associated with a bidder may in one embodiment be understood as being performed by, to, or at a bidder system 108 corresponding to the bidder. In one embodiment, the bidder client 136 may be a web browser, and a planroom provider system 106 may provide html interfaces to allow the bidder to browse through a list of projects published on the planroom provider system 106. As discussed above, the list of projects may correspond to construction projects associated with any number of project supervisors or project supervisor systems 102. Illustratively, each project may be listed with all or a subset of published project information associated with the project. In one embodiment, one or more of the projects in the illustrative list of projects may be associated with a reference or link to display more information, a reference or link to view documents, and/or a reference or link to allow bidding on the project. For the purpose of example, an illustrative user interface depicting a list of projects is described below with reference to FIG. 13.

Illustratively, a potential bidder may access a link or follow a reference from a list of projects provided by a planroom provider system 106 to view more detailed published information associated with a project, and/or to view files associated with the project. In one embodiment, a potential bidder may download or access files through the same bidder client 136 that the potential bidder is utilizing to browse a list of projects. In another embodiment, the planroom provider system 106 or project supervisor system 102 may make an alternate project document viewer client available to the bidder. For example, the planroom provider system 106 may allow the potential bidder to download or otherwise access project document viewer client software to run on bidder system 108. Illustratively, the project document viewer client software may be configured to connect automatically or easily to planroom provider system 106 when a link or reference from a project to view documents is followed.

In one embodiment, the planroom provider system 106 may provide a combination of files and references to files stored in any number of remote storage locations to a bidder client 136. In a further embodiment, project information and/or associated files may be stored at the project supervisor system 102, and following a link or reference corresponding to a project at the planroom provider system 106 may cause the bidder to be presented with information or files provided by the project supervisor system 102. For example, the planroom provider system 106 may provide the bidder system 108 with a link to a web interface provided by the project supervisor system 102 for displaying project information, and/or may provide bidder system 108 with addresses or references of files stored on the project supervisor system 102.

In one embodiment, any bidder may access planroom provider system 106. In another embodiment, a planroom provider system 106 may limit the access of one or more bidders to a planroom provider system 106. For example, a planroom provider may require that a bidder pay a fee or be a member of a group or association before accessing an associated planroom provider system 106. As another example, a planroom provider may require that a bidder verify one or more types of information associated with the bidder before accessing an associated planroom provider system 106. A planroom provider system 106 may allow different levels of access to different bidders, based on a group membership or other characteristic as discussed above. For example, a first group of bidders may be allowed to browse all electronic project files through an interface provided by the planroom provider system 106. A second group of bidders may only be allowed to download and/or print files from the planroom provider system 106. A third group of bidder systems 108 may be limited to viewing or downloading a subset of files associated with the construction project. Illustratively, a planroom provider system 106 may be configured to allow any combination of permissions to any bidder or group of bidders associated with one or more bidder systems 108.

A planroom provider system 106 may provide links and/or references for bidding on one or more projects in a list of published projects accessible to one or more bidder systems 104. Illustratively, subsequent to viewing project information and/or related files at planroom provider system 106, a bidder may access or follow a link or reference in order to bid on the corresponding project.

Figure 3:
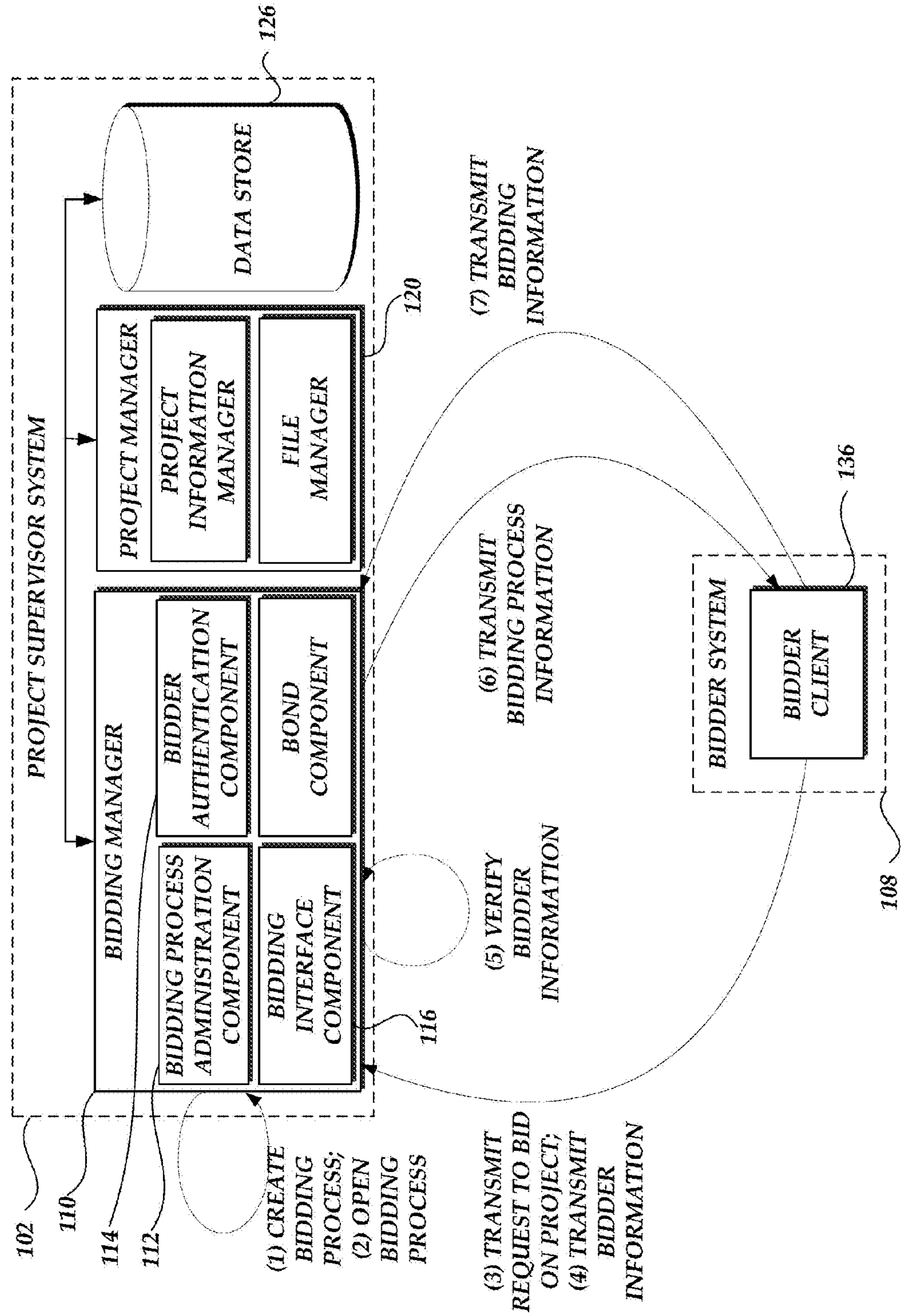
FIG. 3 is a block diagram of the computing environment of FIG. 1 depicting an illustrative bidding process.

FIG. 3 is a block diagram of the computing environment of FIG. 1 depicting an illustrative bidding process. Before opening bidding on a new project, a project supervisor associated with a project supervisor system 102 may create a new bidding process by providing bid form and associated bidding requirement information. In one embodiment, the project supervisor may create a new bidding process through a bidding process administration component 112 included in a bidding manager 110, as described above with reference to FIG. 1. Illustratively, to create a new bidding process, a project supervisor may provide bid form information associated with the bidding process to the project supervisor system 102. Illustratively, this may include information such as a name or project description, a bidding close time, etc. The project supervisor may further provide bid requirement information associated with one or more requirements of a valid bid to the project supervisor system 102. An illustrative bid process creation routine is described below with reference to FIG. 7.

Subsequent to creating a new bidding process, a project supervisor associated with the project supervisor system 102 may open the bidding process up for bidding. In one embodiment, opening the bidding process up for bidding may cause one or more planroom provider systems 106 to provide bidding request information such as a link or other reference to the project supervisor system 102 to allow access by potential bidders. For example, a project supervisor system 102 opening a bidding process up for bidding may transmit a bidding open notification to one or more planroom provider systems 106 that are providing information about the associated construction project. Responsive to receipt of the notification, the planroom provider systems 106 may provide bidding request information to bidder systems accessing the planroom provider systems and/or requesting to bid on the construction project. Illustratively, the bidding request information may comprise a link or other reference to a network resource or other interface provided by the project supervisor system 102 to allow bidding on the project. In another embodiment, a planroom provider system 106 may not receive a bidding open notification and may provide bidding request information regardless. Illustratively, a bidder attempting to follow a link or reference to bid on a project before the project has opened may be provided with an error message or other notification that bidding is not yet open.

Illustratively, once the bidding process has been opened for bidding, a bidder browsing a list of projects at a planroom provider system 106 may follow a link or other reference associated with a project to send a request to bid (e.g., a request to view a bidding interface) to project supervisor system 102. In one embodiment, following a link or other reference from planroom provider system 106 may cause a project supervisor system 102 to provide a bidding interface providing access to various functionalities related to bidding to the bidder at bidder system 108, including but not limited to a bond issuance functionality, a bidding process and/or bid requirements preview, bidder information entry and verification, and the actual bidding interface associated with the bidding process. In another embodiment, a bidder following a link or other reference from planroom provider system 106 may cause the project supervisor system 102 to provide an interface for information verification or bond issuance, or may cause project supervisor system 102 to immediately begin presenting a bidding interface associated with the bidding process as described above. Illustratively, interfaces may be provided by a bidding interface component 116 included in bidding manager 110 as described above with reference to FIG. 1.

Illustratively, a bidder may provide or transmit bidder information to the project supervisor system 102 subsequent to an initial request to bid on the project. In one embodiment, a project supervisor system 102 may provide an interface for providing bidder information to the bidder in response to the request to bid. An illustrative interface for entering bidder information is described below with reference to FIG. 17. A bidder may enter any of various kinds of bidder information into the illustrative interface and submit the information to a project supervisor system 102. In another embodiment, bidder information may be obtained from another source, such as an account with a bidding management service provider or other third-party information storage or management entity. In a further embodiment, bidder information associated with the bidder may have been previously obtained and/or may be stored at a project supervisor system 102. For example, if a bidder has previously bid on projects through project supervisor system 102, the bidder may already have bidder information stored, and may only have to login to the system or otherwise identify the stored bidder information.

Subsequent to the project supervisor system 102 obtaining bidder information, the project supervisor system 102 may verify the bidder information. Verification of bidder information may include verifying information with a payment entity such as a bank, verifying a telephone number by telephone call, verifying an electronic address account, or any other form of verification. In one embodiment, the verification process may include issuing a digital seal or requiring an electronic signature from the potential bidder. In various other embodiments, an indicium of the potential bidder's identity may be taken or maintained by any other method as known in the art. An illustrative bidder verification routine is described below with reference to FIG. 9. In one embodiment, if the bidder has bid through the project supervisor system 102 in the past, a verification step may simply include logging on or otherwise authenticating an account associated with previously verified information. Although no communication between the bidder system 108 and the project supervisor system 102 is depicted here for purpose of example, it should be understood that one or more validation steps may require additional communication between a bidder and/or bidder system 108 and a project supervisor and/or project supervisor system 102. Illustratively, verification of bidder information may ensure that no unauthorized bidders bid on a project, and that each bidder can be tracked and identified. The verification of information and bidder identity may thus prevent bidders from claiming that they did not submit a bid in order to avoid undertaking a contract, and may further dissuade unscrupulous or non-serious bidders from entering false bids as an attempt to influence the bidding results. Illustratively, bidder verification may be performed by a bidder authentication component 114 included in a bidding manager 110 as described above with reference to FIG. 1.

If the bidder information is successfully verified, the project supervisor system 102 may transmit bidding process information or associated bidding interfaces to the bidder system 108. Illustratively, the bidding process information may include bid form information and bidding requirements as described below with reference to FIG. 7. In one embodiment, the bidder system 108 may display one or more bidding interfaces to an associated bidder. The bidder may enter bidding information corresponding to his bid, and cause the bid information to be transmitted back to the project supervisor system 102. An illustrative routine for obtaining bid information at a project supervisor system 102 is provided with reference to FIG. 8 below.

Figure 4:
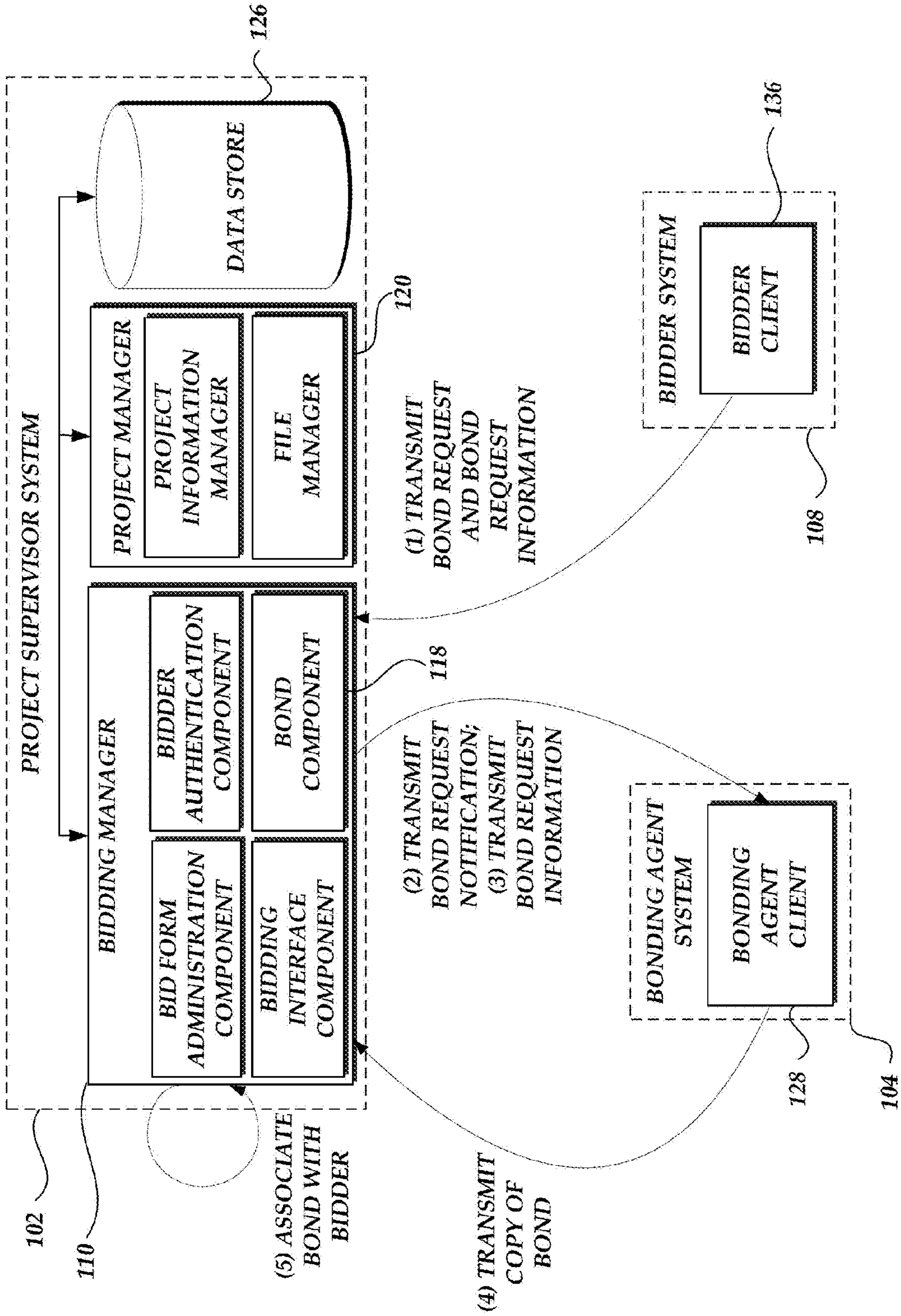
FIG. 4 is a block diagram of the computing environment of FIG. 1 depicting the illustrative issuance of a bid bond for a construction project.

In one embodiment, a bidding process may require a bid bond associated with a potential bidder. FIG. 4 is a block diagram of the computing environment of FIG. 1 depicting the illustrative issuance of a bid bond for a construction project. Illustratively, a bid bond may represent a third-party guarantee that a bidder will undertake a successfully bid project. In case of non-performance of the successful bid, the amount of the bond may be forfeit to the project supervisor or other entity associated with the project. Requiring a bid bond as a prerequisite for entering a bid on a construction project may thus provide some measure of financial protection to the project supervisor managing the bidding process.

Illustratively, a project supervisor system 102 may assist in the process of bid bond issuance and management by allowing a bonding agent to issue a bid bond directly to the project supervisor system 102 through a bonding agent system 104. A bonding agent may illustratively be a third party that specializes in the issuance of bid bonds for construction projects, or may be a bank, a construction association, or any other kind of financial services provider. The project supervisor system 102 may thereby ensure that the bid bond is authentic and/or associate the bond with the bidder, simplifying the process of bid bond management. Illustratively, one or more of the functions or processes described below may be implemented or provided by a bond component 118 included in a bidding manager 110 as described above with reference to FIG. 1.

For the purpose of example, a project supervisor system 102 may obtain a bond request and associated bond request information associated with a potential bid on a construction project from a bidder. Illustratively, the bond request and/or associated bond request information may be generated or obtained as a result of the potential bidder entering bond request information into a form or other interface provided to the bidder system 108 by project supervisor system 102. An illustrative user interface for entering bond request information is described below with reference to FIG. 20. Illustratively, bond request information may include, but is not limited to, information such as a bidder name, contact information of the bidder's bonding agent (e.g., an electronic address), an estimated bid price, a bid closing time, project information, and/or any other information regarding the bidding process, estimated bid, project, or bidder.

Subsequent to receiving the bond request and associated bond request information from the bidder, the project supervisor system 102 may transmit a bond request notification to a bonding agent. Illustratively, the bond request notification may be transmitted in any format to a device, mailbox, or storage location associated with the bonding agent. For example, a project supervisor system 102 may transmit a bond request notification as an electronic message to a bonding agent's electronic message mailbox. In one embodiment, the bond request notification may include bond request information sufficient for the bonding agent to issue a bond. In another embodiment, the bond request notification may include a link or reference to access bond request information. For example, an electronic message sent to a bonding agent by a project supervisor system 102 may include a link that, when followed, directs a bonding agent client 128 to access an interface displaying bond request information. Illustratively, the interface may include functionality to allow a bonding agent system to transmit an electronic version of a bid bond to the project supervisor system 102. In one embodiment, the interface displaying bond request information may comprise a browser interface provided by a project supervisor system 102. An illustrative interface for displaying bond request information and transmitting an electronic bid bond is described below with reference to FIG. 21.

Illustratively, subsequent to receiving bond request information, a bonding agent may issue a bid bond. In one embodiment, a bid bond may be a paper document (e.g., a contract) signed or sealed by a bonding agent. Illustratively, if the bid bond is issued in hard copy, an electronic copy of the bid bond may be generated through scanning of the paper document or any other document conversion means known in the art. In another embodiment, a bid bond may be issued electronically and signed or otherwise authenticated digitally through the use of a digital signature or any other technology as known in the art. The electronic bid bond may be uploaded or otherwise transmitted from the bonding agent system 104 to the project supervisor system 102. In an alternate embodiment, a paper copy of the electronic bid bond may be mailed to the project supervisor or a third party document entry service that may convert the document to an electronic copy and forward the electronic copy to the project supervisor system 102. Upon obtaining the electronic copy of the bid bond, the project supervisor system 102 may associate the bid bond with the bidder who made the bond request. In one embodiment, the bidder may be required to authenticate the bid bond before it may be used by issuing a digital signature or through any other authentication mechanism as known in the art. Illustratively, the bidder may now select the issued bond in order to attach the bond to a bid and fulfill a requirement that a bid bond be provided as part of the bidding process.

In some embodiments, the contact information and/or identity of a bonding agent may not be verified by the project supervisor system 102. For example, in the case of a large number of bonding agents issuing bid bonds, it may be difficult or not cost effective to authenticate or verify that contact information provided by a potential bidder corresponds to an authentic bonding agent. Drawbacks to not validating the contact information and/or identity of bonding agents include being unable to ensure that an issued bid bond is a valid and enforceable guarantee of performance. In some embodiments, the project supervisor system 102 may require that a bonding agent identified by a potential bidder provide identification information and/or proof that the bonding agent is licensed by a trusted entity or a member of a legitimate bonding agent association. In other embodiments, the project supervisor system 102 may maintain a registry of bonding agents that have been approved to issue bid bonds. For example, a project supervisor system 102 may require that a bonding agent submit information or pay a fee to be included in a list of approved bonding agents. Still further, in some embodiments, a potential bidder may be given a choice of bonding agents from a list of approved bonding agents, and may not be required or allowed to enter bonding agent contact information. In one embodiment, a potential bidder entering bond request information may automatically be paired with an approved bonding agent by the project supervisor system 102.

Figure 5:
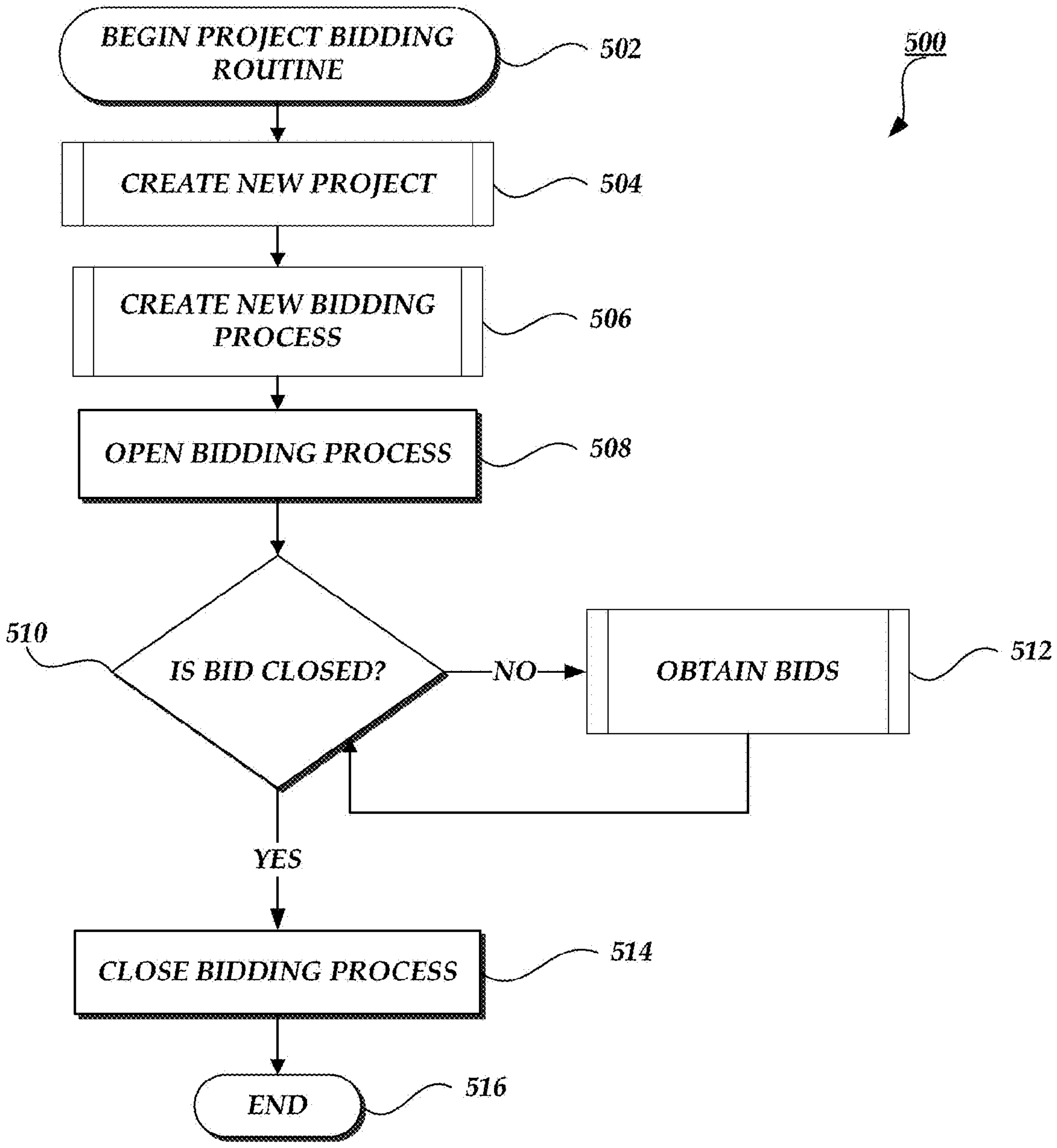
FIG. 5 is a flow diagram depicting an illustrative project bidding routine implemented by the project supervisor system of FIG. 1.

FIG. 5 is a flow diagram depicting an illustrative project bidding routine 500 implemented by the project supervisor system 102 of FIG. 1. Project bidding routine 500 begins at block 502. At block 504, a project supervisor system 102 creates a new project. A new project may illustratively be based on information entered or provided by a project supervisor. An illustrative new project creation routine is described below with reference to FIG. 6.

At block 506, a project supervisor system 102 creates a new bidding process associated with the project. The bidding process may illustratively be based on information entered or provided by a project supervisor, and may include bid form information and/or bidding requirements for a valid bid. An illustrative new bidding process creation routine is described below with reference to FIG. 7. At block 508, a project supervisor system 102 may open the new bidding process to potential bidders. As described above with reference to FIG. 3, opening a bidding process may allow potential bidders to access bidding interfaces and/or other information associated with the bidding process and enter bids at the project supervisor system 102. For example, opening the bidding process may cause a planroom provider system 106 providing information on an associated project to provide a link or other reference to the project supervisor system 102 in order to allow access to bidding interfaces by one or more potential bidders.

At decision block 510, a project supervisor system 102 determines whether the bidding process has closed. Illustratively, a bidding process may automatically close at a date and time set when the bidding process was created. This date and time may be publicly viewable, and in one embodiment may not be changed or modified by a project supervisor or any other entity in order to preserve fairness to all parties involved in the bidding. Illustratively, providing a publicly viewable and automatically managed countdown and closing process may eliminate uncertainty or disputes regarding closing times. In some embodiments, a project supervisor system 102 may determine that a bidding process has closed based on the occurrence of some event. For example, a bidding process may be configured to close at the same time as a related bidding process, or may be configured to close once a certain number of bids have been received.

If the project supervisor system 102 determines that the bidding process has not closed, the project supervisor system 102 obtains bids from potential bidders at block 512. An illustrative routine for obtaining bids is described below with reference to FIG. 8. Once the project supervisor system 102 determines that the bidding process has closed, the project supervisor system 102 proceeds to block 514 and closes the bidding process.

Illustratively, closing the bidding process may entail processing obtained bids for display or provision to an associated project supervisor or other entity. Illustratively, processing obtained bids may include summarizing bidding information associated with one or more bid, aggregating bidding information, formatting raw or summarized bidding information for display in any of a variety of formats, and/or exporting raw or processed bidding information to one or more secondary processes or systems. For example, a project supervisor system 102 closing a bidding process may format obtained bid information for display in a browser interface or spreadsheet, and may generate a document showing a summary of the bidding results (e.g., an average bid price, the ten lowest bidders across various price categories, etc.). The project supervisor system 102 is not limited to any particular formatting or summarization methodology, and may provide bidding information or bidding summaries in any format known in the art.

In one embodiment, the project supervisor may be prevented from viewing one or more aspects of information associated with obtained bids until the bidding process closes. For example, a project supervisor may be able to see a number of bids obtained by the project supervisor system 102, but may not be able to see bid price information or bidder information associated with the bids. Illustratively, subsequent to the bid process closing, the project supervisor system 102 may make one or more aspects of information associated with obtained bids available to the public or one or more determined or specified entities (e.g., a project supervisor, bidders with submitted bids, a third-party bid verification entity, etc.). For example, the project supervisor system 102 may make a summary of bid prices publicly accessible through a project website or other public interface, may make detailed bid price information without identifying bidder information available to all bidders that submitted bids on the project, and may make all bidding information available to a project supervisor. As another example, the project supervisor system 102 may make all bidding information publicly available, or may make bidding information available only to a project supervisor. Illustratively, any combination of bidding information and/or bidding summary information may be provided to any combination of the public and/or various entities as discussed above. As further discussed above, information may be provided and/or displayed in any format, including, but not limited to, text, comma separated, database, or excel, among others. In one embodiment, the specific formats and/or aspects of information available to different parties at different stages of the bidding process may be defined by a project supervisor when creating a new bidding process. In other embodiments, the specific formats and/or aspects of information available to different parties at different stages of the bidding process may be defined for a project supervisor system 102 as a whole. Illustratively, requirements as to the formatting and/or availability of information may be set by a project supervisor and/or may be based on local, regional, or national legal requirements, association rules, etc. At block 514 the bidding process ends, having provided results of the bidding process to one or more parties.

Figure 6:
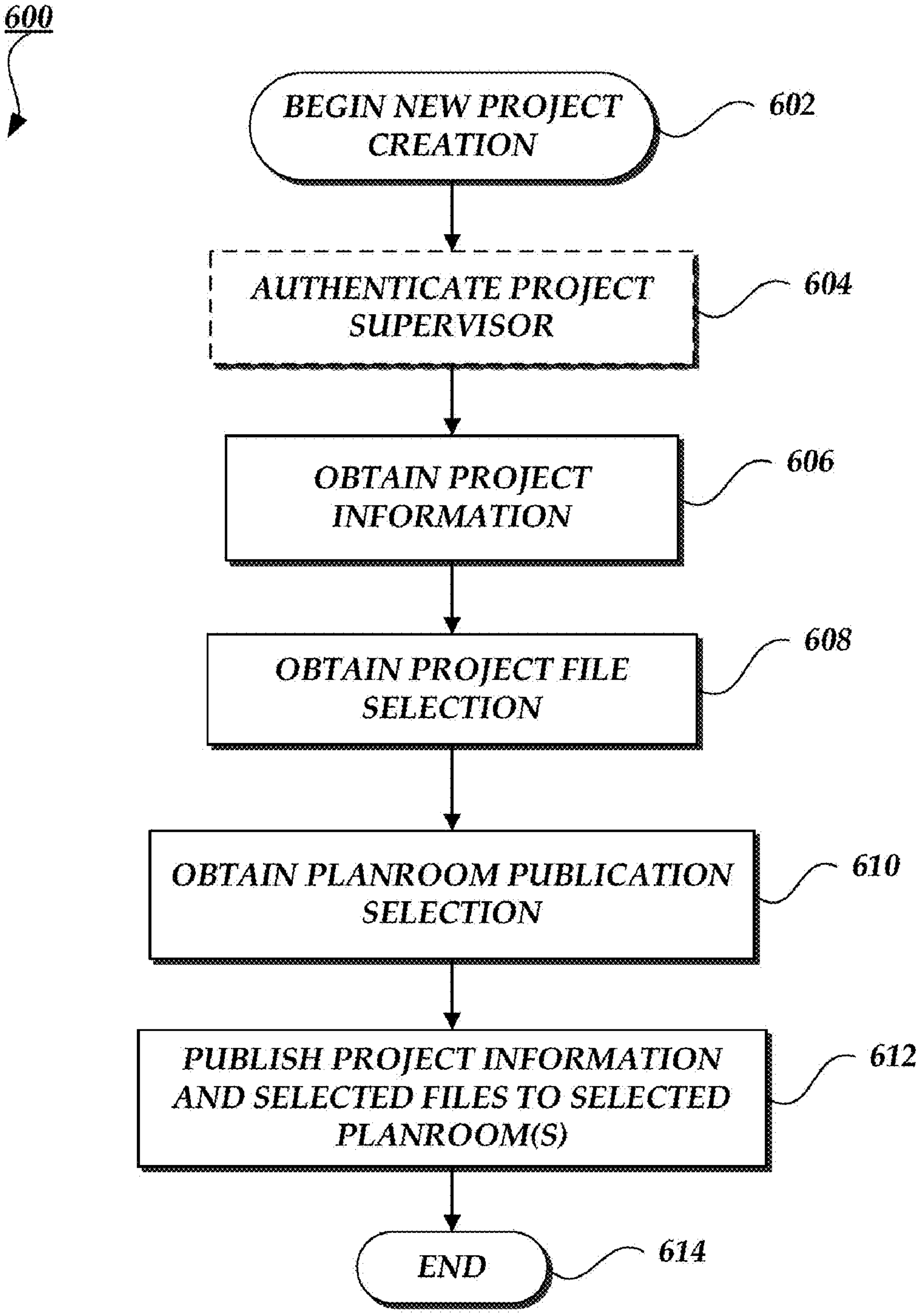
FIG. 6 is a flow diagram depicting an illustrative new project creation routine implemented by the project supervisor system of FIG. 1.

FIG. 6 is a flow diagram depicting an illustrative new project creation routine 600 implemented by the project supervisor system 102 of FIG. 1. New project creation routine 600 begins at block 602. Illustratively, a new project creation routine 600 may be initiated by a project supervisor wishing to create a new project in a project supervisor system 102 to correspond to a proposed new construction project. In one embodiment, project creation routine 600 may correspond to block 504 of the illustrative project bidding routine described with reference to FIG. 5 above.

As discussed above, in some embodiments, components and functions of a project supervisor system 102 may be provided by a project supervisor or related entity. In other embodiments, one or more components and/or functionalities of a project supervisor system 102 may be provided by a bidding management service provider, a government entity, a construction association, or some other third party entity. Illustratively, in various of these embodiments, the project supervisor system 102 may require authentication or verification of a project supervisor at block 604 before permitting the creation of a new project. For example, at block 604, a project supervisor may have to log on to a remote service or website before initiating new project creation routine 602. In other embodiments, a project supervisor may have direct access to the project supervisor system 102, and a log on or other authentication step may not be necessary.

At block 606, the project supervisor system 102 obtains project information regarding the new project. As discussed above with reference to FIG. 2, project information may include information such as a date the information was posted, a date that the information was last changed, a project location, information identifying a project supervisor making changes or entering information, a project host, a reference number, a project address, a project description, bid process summary information such as close time, a bid location, and/or any bid process description or related requirements, and/or any other information related to a construction project. Project information may be entered by a project supervisor, obtained from a local or remote source, automatically or manually determined or generated from project documentation, or obtained from any other source or storage location. An illustrative user interface for entering project information is described below with reference to FIG. 11.

At block 608, the project supervisor system 102 obtains a selection of project files associated with the new project. For the purpose of example, an illustrative interface for selecting files and publishing to planrooms is described below with reference to FIG. 12. As discussed above with reference to FIG. 2, project files may exist in any storage location and/or be obtained from any source. For example, files may be selected or uploaded from a computing device or system associated with the project supervisor, the project supervisor system 102, a planroom provider system 106, or any other source or storage location. In one embodiment, the project supervisor system 102 may automatically select one or more documents based on the construction project information and the document contents or associated information. In a further embodiment, a project supervisor may select one or more documents by providing hard copies of documents to a document entry service to be scanned or otherwise entered into an electronic form. In one embodiment, a project supervisor may select project files on a personal computing device or remote storage location not part of the project supervisor system 102. Illustratively, in this case, the project supervisor system 102 may not obtain a file selection, and files may be transmitted directly from the computing device to one or more planroom provider systems 106 as discussed below.

At block 610, the project supervisor system 102 obtains a planroom publication selection from a project supervisor. The planroom publication selection may be a list of planroom provider systems 106 to which to publish project information and associated files. Illustratively, a new project and associated files may be published to any of a number of planroom provider systems 106 provided, managed, and/or implemented by an entity related to a project supervisor or a project supervisor system 102 or any of various associations, government entities, or other third party planroom providers. For example, a project supervisor creating a new project for the planned construction of an apartment building may publish project information and associated files to a local residential construction association planroom provider system, a city construction project planroom provider system, and a planroom provider system managed by his own development firm.

Illustratively, a project supervisor system 102 may obtain a planroom publication selection from a project supervisor through a browser or other client interface, and/or may automatically determine or obtain a list of planrooms from a predefined preference list, various characteristics of the project, various characteristics of one or more planrooms, information obtained or determined from third party sources or project documents, or any other source of information. For example, a project supervisor system 102 may maintain a list of planroom provider systems 106 associated with a geographical area or particular type of construction or development. For example, in the context of the planned construction of an apartment building, the project supervisor system 102 may automatically generate a list of appropriate planroom provider systems 106 for the area and/or type of project. Illustratively, the project supervisor system 102 may automatically publish to planroom provider systems 106 on the generated list, or the list may be presented to a project supervisor in the form of one or more recommendations.

A project supervisor system 102 may additionally or alternatively provide search functionality for a project supervisor to locate one or more planroom provider systems 106. Illustratively, the project supervisor system 102 may maintain a list or database of one or more planroom provider systems 106. Each planroom provider system 106 may be associated with zero or more tags or other associated information allowing a project supervisor to search for appropriate planroom provider systems 106 to which to publish. For example, a project supervisor wishing to publish project information regarding a new construction project in Manitoba may search for planroom provider systems 106 associated with the region.

Illustratively, a list or database of planroom provider systems 106 may be predefined by an administrator, manager, or other entity associated with the project supervisor system, and/or may be automatically generated or determined from one or more sources. For example, a project supervisor system 102 may be configured to automatically compile a database of available planroom provider systems from a publically available listing, and add any additional planroom provider systems manually entered or selected by project supervisors using the project supervisor system 102. In one embodiment, a project supervisor may select one or more planroom provider systems 106 on a personal computing device or other system, and may not provide the list to the project supervisor system 102. Illustratively, the project supervisor may thus publish project information and associated project files directly to a planroom provider system 106 without involving a project supervisor system 102.

At block 612, the project supervisor system 102 publishes project information and selected files to one or more of the planrooms selected in the planroom publication selection of block 610. As discussed above with reference to FIG. 2, publishing project information and/or associated files to a planroom provider system 106 may comprise forming an association between project information and/or project files and a construction project record at the planroom provider system 106. A project supervisor system 102 may publish information and/or files to a planroom provider system 106 in any of a number of ways, including uploading or transferring information and/or files from a data store 126, causing the upload or transfer of information and/or files from another storage location (e.g., a device of a project supervisor, or a third party network storage location), selecting or identifying files already stored at a planroom provider system 106 (e.g., documents stored at a data store 132), causing physical files to be provided to a planroom provider or document entry service to be converted to an electronic form and/or transferred to a planroom provider system 106, or any other method of providing or identifying the selected files to the planroom provider system 106. In one embodiment, the project supervisor system 102 may not be directly involved in publishing information and/or files to a planroom provider system 106. For example, a project supervisor may access a planroom provider system 106 and upload, enter, identify, or transfer information or files directly from a computing device or remote storage location.

At block 614, new project creation routine 600 ends with project information and project files being published to one or more planroom provider systems 106. In one embodiment, the project information and associated files may be accessed and viewed by one or more potential bidders on the project as discussed with reference to FIG. 2 above. In other embodiments, the project information and associated files may be opened to viewing by bidders once a planroom provider system 106 and/or project supervisor or a project supervisor system 102 has determined that all necessary files have been published.

Illustratively, subsequent to publishing project files at a planroom provider system 106, a project supervisor system 102 or the planroom provider system 106 may be configured to send one or more notifications to potential bidders that may potentially be interested in the published project. For example, the project supervisor system 102 or planroom provider system 106 may maintain a list or database of potential bidders (e.g., contractors, sub-contractors, suppliers, etc.) that have shown an interest in bidding on construction projects or who have bid on construction projects through one or more systems in the past. Notifications may be sent to potential bidders based on information associated with the project (e.g., the geographical area of the project, the type of project, etc.), and/or may be sent to bidders specifically identified by a project supervisor associated with a construction project. For example, a project supervisor may select potential bidders from a list, and/or may enter electronic mail addresses or other contact information manually.

In one embodiment, a project supervisor system 102 or planroom provider system may be configured to provide a search function to identify one or more potential bidders based on associated attributes or information. Associated attributes or information associated with a potential bidder may be provided by the project supervisor system 102 or a related entity, planroom provider system 106 or a related entity, a third party bidder aggregation service, or provided by the potential bidder himself in an account or profile. For example, the project supervisor system 102 or planroom provider system 106 may allow a potential bidder to create and maintain an associated account or profile. Specifically, this account or profile may include various types of information associated with the project supervisor system 102 such as a name, description, contact information, geographic information, experience, areas of experience, past examples of work, references, or any other information that may be helpful in selecting a potential bidder to notify about a bidding project. In one embodiment, an account or profile may include a rating or feedback system allowing parties who have used a bidder in the past to provide reviews or rankings of their work. For example, a project supervisor system 102 or planroom provider system 106 may allow parties to rate a bidder (e.g., a contractor, sub-contractor, trade, supplier, etc.) in one or more categories such as quality of work, speed of work, cost, amount over/under-budget, etc. Illustratively, this rating system may be tied into the project supervisor system 102 to ensure that only project supervisors who had worked with and/or accepted bids from a particular bidder were able to rate them and/or leave feedback. Requiring a project supervisor to have worked with a bidder before leaving a rating and/or feedback for the bidder may help decrease the likelihood of false or spurious reviews.

In one embodiment, a project supervisor system 102 or planroom provider system 106 may send notifications automatically. In another embodiment, a project supervisor system 102 or planroom provider system 106 may send notifications only when instructed to by a project supervisor. In a further embodiment, a project supervisor system 102 or planroom provider system 106 may charge a fee to send notifications to one or more potential bidders on a list of potential bidders. Illustratively, this may dissuade project supervisors from sending project notifications to every potential bidder in the database or list. Illustratively, notifications to potential bidders may contain project information and/or references or links allowing a bidder to access the planroom provider system 106. In one embodiment, the references or links may include a unique key identifying the potential bidder and/or information for automatically logging the potential bidder into the planroom provider system 106 and/or project supervisor system 102.

Figure 7:
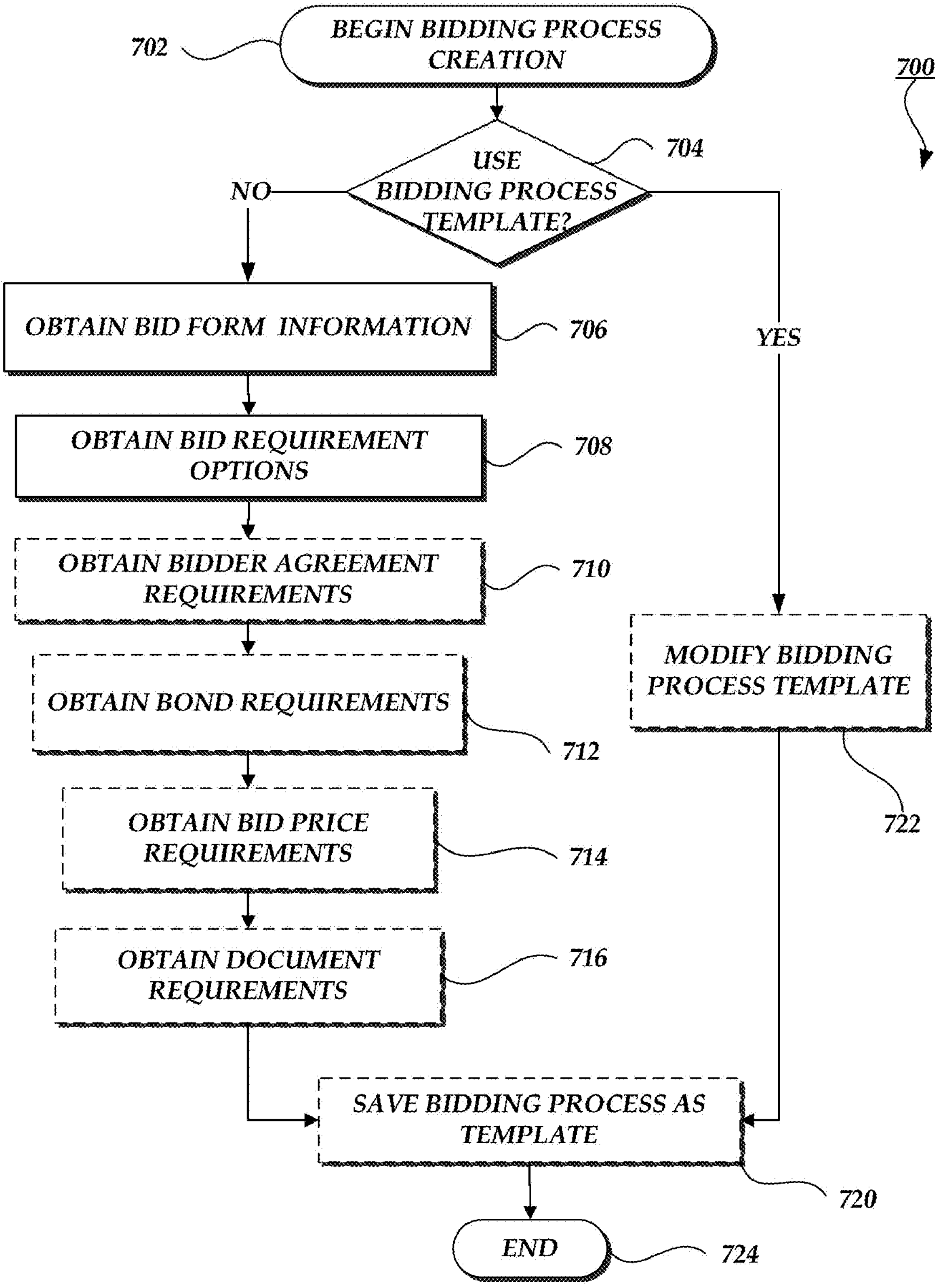
FIG. 7 is a flow diagram depicting an illustrative obtain bid requirement information routine implemented by the project supervisor system of FIG. 1.

FIG. 7 is a flow diagram depicting an illustrative bidding process creation routine 700 implemented by the project supervisor system 102 of FIG. 1. Illustratively, the bidding process creation routine 700 may begin at block 702 with a request to create a new bidding process by a project supervisor. In one embodiment, a bidding process creation routine 700 may correspond to block 506 of the illustrative project bidding routine described above with reference to FIG. 5. Bidding process creation routine 700 may include obtaining one or more aspects of bidding process information as described below. Illustratively, bidding process information may include bid form information, bidding requirement options, bidder agreement requirements, bond requirements, bid price requirement, and document requirements, among others.

At decision block 704, project supervisor system 102 determines whether to use a bidding process template. Illustratively, a bidding process template is a predefined or predetermined bidding process that has been saved as a template or model for future use. In one embodiment, the determination whether to use a bidding process template may be based on input or a selection by a project supervisor. In other embodiments, a project supervisor system may automatically select or recommend one or more bidding process templates on which to base a new bidding process. This selection or recommendation may be based on any number of factors including, but not limited to, preferences lists, characteristics of the saved business process templates, etc. For example, a project supervisor system 102 may be preconfigured with a set of ten bidding process templates, and may require that a project supervisor select an existing template rather than allowing the project supervisor to create a new bidding process from scratch. Past bidding processes may be stored and used as bidding process templates for the creation of new bidding processes, and/or new bidding processes may be created and saved as bidding process templates as described below in block 722.

If the project supervisor system 102 determines that a bidding process template should be used at block 704, bidding process creation routine 700 proceeds to block 722 to modify the bidding process template. For example, a project supervisor accessing a project supervisor system 102 may select a bidding process template on which to base a new bidding process. The project supervisor may then choose to modify one or more aspects of the bid form information or bid requirements associated with the bidding process template. Illustratively, any information or bid requirement associated with a bidding process may be modified. For example, a project supervisor may choose to modify any bid form information or bid requirements described below with respect to creating a new bidding process. After modifying the bidding process template, the project supervisor may choose to save the bidding process as a new bidding process template at block 724.

If the project supervisor system 102 determines that a bidding process template should not be used at block 704, the project supervisor system 102 proceeds to block 706 and obtains bid form information. For the purpose of example, an illustrative interface for the entry of bid form information is described below with reference to FIG. 14. Bid form information may include a bidding process name, closing conditions (e.g., a closing date and time), a bid process type, or any other kind of information associated with the bidding process as a whole. Illustratively, this information may be obtained from a project supervisor accessing the project supervisor system 102, or from any other source. In various embodiments, one or more bidding process types may be available for selection by a project supervisor. Illustratively, these bidding process types may constrain the bidding process to a particular subset of possible requirements or may otherwise define the functionality of the bidding process (e.g., standard bid process, auction, reverse auction, etc.). Illustratively, bid form information may allow potential bidders to identify the bidding process and basic information about its structure and closing conditions.

At block 708, the project supervisor system 102 obtains bid requirement options. Bid requirement options may allow a project supervisor or other party creating a new bidding process to identify one or more bid requirements that will be incorporated into the new bidding process. An illustrative interface for entering bid requirement options is provided with reference to FIG. 15 below. Bid requirement options may illustratively include information specifying the inclusion of any number of bid requirements in a bidding process. For example bid requirement options may specify that a bidding process will include one or more of any of bidder agreements, requirements that bidders have viewed specified documents, general prices, combined or separate prices, alternate prices, unit prices, cash allowances or stipulated sums, required documents, bid bonds, bid fees, bidder specifiable items or prices, or any other bid requirement that may be included in a bidding process. Illustratively, bid requirement options may be entered or provided by a project supervisor, or may be determined, obtained, or generated from any other source. In one embodiment, bid requirement options may be utilized by the project supervisor system 102 to determine which bid requirements to obtain from a project supervisor or other source. For example, bid requirement options may be used to determine which of optional blocks 710, 712, 714 and 716 are required for the creation of a particular bidding process.

At optional block 710, the project supervisor system 102 obtains bidder agreement requirements. Illustratively, bidder agreement requirements may include agreements or other information or documentation that a bidder must agree to or read before submitting a bid. For example, bidder agreement requirements may include a contractual agreement specifying or defining the rights and expectations of a bidder, specifying requirements for satisfactory performance, attesting that a bidder has met certain requirements or reviewed certain addenda or documents, or any other information or agreement that a bidder must agree to before submitting a valid bid. In various embodiments, one or more aspects of bidder agreement requirements may be entered by a project supervisor or obtained, determined, or generated from any other source. For example, bidder agreement requirements may be entered by a project supervisor as part of the process of defining bid requirement options as depicted in the illustrative interface of FIG. 15

At optional block 712, the project supervisor system 102 obtains bond requirements. Illustratively, bond requirements may include a requirement that a bid bond be issued for a valid bid, and/or may specify various requirements that a bid bond must meet. In various embodiments, bid bond requirements may be entered by a project supervisor or obtained, determined, or generated from any other source. An illustrative process for obtaining a bid bond is described above with reference to FIG. 4 and below with reference to FIG. 10.

At optional block 714, the project supervisor system 102 obtains bid price requirements. Bid price requirements may correspond to any price information required for a valid bid, and may illustratively include any price information discussed below with reference to FIG. 8. For example, bid price requirements may include requirements that a bidder provide any combination of one or more general prices, combined or separate prices for one or more aspects of the project, alternate prices for one or more aspects of the project, unit prices for one or more aspects of the project, cash allowances or stipulated sums for one or more aspects of the project, or other any other price information required for a valid bid. In various embodiments, bid price requirements may be entered by a project supervisor or obtained, determined, or generated from any other source.

At optional block 716, the project supervisor system 102 obtains document requirements. Document requirements may correspond to any documents, files, or other information required for a valid bid. For example, a bid process may require that a bidder enter references or information on other completed construction projects, designs or specifications for a particular aspect of a project, proposals to deal with an aspect of the construction process, or any other information related to the bidder, bid, project, project supervisor, or project performance. In various embodiments, document requirements may be entered by a project supervisor or obtained, determined, or generated from any other source. Illustratively, once document requirements and/or any other bid requirements have been obtained, the bidding process has been fully defined, and may be saved and opened to bidding, and/or saved as a bidding process template.

At optional block 720, the project supervisor system 102 may optionally save the completed bidding process as a bidding process template. A bidding process saved as a bidding process template may be stored at the project supervisor system 102 or any other storage location and may be used in the future as the basis for creating a new bidding process as described above with reference to blocks 704 and 722. In one embodiment, a project supervisor system 102 may optionally save all completed bidding processes as bidding process templates. Illustratively, this would allow a project supervisor to easily select any past bidding process to use as the basis for creating a new bidding process. In another embodiment, a project supervisor system 102 may allow a project supervisor to save a specific bidding process optionally as a template as one of the steps in the bidding process creation routine. A project supervisor may also be allowed to modify and delete existing bidding process templates. Illustratively, this may allow a project supervisor to manage bidding process templates directly and maintain a select group of templates to use when creating future bidding processes. Saving a bidding process as a bidding process template may create a new copy of a bidding process, and may not preclude the bidding process being used (e.g., opened for bidding). For example, a project supervisor may create a bidding process for a new project and decide that he would like to save the bidding process as a bidding process template. The project supervisor may save the bidding process as a bidding process template, and then proceed to open the bidding process for bidding. The project supervisor may later use the bidding process template saved from the bidding process as the basis for one or more new bidding processes.

At block 724, the bidding process creation routine ends, having defined a new bidding process. Illustratively, the bidding process may now be opened up in order to obtain bids from one or more bidders.

Figure 8:
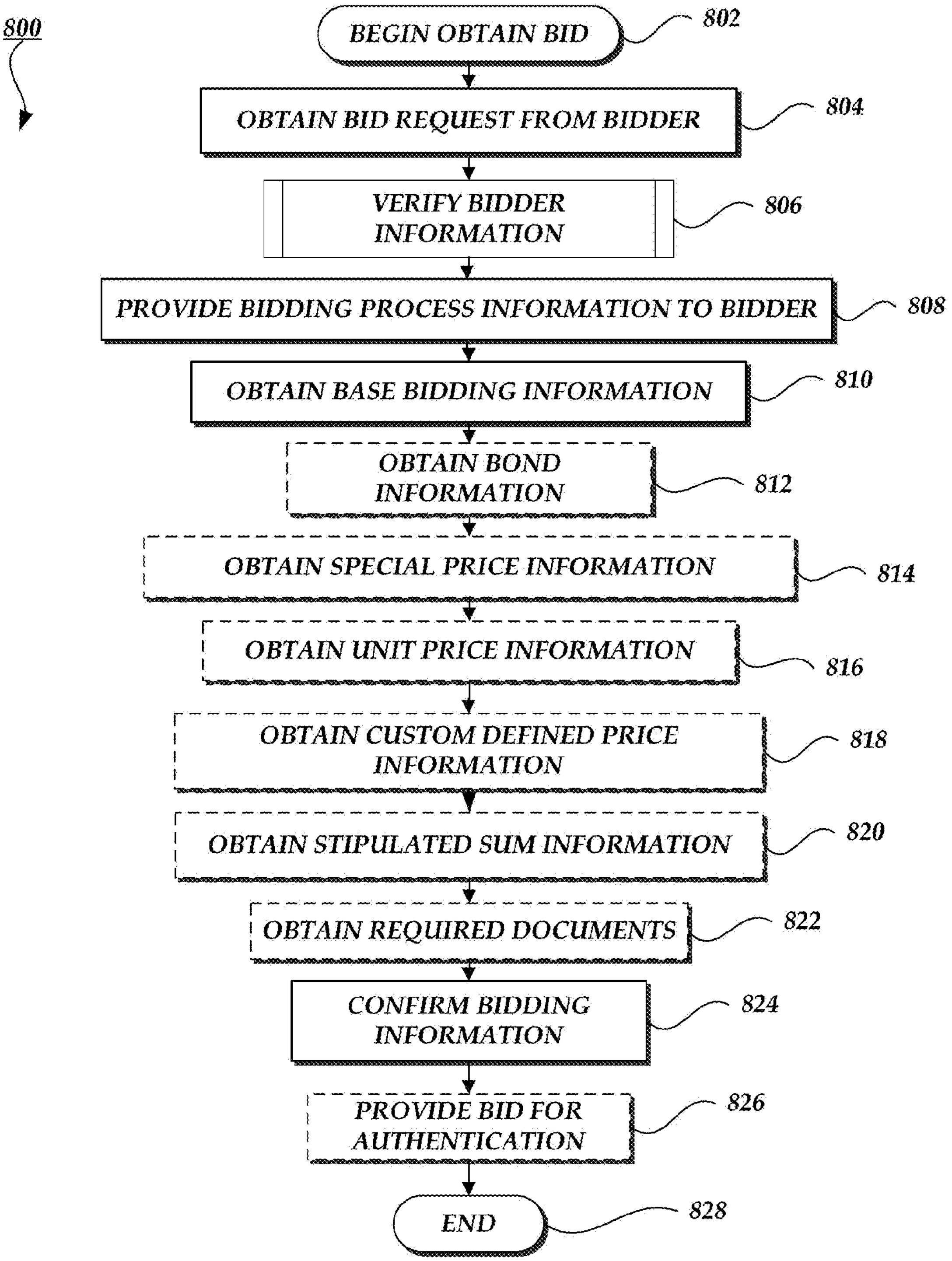
FIG. 8 is a flow diagram depicting an illustrative obtain bid routine implemented by the project supervisor system of FIG. 1.

FIG. 8 is a flow diagram depicting an illustrative routine 800 implemented by the project supervisor system 102 of FIG. 1 for obtaining bids. Routine 800 begins at block 802. Illustratively, routine 800 may be performed subsequent to a bidding process being opened as described above with reference to FIG. 2. At block 804, the project supervisor system 102 receives a bid request from a bidder associated with a potential bidder and in communication with the project supervisor system 102 over a network 138 or other electronic means. As described above, in one embodiment the bid request may be the result of a potential bidder following a link or other reference from a planroom provider system 106. Illustratively, a bid request may specify a particular project and/or bidding process on which the potential bidder wishes to bid.

At block 806, project supervisor system 102 verifies bidder information. Illustratively, a project supervisor system 102 may require that a bidder's identity or corresponding information be verified or authenticated before entering a bid for a project. An illustrative routine for bidder verification is described below with reference to FIG. 9.

At block 808, project supervisor system 102 provides bidding process information to a bidder system 108. Illustratively, bidding process information may include bid form information and bid requirements as discussed above with reference to FIG. 7. For example, a project supervisor system 102 may provide a name and closing date for a bidding process, and may further provide a set of bid requirements specifying what types of information will be required for a valid bid. Illustratively, bidding process information may be provided to and processed by a bidder system 108, or bidding process information may be provided or suggested indirectly by the choice of bidding interfaces provided to a bidder system 108. For example, bidding process information may be processed by the project supervisor system 102, which then generates and sends a specific series of browser interfaces to a bidder client 136 associated with the bidder system 108. As another example, bidding process information may be used by a bidder system 108 or a project supervisor system 102 to determine which of optional blocks 812-822 should be part of the bidding process, as described below. In one embodiment, interfaces requesting or otherwise dealing with bidding information determined to not be a part of the bidding process may not be provided to a potential bidder. In other embodiments, bidding information obtained from a bidder but determined to not be a part of the bidding process may not be accepted by a project supervisor system 102.

Blocks 810-824 relate to obtaining bidding information from a bidder system 108. Illustratively, bidding information may include base bid information, special price information such as separate or alternative price information, unit price information, one or more custom defined prices, stipulated sum information, one or more documents associated with the bid, bond information, and/or bid confirmation information. In various embodiments, the bidding information may be based on bid process information as described with reference to FIG. 7 and above. Although blocks 810-824 are depicted herein in a particular order for purposes of illustration, it will be understood to one of skill in the art that any aspect of the functionality described herein may be implemented and/or presented in any order, and may be distributed across any number of functional blocks, steps, or interfaces or may be excluded from routine 800 entirely.

With regards to block 810, base bidding information is obtained from a bidder through a bidder system 108. Base bidding information may include the identification of a developer or other project entity to bid to, and may further include one or more base or overall bid prices including, but not limited to, a summarized or aggregated price for the whole project, an estimated project bid price, or a base price for a project without any optional costs or savings. Base bidding information may be entered into a bidding interface by a bidder at a bidder system 108, a project supervisor system 102, or obtained from any other source. An illustrative interface for entering base bidding information is described below with reference to FIG. 22.

At optional block 812, a project supervisor system 102 may obtain bond information and attach an issued bond to a bid. Illustratively, bond information may include a bid security or bid bond required by the bid process for a valid bid on the project. As discussed above with reference to FIG. 4, a bid bond may represent a third party guarantee that the bidder will undertake the project if the bid is successful. In one embodiment, a bid bond may be uploaded, mailed, or otherwise provided by a bidder to a project supervisor system 102 through a bidding interface at a bidder system 108, an interface provided by project supervisor system 102, and/or any other delivery system. In another embodiment, a bid bond previously associated with the bidder at a project supervisor system 102 may be selected, attached, or provider by the bidder or automatically selected by the project supervisor system 102. An illustrative routine for creating a bid bond and associating it with a potential bidder is described below with reference to FIG. 10. An illustrative interface for attaching an associated bid bond is described below with reference to FIG. 27.

At optional block 814, a project supervisor system 102 may obtain special price information, including, but not limited to, alternative price information, separate price information, and/or combined price information. Special price information may include one or more prices for project alternatives not included in the base project or base bid. For example, a project for construction of a new apartment building may include two sets of plans, one including a 100 car basement parking garage, and another including an additional fifty parking spaces in an above-ground structure. A bidding process for the apartment building project may require that the bidder give a base bid for the apartment building including the basement garage, and an additional alternative price for inclusion of the above-ground structure in the project. As another example, plans may call for a deck, and a bidding process may require that a bidder give a base bid including the deck, and a separate price corresponding to any cost savings associated with the option of excluding the deck from the project. Various other kinds of special price information may be added to or deducted from a base bid, or may be included for any other purpose, such as to break out individual costs already accounted for in a base bid price. In some embodiments, as specified in bid requirements associated with the bid process, a bidder may be able to enter one or more of his own project alternatives and corresponding special price information. Illustratively, alternative price information may be entered into a bidding interface by a bidder at a bidder system 108, a project supervisor system 102, or obtained from any other source. An illustrative interface for entering special price information is described below with reference to FIG. 23.

At optional block 816, the project supervisor system 102 may obtain unit price information. Illustratively, unit price information may include prices for any individual or group of goods or services used or associated with a project. For example, a bidding process may specify that unit prices be provided for materials (e.g., specified quantities of concrete, gravel, roofing material, etc.), loose or installed components or fixtures (e.g., lights, windows, fittings, etc.), costs for labor, specialized work such as electrical or plumbing installations, or any other service or good associated with a project. In some embodiments, as specified in bid requirements associated with the bid process, a bidder may be able to enter one or more of his own units associated with a project and corresponding unit price information. Illustratively, unit price information may be entered into a bidding interface by a bidder at bidder system 108, project supervisor system 102, or obtained from any other source. An illustrative interface for entering unit price information is described below with reference to FIG. 24

At optional block 818, the project supervisor system 102 may obtain custom defined price information. Illustratively, custom defined price information may include any additional price information or terms associated with one or more work items or aspects of a project. In one embodiment, custom defined price information may be defined by a project supervisor, or may be generated or drawn from any other source.

At optional block 820, the project supervisor system 102 may obtain stipulated sum information. Illustratively, stipulated sum information may include a stipulated sum of money to be expended on a specific work item included in the project. For example, a stipulated sum may specify an amount of money already included in the base bid but specifically marked for the purchase and installation of a fire system, elevator or other major fixture or aspect of a project. Stipulated sum information may further include contingency funds, such as funds to pay for extra work or cost overruns in the project. In some embodiments, as specified in bid requirements associated with the bid process, a bidder may be able to enter one or more of his own stipulated areas or aspects associated with a project and corresponding stipulated sum information. Illustratively, stipulated sum information may be entered into a bidding interface by a bidder at a bidder system 108, a project supervisor system 102, or obtained from any other source. An illustrative interface for entering stipulated sum information is described below with reference to FIG. 25

At optional block 822, project supervisor system 102 may obtain one or more required documents or other required information associated with a project. Illustratively, required documents may include addenda, specifications, plans, proposals, bidder information, appendices to a bid, and/or any other documents or information required or associated with a bidder, project entity, bid, or project. In some embodiments, as specified in bid requirements associated with the bid process, a bidder may be able to provide one or more of his own documents or information associated with his bid on the project. Illustratively, project documents may be uploaded or otherwise transmitted by a bidder to a project supervisor system 102 through a bidding interface at a bidder system 108, a project supervisor system 102, or obtained from any other source. An illustrative interface for uploading required document is described below with reference to FIG. 26

At block 824, the project supervisor system 102 may confirm the bidding information entered or provided by the bidder. Illustratively, confirmation may include providing the bidder with all submitted bidding information or a summary of all submitted bidding information for the bidder to confirm. In some embodiments, any agreement requirements specified in the bid requirements may be presented with other bidding information for the bidder to read, approve, and/or record his agreement to. An illustrative interface for confirming bidding information is described below with reference to FIG. 28.

Illustratively, if all required bidding information has not been properly entered, a bidder may be prevented from confirming the bid. For example, if a required unit price has not been entered or an agreement has not been agreed to by the bidder, the project supervisor system 102 may cause the bidder system 108 to display an error message or otherwise provide an error to the bidder. In another example, an interface at bidder system 108 may inactivate a confirmation button or otherwise prevent the bidder from confirming the bid. Illustratively, error checking and validation of bid information may be performed at bidder system 108 or performed at project supervisor system 102. In one embodiment, project supervisor system 102 may no longer accept bids submitted subsequent to one or more bidding closing conditions being met.

A bidder may be presented with any number of options for bid confirmation. For example, a bidder may be provided with an option of officially confirming and entering a bid, saving bid information for later confirmation, and/or forwarding saved bid information to another party, among others. For example, a bidder with all required bidding information who is waiting for a bid bond to issue may choose to save the provided bid information until the bond is granted. As another example, a bidder may be an low level agent associated with a contracting firm, and may be required by firm policy to save bidding information and forward the completed (but not confirmed) bid to a supervisor to confirm. Illustratively, forwarding a bid may cause project supervisor system 102 or bidder system 108 to send a notification message to the forwarded party. In one embodiment, this notification message may have a reference or link to the completed bid information for review. Illustratively, options to save bidding information and/or forward a bid may be provided even though the bid lacks one or more pieces of required bidding information.

In one embodiment, a bidder may be required to provide digital authentication information such as an electronic signature, a digital certificate, or a digital seal before confirming the bid in order to allow the project supervisor system 102 to verify the bidder's identity. For example, a digital certificate, and/or seal may have been provided to the bidder when initially verifying his identity with the project supervisor system, or may be provided by any other third-party authentication service. Illustratively, requiring the bidder to present the digital authentication information before confirming the bid may discourage false bids, and may prevent a bidder from later claiming that a bid was submitted without his knowledge. In various embodiments, any other form of digital authentication may be used to verify the bidder's identity as known in the art.

Once a bid is confirmed, the bidding information and/or any associated information about the bidder may be stored at a data store 126 associated with a project supervisor system 102 or any other third party data store, bid depository, or other storage location. The bidding information and/or associated bidder information may be automatically mirrored to multiple locations, backed up in physical or electronic form, or otherwise protected or maintained according to any technique known in the art. Illustratively, data protection may prevent against information loss or bid tampering. Optionally, at block 826, one or more aspects of the confirmed bid information or digital authentication may be provided to a third party bid authentication service. Illustratively, a third-party authentication service may perform a more in-depth verification of the bidding prices and information provided by the bidder than the automatic verification provided by the project supervisor system 102 and/or bidder system 108 as discussed above.

At block 828, obtain bid routine 800 ends. As discussed above with reference to FIG. 5, one or more aspects of bidding information corresponding to confirmed bids may not be available to a project supervisor or other party prior to the close of bidding. For example, a project supervisor may only have access to the names of bidding parties, bid amounts, or other limited information. In one embodiment, a project supervisor may be unable to access any confirmed bidding information prior to the close of bidding. Illustratively, access to bidding information may be set by a project supervisor when creating the bidding process, and/or may be defined by the project supervisor system 102. In one embodiment, access to bidding information may be restricted in order to comply with local or national law, association rules, or other rules or regulations.

Figure 9:
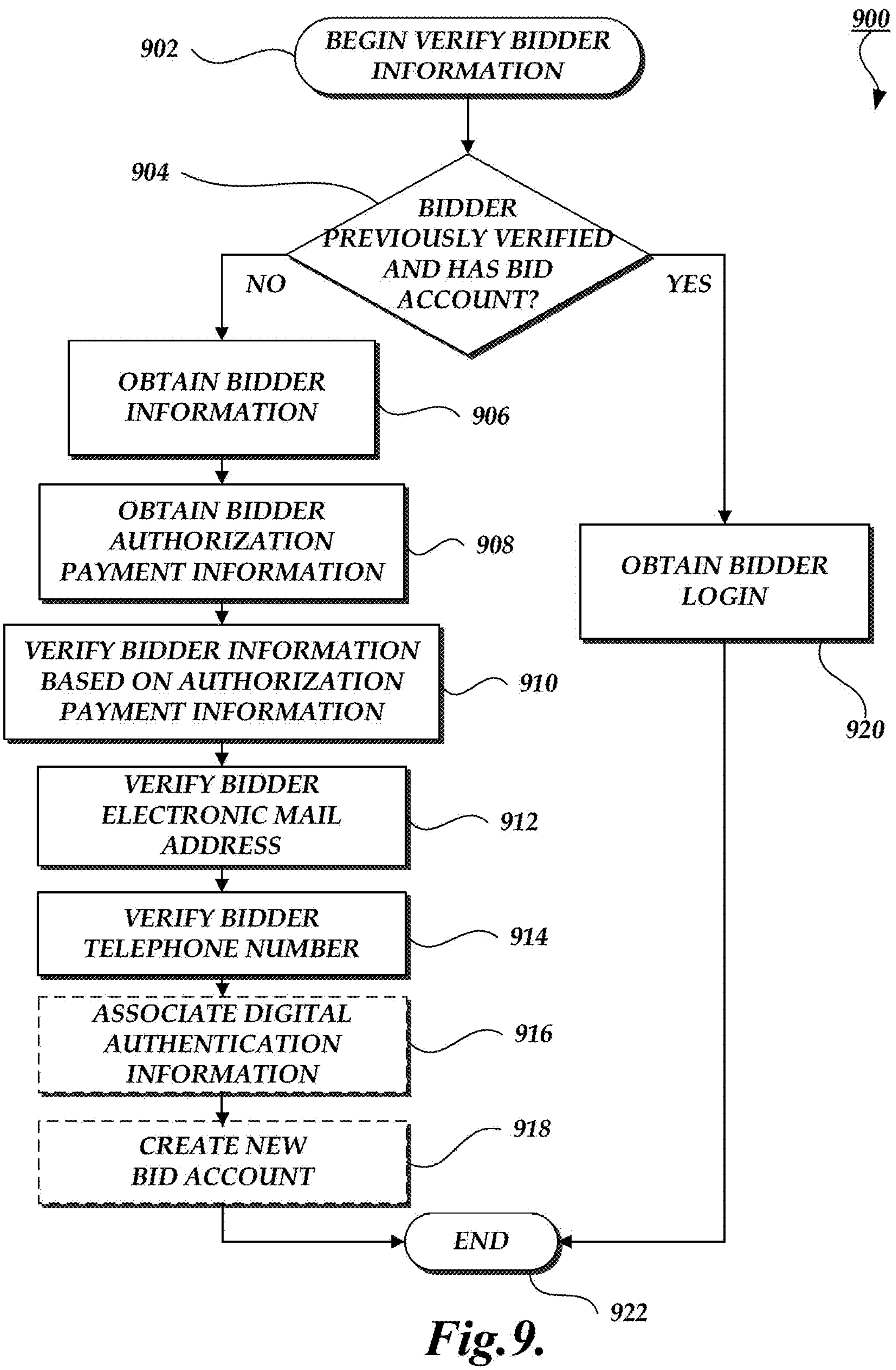
FIG. 9 is a flow diagram depicting an illustrative bidder information verification routine implemented by the project supervisor system of FIG. 1.

FIG. 9 is a flow diagram depicting an illustrative bidder information verification routine 900 implemented by the project supervisor system 102 of FIG. 1. Routine 900 begins at block 902. Illustratively, routine 900 may be performed in response to a potential bidder requesting permission to bid on a project at project supervisor system, or any other verification request by a bidder or component of project supervisor system 102. In one embodiment, routine 900 may correspond to block 806 of FIG. 8 as discussed above.

At decision block 904, project supervisor system 102 determines whether the potential bidder being verified has been previously verified and has created a bid account with project supervisor system 102. For example, a bidder may have recently bid on another project at project supervisor system 102 that required him to go through the verification process. Illustratively, project supervisor system 102 may allow a verified bidder to create an account in order to memorialize the results of the verification process. For example, a previously verified bidder with an account may not have to submit to verification for subsequent bids. In some embodiments, the project supervisor system 102 may retrieve previously entered bidder information associated with an account rather than require its reentry by the bidder.

Illustratively, each bid process may require verification of the same or different information by a potential bidder as any other bidding process and/or may require the same or a different validation process for any piece of bidder information. For example, a potential bidder for a first bidding process may be required to verify a telephone number and an e-mail address, while the same potential bidder for a second bidding process may be required to verify a telephone number, e-mail address, financial account, and undergo a full background check by a third-party authenticator. In one embodiment, the scope of bidder information to be verified may be automatically determined by a project supervisor system 102 based one or more properties of the construction project (e.g., whether the project is a government project, whether the project is high-profile or sensitive, whether the anticipated cost of the project is over one or more threshold values, etc), or one or more properties of a bidder (e.g., whether the bidder is local or from another region, etc.). In another embodiment, the scope of bidder information to be verified may be defined by a project supervisor and/or other entity or agent associated with the project.

Illustratively, the project supervisor system 102 may maintain previous verification results associated with a bidder indefinitely, may require new verification after a fixed or dynamically determined time-period, and/or may require the payment of a fee to maintain a bidder account and/or verification results. For example, a project supervisor system 102 may associate a verification result for a particular bidding process with a unique key, and may allow a bidder with a valid key to re-enter the bidding process without resubmitting to verification (e.g., if the bidder had previously started but not finished a bidding process). Illustratively, the unique key may only be valid for the specific bidding process it was generated for. In other embodiments, a bidder may create an account that is valid for a particular period of time, indefinitely, and/or for a defined number of bids. In one embodiment, an account or key may only be associated with a subset of required verification information, and a potential bidder with an account may have to re-verify some or all associated information to bid. In one embodiment an account or key may be associated with a digital certificate, seal, signature, or other form of digital authentication information.

If project supervisor system 102 determines that the potential bidder was previously verified and has an extant account, project supervisor system 102 proceeds to block 920 to obtain login information for the bidder. In one embodiment a potential bidder may be prompted for login information before the project supervisor system 102 determines that the bidder has an extant account. In another embodiment, a potential bidder may select whether to proceed with a verification process or enter a bidder login.

If project supervisor system 102 determines that the potential bidder was not previously verified and/or does not have an extant account, routine 900 may proceed to block 906 and obtain bidder information. Illustratively, project supervisor system 102 may obtain any kind of information associated with the potential bidder, including but not limited to a company name, a bidder name, an electronic address, a phone number, a fax number, an address, etc. Project supervisor system 102 may additionally require a login, password, or other information associated with a new bidder account. Bidder information may be obtained by project supervisor system 102 through an interface accessed by the potential bidder at bidder system 108, or through any other interface or means. An illustrative interface for entering bidder information is discussed below with reference to FIG. 17.

At block 908, project supervisor system 102 may obtain bidder authorization payment information. Bidder authorization payment information may include any information required to process a payment from the potential bidder, including but not limited to financial account information (e.g., financial account numbers, payment codes, etc), a payment amount, signature or certification information, etc. In one embodiment, a bidder may be required to reenter one or more pieces of information entered at block 906 above. In another embodiment, project supervisor system 102 may not require a bidder to reenter information. As discussed below with regards to block 910, the bidder authorization payment information may be used by the project supervisor system 102 to verify the veracity of one or more pieces of information with a third party financial institution. Illustratively, bidder authorization payment information may be entered by a bidder through the same interface as discussed at block 906 above, or may be entered through any other interface or means provided by bidder system 108, project supervisor system 102, or any other system or entity.

At block 910, project supervisor system 102 may verify bidder information based on the authorization payment information. Illustratively, project supervisor system 102 may require that a potential bidder pay a fee through a third party financial services provider. Illustratively, the payment of a fee through a third party may allow project supervisor system 102 to verify the accuracy of bidder authorization payment information entered at block 908 as discussed above. For example, if a payment through the third party is successful, this may be an indication that one or more pieces of the bidder authorization payment are valid. In one embodiment, subsequent to a successful payment being transacted, project supervisor system 102 may reverse the transaction or otherwise return the payment used for verification. In another embodiment, the verification payment may be non-refundable. For example, the payment used to verify information may be treated as a fee for bidding, applied to bidder account fees, or treated as part of any other category of payment.

In one embodiment, the project supervisor system 102 may verify that a required deposit is present in an account associated with the potential bidder. For example, a bidding process may require that the potential bidder submit a $1,000 deposit in order to bid on the project. Illustratively, this deposit may be in lieu of or in addition to a bid bond. At block 910, the project supervisor system 102 may place a hold on $1,000 in the account of the potential bidder corresponding to the bidder authorization payment information. The project supervisor system 102 may thus be able to ensure that the potential bidder has sufficient funds to cover the deposit amount. Illustratively, losers of the bidding process may have the hold removed once bidding has closed. Although $1,000 is used here for purposes of illustration, one of skill in the relevant art will appreciate that a required deposit may be any value.

At block 912, project supervisor system 102 may verify a bidder electronic mail address. In one embodiment, verification of a bidder electronic mail address may comprise obtaining information sent to an electronic mail address provided by a bidder. For example, a bidder may enter and/or provide an associated electronic mail address as discussed in block 906 above. Illustratively, project supervisor system 102 may cause an alphanumeric code, verification link, verification file, or any other piece of verification information to be sent to the provided electronic mail address. An alphanumeric code may include any combination of letters, numbers, and/or other characters. The bidder may be required to enter, access, upload, or otherwise provide this verification information to the project supervisor system 102 in order to verify that he has access to the provided electronic mail address. For example, a bidder may receive an alphanumeric code at his electronic mail address along with instructions to enter the code into a verification interface provided by bidder system 108 or project supervisor system 102. In one embodiment, a bidder may have to additionally or alternatively send a message from the provided electronic mail address to an electronic mail address associated with a project supervisor or project supervisor system 102. Although verification of an electronic mail address is described here for purposes of illustration, one of skill in the relevant art will appreciate that a similar technique may be used to verify any number of additional messaging systems known in the art, including SMS, MMS, etc.

At block 914, project supervisor system 102 may verify a bidder telephone number. In one embodiment, verification of a bidder telephone number may comprise manually or automatically calling a telephone number provided by a bidder and conveying an auditory code or other verification information. Illustratively, the bidder may be required to enter or otherwise provide this verification information to the project supervisor system 102 in order to verify that he has access to the provided telephone number. For example, a bidder may provide project supervisor system 102 with a telephone number as discussed above with reference to block 906. Project supervisor system 102 may then cause an automated call to be placed to the provided telephone number. Subsequent to the bidder answering the automated call, an automated call service may read an auditory code and/or instructions to verify the telephone number. Illustratively, the bidder may subsequently enter the code or follow the instructions in order to verify that he received the call. An illustrative interface for entering an electronic mail and phone verification code is provided below with reference to FIG. 19.

At optional block 916, the bidder may a bidder may be associated with digital authentication information such as an electronic signature, a digital certificate, or a digital seal before confirming the bid in order to allow the project supervisor system 102 to verify the bidder's identity. For example, a digital certificate, and/or seal may have been generated and associated with the bidder by the project supervisor system 102 or by any other third-party authentication service. In various embodiments, any other form of digital authentication may be used to verify the bidder's identity as known in the art.

At optional block 918, the bidder may create a new bid account. Illustratively, the new bid account may allow a simplified verification process when bidding in the future, may affect future bidding fee requirements, or may have any other benefit, for example as described above with reference to blocks 904 and 920. Creating a new bid account may require new account information to be provided to the project supervisor system 102 by the bidder. Illustratively, this new account information may include, but is not limited to, any type of bidder information discussed previously with regards to blocks 904-914, an account login, an account password, bidder system identification information such as a network identifier (e.g., IP address), hardware identifier, or any other information associated with the bidder or bidder system. The project supervisor system 102 may create a new account based on the bidder information and/or may associate any other verification information with the account as described above with regard to blocks 904-914.

In one embodiment, additionally or as an alternative to the verification process described above, one or more aspects of bidder information may be provided to a third-party authenticator (e.g., a third-party records service, a background check service, etc.). Illustratively, authentication by a third-party authentication process may be required before the bidder is allowed to bid, and/or may be conducted in parallel with the bidder participating in the bidding process. In one embodiment, a bidder may be allowed to bid on the construction project while the results of a third-party authentication are pending. If the bidder fails the third party authentication process (e.g., the third-party authenticator finds that the bidder has falsified one or more pieces of bidder information), the bidder's completed bid may be marked as invalid, or may be otherwise tagged with the results of the third-party authentication.

In another embodiment, additionally or as an alternative to the verification process described above, an issued bid bond may be required to satisfy one or more elements of the bidder verification process. An illustrative routine for bid bond issuance is described below with reference to FIG. 10. At block 922, subsequent to the verification process and/or login process, the verify bidder information routine 900 ends. In one embodiment, a bidder may now proceed with the bidding process as described above with reference to FIG. 8 et al.

Figure 10:
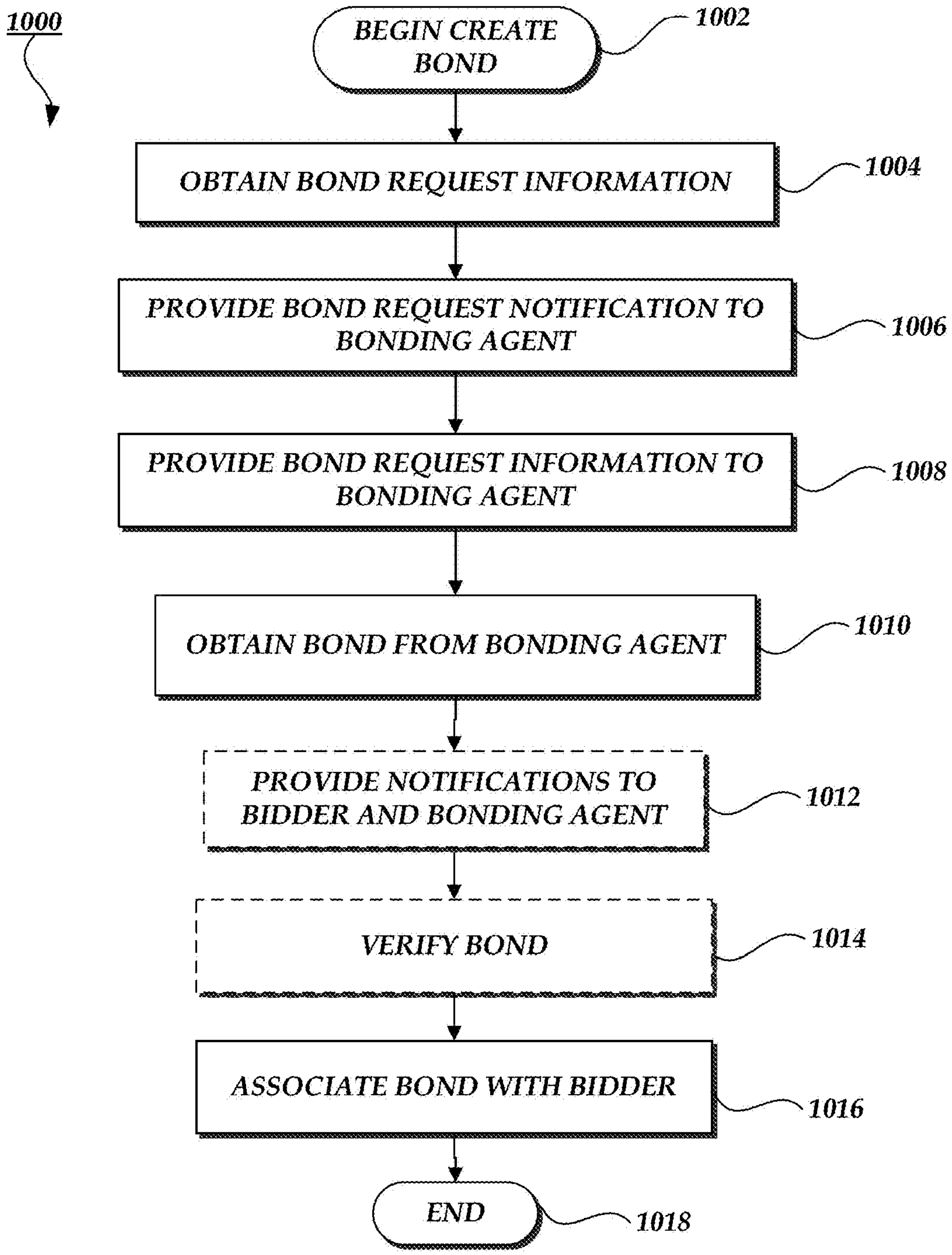
FIG. 10 is a flow diagram depicting an illustrative bond creation routine implemented by the project supervisor system of FIG. 1.

FIG. 10 is a flow diagram depicting an illustrative bond creation routine 1000 implemented by the project supervisor system 102 of FIG. 1. Routine 1000 begins at block 1002. Routine 1000 may be performed in response to a request, bidding requirement, and/or any other type of system event calling for a bid bond associated with the bidder. At block 1004, project supervisor system 102 obtains bond request information. Illustratively, project supervisor system 102 may obtain bond request information through an interface provided by bidder system 108, or through any other interface, system, or component. Bond request information may include any information required by a bonding agent in order to issue a bid bond for a prospective bid. For example, bond request information may include information associated with the bidder, the project, the prospective bid, etc. Illustratively, a bidder may also provide an electronic mail address or other contact information of a bonding agent. As discussed above, contact information may be entered or selected from a predefined or determined list. An illustrative interface for entering bond request information is provided below with reference to FIG. 20. In one embodiment, bidder information already provided to the project supervisor system 102 at another stage in the bidding process (e.g., information verified as discussed in FIG. 9 above) may be automatically obtained or utilized for the purposes of bond issuance.

At block 1006, the project supervisor system 102 provides a bond request notification to a bonding agent. For example, the project supervisor system 102 may send an electronic message or other form of notification to a bonding agent as described in FIG. 1 above. In various other embodiments, project supervisor system 102 may send a physical letter via post office mail, or may send an electronic message or other notification to any other electronic mail address or location as specified in the contact information entered at block 1004 above.

At block 1008, the project supervisor system 102 provides bond request information to the bonding agent. Illustratively, this information may comprise the bond request information obtained at block 1004 above, a subset of this information, and/or any other bidder information required by the bonding agent for bond issuance. In one embodiment, the bond request information may be included in the electronic message provided in block 1006. In another embodiment, the electronic message provided to the bonding agent in 1006 may include a link or other reference to project supervisor system 102 to provide bond request information.

Illustratively, a bonding agent following a provided link or other reference may cause project supervisor system 102 to provide a browser page or other interface to the bonding agent system 104. Illustratively, the browser page or interface may provide various aspects of the bond request information to the bonding agent. The project supervisor system 102 may additionally or alternately provide functionality for the bonding agent to create an account with project supervisor system 102 and/or to upload or otherwise provide a bond to the project supervisor system 102 at block 1010. In one embodiment, a link or other reference may include information to automatically log the bonding agent into project supervisor system 102, or may take the bonding agent to an account creation interface. In other embodiments, a project supervisor system 102 may not require that a bonding agent have an account with the project supervisor system 102 in order to issue a bond.

At block 1010, the bonding agent may examine the provided bond request information and determine whether to grant a bid bond. The bonding agent may upload or otherwise provide an electronic copy or representation of the bond to project supervisor system 102 through bonding agent system 104 or other system or component. An illustrative interface for providing bond request information and bond upload functionality is described below with reference to FIG. 21. Illustratively, an electronic copy of a bond may be in any electronic format known in the art (e.g., text format, PDF, HTML, etc), and may include any form of digital authentication known in the art (e.g., a digital seal, signature, or certificate). In one embodiment, a bonding agent may be required to register, create a paid or unpaid account, or enter into another form of trust relationship with the project supervisor system 102 and/or one or more associated entities. Illustratively, with regards to this specific embodiment, the bonding agent may be required to provide a digital seal, signature, or certificate as discussed above in order to allow the project supervisor system 102 to verify the bonding agent's identity. Illustratively, the digital seal, signature, or certificate may be provided to the bonding agent by the project supervisor system 102 or a related system or entity when entering into the trust relationship, or may be provided by a third party authentication system. In one embodiment, a project supervisor system 102 may require particular document formats or formatting. In some embodiments, a bonding agent may have an option or be required to provide a physical of a bond document in the mail. Illustratively, a physical copy may be required as an alternative to or in addition to an electronic copy.

At block 1012, project supervisor 102 may provide notification to the bidder and/or the bonding agent that the bid bond has been successfully obtained. Illustratively, this notification may be provided by means of an electronic message or other communication provided to bidder system 108, bonding agent system 104, or other system or component.

Subsequent to receiving the bond from the bonding agent, the project supervisor system 102 may optionally verify the bond at block 1014. In various embodiments, this may include submitting a copy of the bond to a third-party verification entity, and/or may include automatically or manually verifying the identity of the bonding agent, the status of the bond, and/or any other information pertinent to the bond issuance process. In one embodiment, the verification process may be simplified if a bidder was presented with a limited choice of pre-vetted bonding agents as described with relation to FIG. 4 above. At block 1016, the project supervisor system 102 may associate the newly issued bond with the bidder. In one embodiment, prior or subsequent to associating the newly issued bond with the bidder, the bidder may be required to digitally sign or otherwise authenticate the newly issued bond in order to ensure its authenticity. Illustratively, the bidder may provide his verification of the issued bond through an electronic signature, digital certificate, or any other authentication methodology as known in the art. Illustratively, associating a bond with a bidder may include establishing a logical or other relation between the bond and the bidder in order to allow the bidder to access and/or associate the bond with his prospective bid. In one embodiment, a bidder may select an associated bond to associate with his bid at a later stage of the bidding process. An illustrative example of a bid bond selection interface is described below with relation to FIG. 27. Bond creation routine 1000 ends at block 1018.

FIGS. 11-28 depict illustrative user interfaces that may be used to provide or obtain various types of data or information associated with a project, bidding process, or other bidding management routine or system. The interfaces depicted are intended to be an illustrative representation of concepts and elements discussed herein, and are not intended to define or otherwise limit the invention to a particular form or scope. Illustratively, the interfaces described may be provided and/or presented by project supervisor system 102, bonding agent system 104, planroom provider system 106, bidder system 108 or any other device, component, or system provided or associated with any entity or actor described herein.

Figure 11:
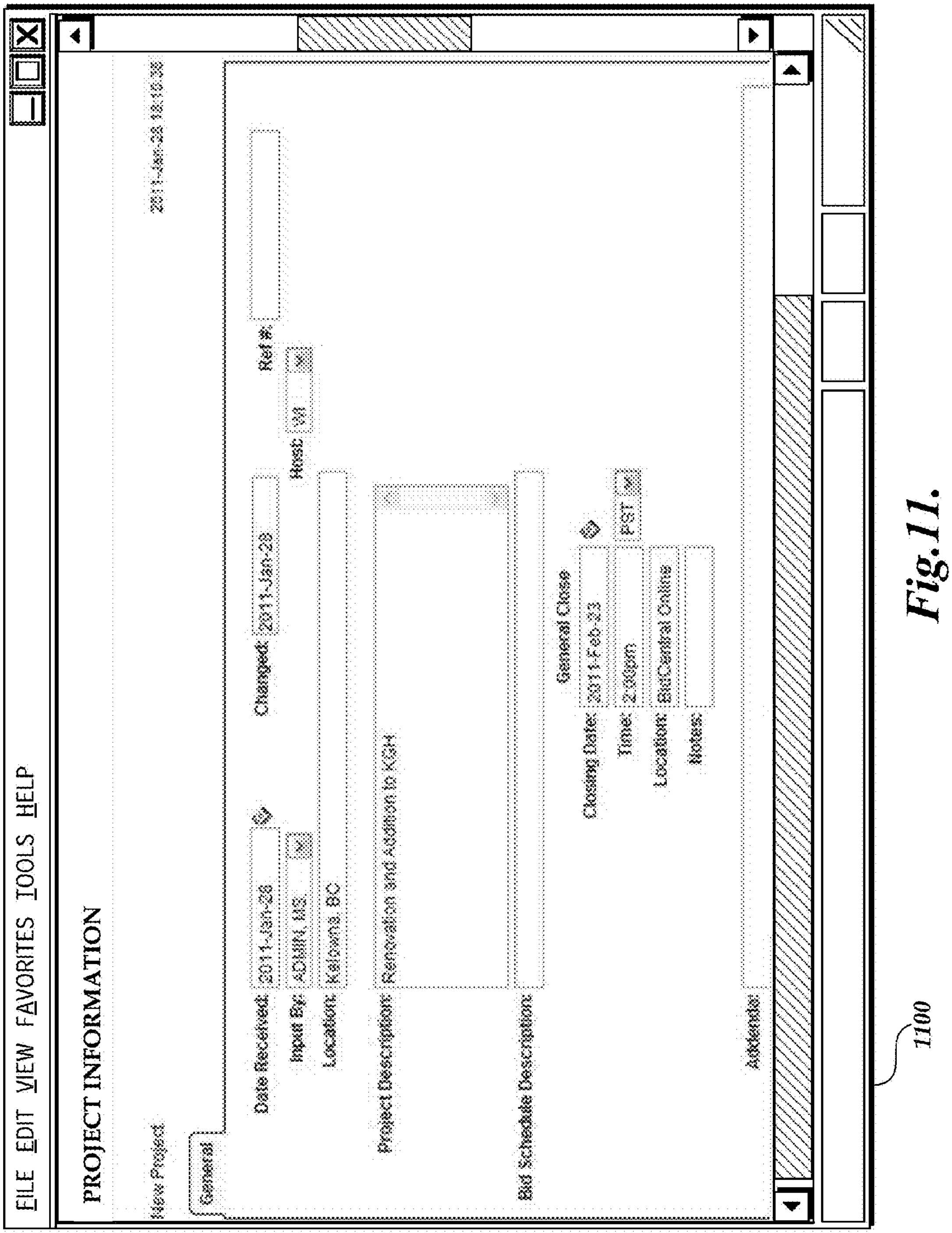
FIG. 11 depicts an illustrative user interface that may be used to enter new project information.

As an illustrative example, a project supervisor may begin an illustrative project and bidding process creation routine by creating a new construction project at project supervisor system 102. FIG. 11 depicts an illustrative user interface 1100 that may be used to enter new project information. Illustratively, the user interface 1100 may be provided by project supervisor system 102 and/or accessible through a browser running on a device or component associated with the project supervisor. The user interface 1100 may include fields to enter project dates, project reference numbers or names, a project creator identifier, a project location, a project description, a bidding process description, various bidding process information such as bidding process closing information, and any other information or notes associated with a new project. Illustratively, selecting a continue or submit button (not shown) may cause the information entered to be provided to the project supervisor system 102 as described with reference to FIG. 2 above. The project supervisor system 102 may subsequently publish the project information to one or more planroom provider systems 106.

Figure 12:
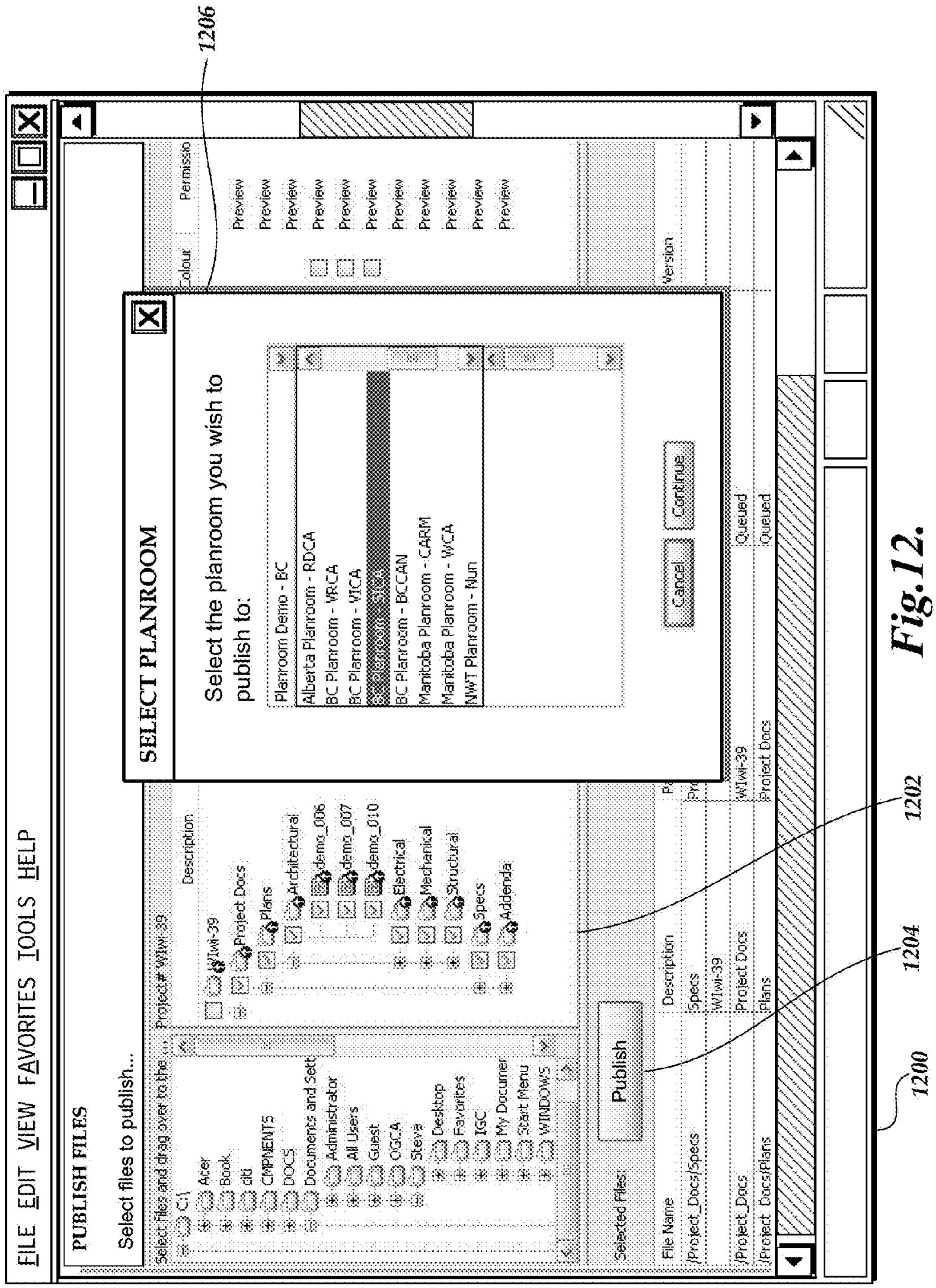
FIG. 12 depicts an illustrative user interface that may be used to select and publish documents associated with a new construction project.

After submitting the new project information, the project supervisor may select one or more files associated with the new project for upload to any number of planroom provider systems 106 as described above with reference to FIG. 2. FIG. 12 depicts an illustrative user interface 1200 that may be used to select and publish documents associated with a new construction project. Illustratively, the user interface 1200 may be a stand alone software module running on a device associated with project supervisor system 102 or the project supervisor. The user interface 1200 may include various panes 1202 or other interface components allowing a project supervisor to view files stored on a local or remote file system. Illustratively, the project supervisor may select one or more files with a check box or other interface option and publish the files by selecting a button 1204 or other command. A command to publish selected files may result in the display of a window 1206 or other interface option providing a list of available planroom provider systems 106 for publishing. Illustratively, selecting a continue option may cause the selected files to be uploaded or otherwise transferred to the selected one or more planroom provider systems 106. In one embodiment, a planroom provider system 106 may keep a file system directory structure specified by the user interface 1200, or may organize files in any other way.

Figure 13:
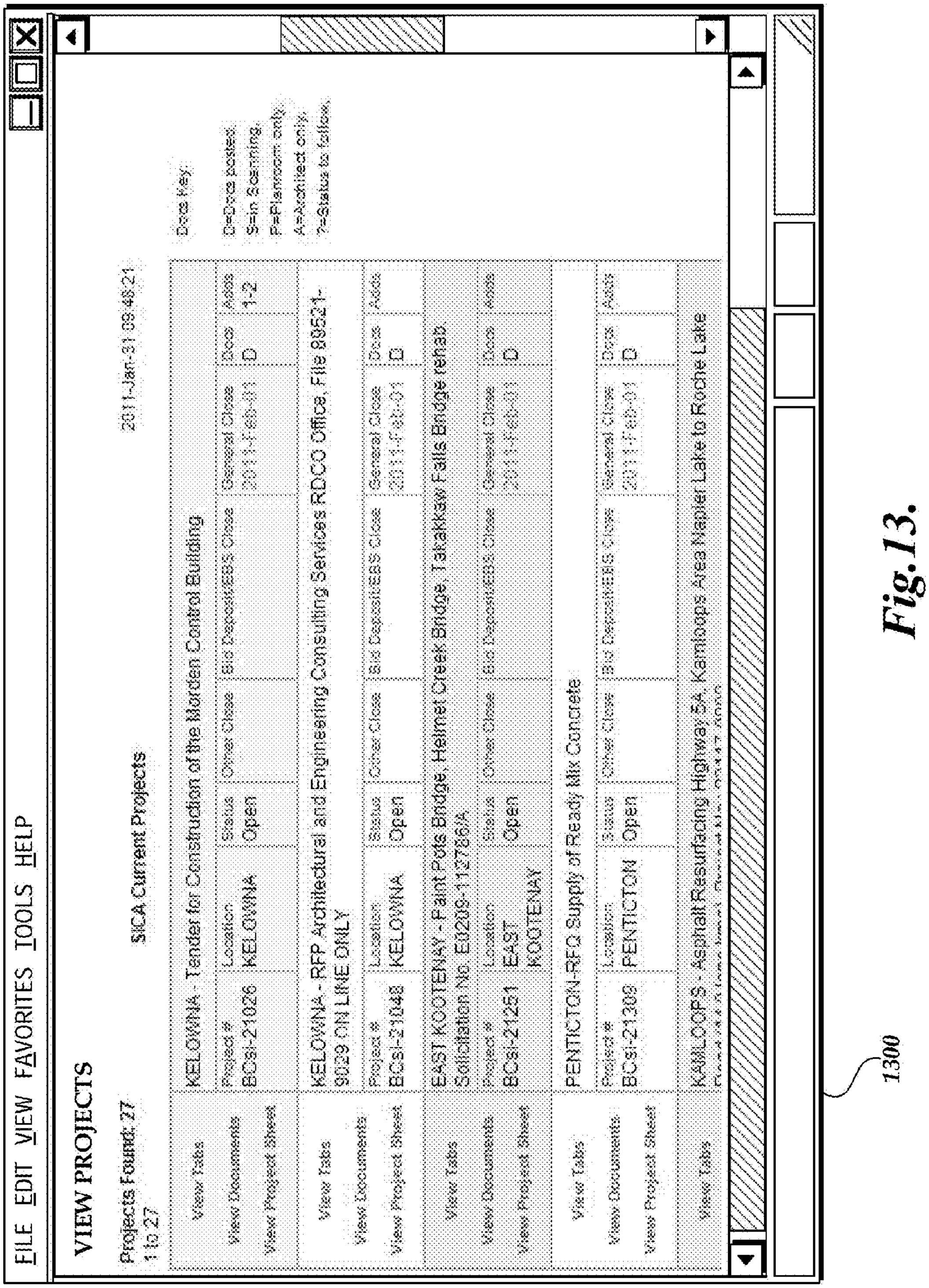
FIG. 13 depicts an illustrative user interface that may be used to view current projects.

Subsequent to the project supervisor publishing project information and/or associated files to a planroom provider system 106, a bidder may access the planroom to browse published projects and files. FIG. 13 depicts an illustrative user interface 1300 that may be used to view current projects. Illustratively, the user interface 1300 may be provided by project supervisor system 102 and/or accessible through a browser running on a device or component associated with a bidder or bidder system 108. Each project listing may list project information, and have associated links or references allowing a potential bidder to access tabs associated with various bidding functions, view documents, or view a sheet or other interface with additional project information.

Figure 14:
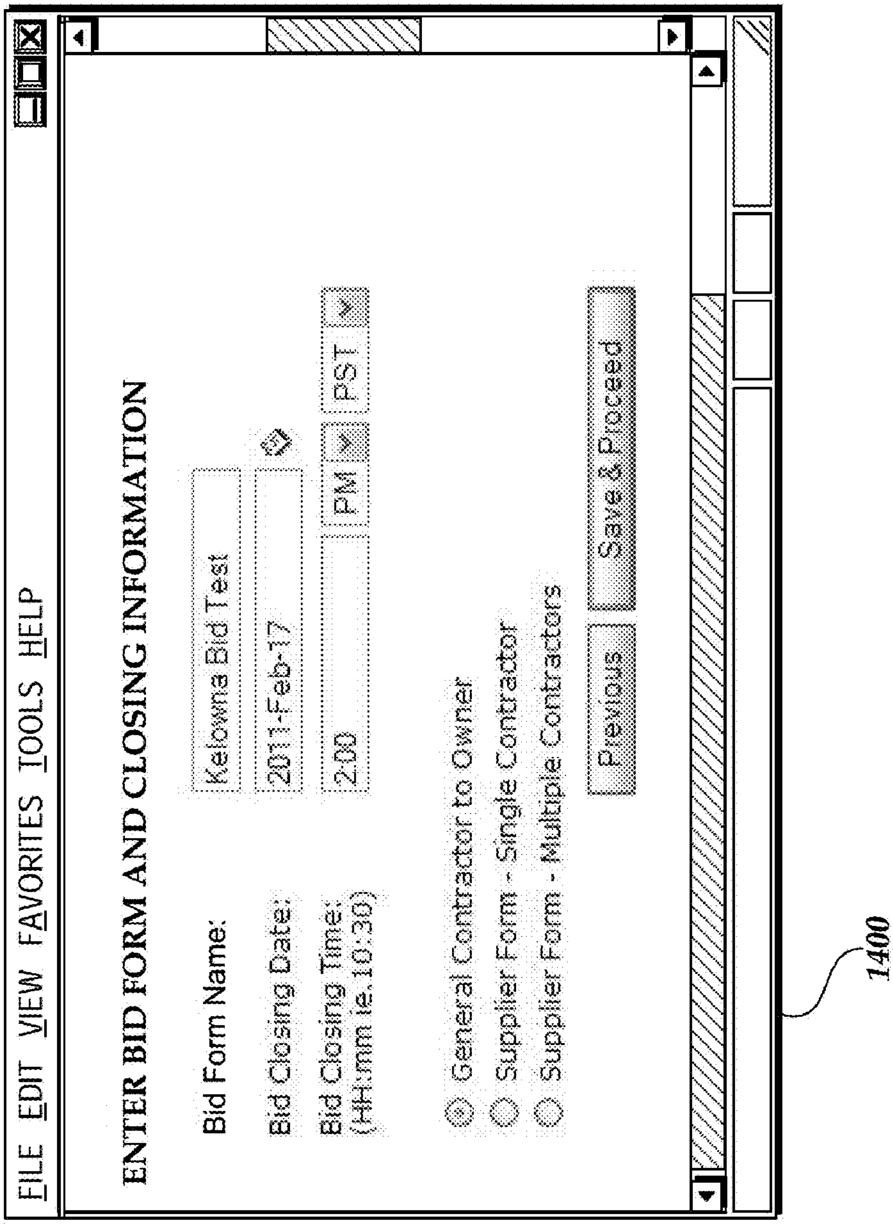
FIG. 14 depicts an illustrative user interface that may be used to enter bid form and closing information.
Figure 15:
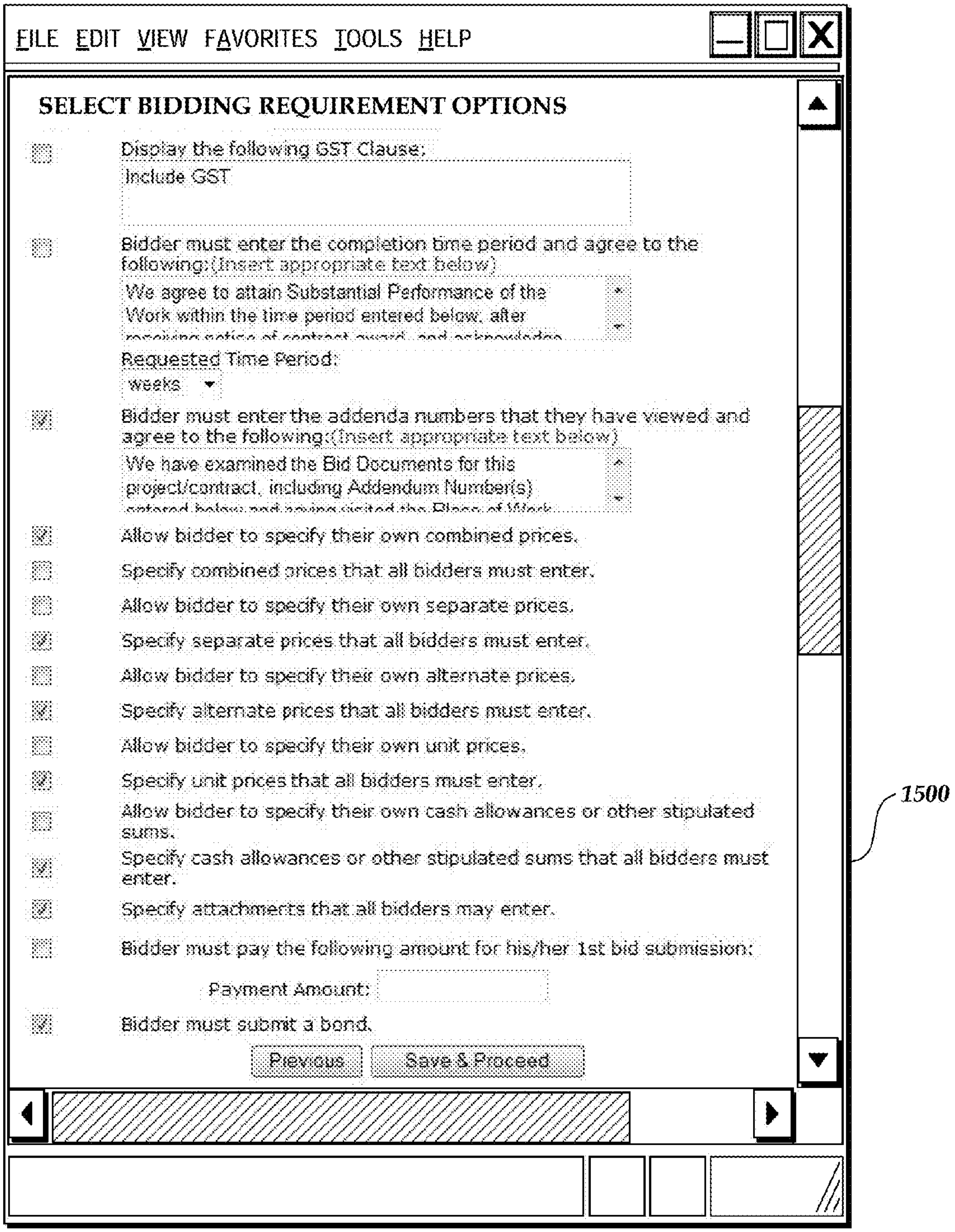
FIG. 15 depicts an illustrative user interface that may be used to enter bid requirement options.
Figure 16:
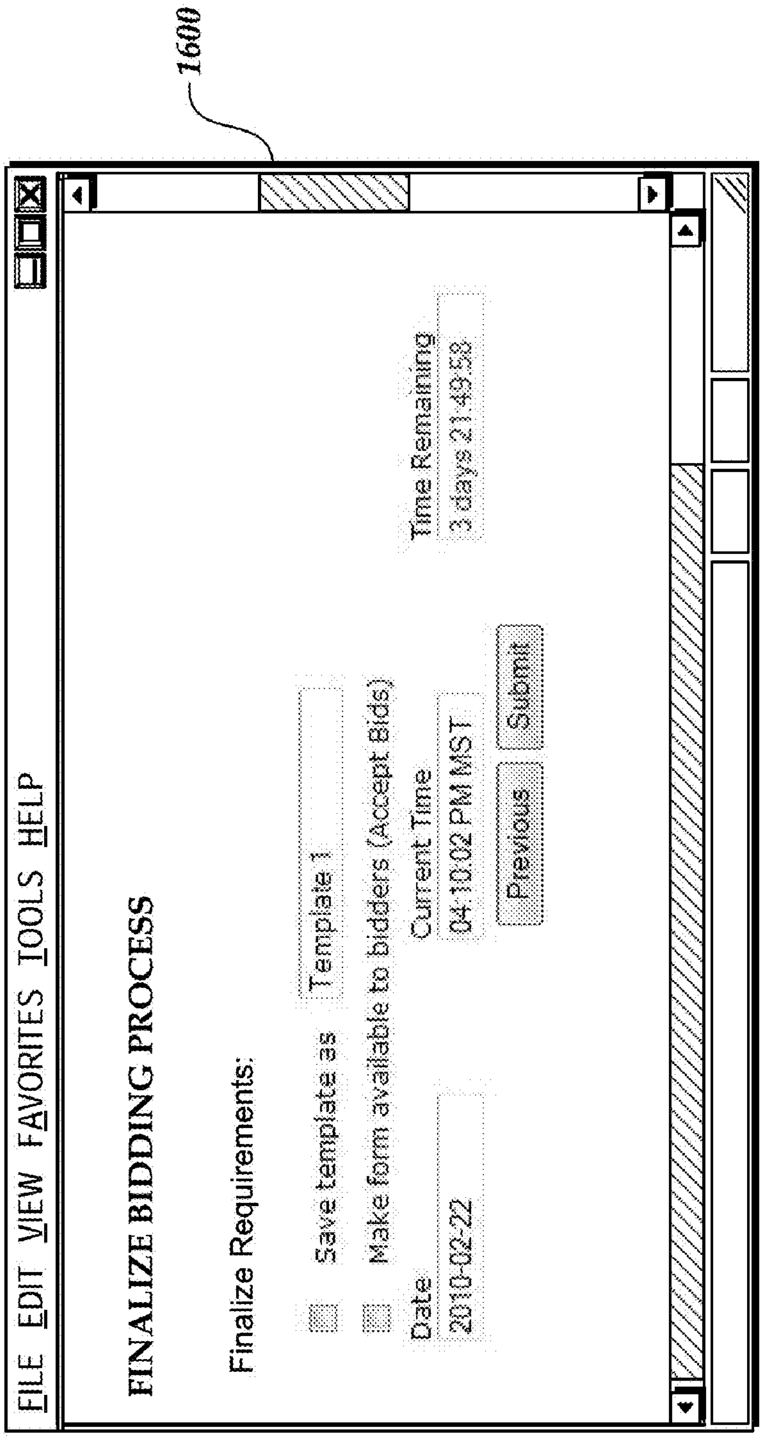
FIG. 16 depicts an illustrative user interface that may be used to finalize bid requirements.

To allow bidding by the potential bidder, a project supervisor may create a bidding process. An illustrative bidding process creation routine is described above with reference to FIG. 7. Illustratively, a project supervisor creating a bidding process may enter bid form information (e.g., a bidding process name, closing requirements, etc.) and any number of bid requirements associated with the bidding process. FIGS. 14-16 depict illustrative user interfaces that may be used in the creation of a new bidding process. FIG. 14 depicts an illustrative user interface 1400 that may be used to enter bid form and closing information. Illustratively, the user interface 1400 may be provided by project supervisor system 102 and/or accessible through a browser running on a device or component associated with the project supervisor. The interface 1400 may include information such as a bid form name, closing information and requirements, and a general functional type of bid process (e.g., highest bid, reverse auction, etc.).

FIG. 15 depicts an illustrative user interface 1500 that may be used to enter bid requirement options. Illustratively, and as described above with reference to FIG. 7, these bid requirement options may be utilized by project supervisor system 102 to guide bidding process creation and/or help determine which bid requirements will be associated with the bidding process. In one embodiment, any number of additional user interfaces may be displayed based on the selection of bid requirement options provided through user interface 1500. These user interfaces may allow a user to set bidding requirements and configure various aspects of the bidding process as described with reference to FIG. 7 above. FIG. 16 depicts an illustrative user interface 1600 that may be used to finalize a bidding process and make the finished bidding process available to potential bidders. Illustratively, a project supervisor may select whether the bidding process is to be saved as a template for future use and/or immediately opened to bidders. The user interface 1600 may additionally allows a project supervisor to preview the close time or other close requirements before opening the bidding process up to bidding.

Figure 17:
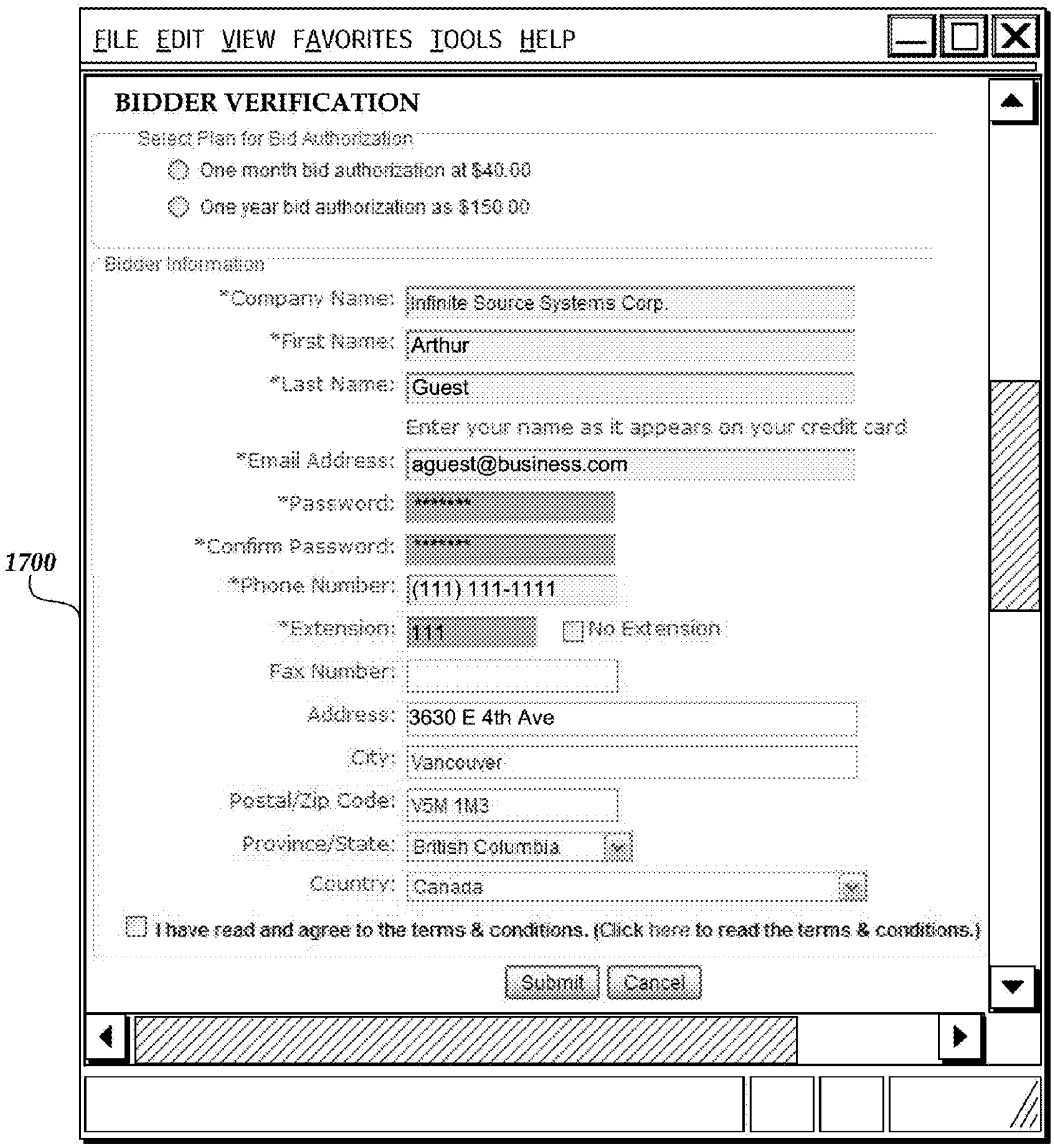
FIG. 17 depicts an illustrative user interface that may be used to enter bidder information for bidder verification.
Figure 18:
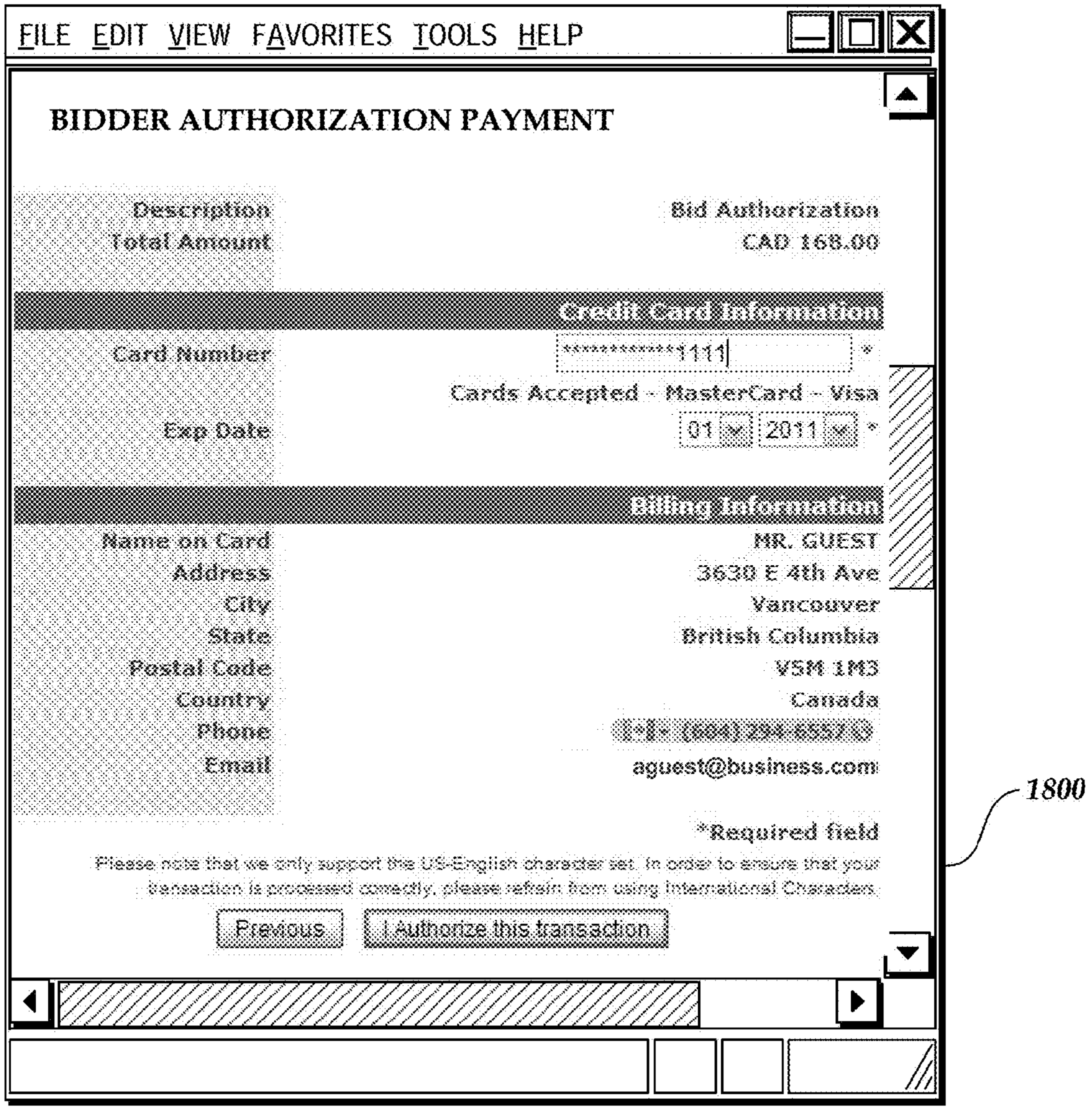
FIG. 18 depicts an illustrative user interface that may be used to enter bidder authorization payment information.
Figure 19:
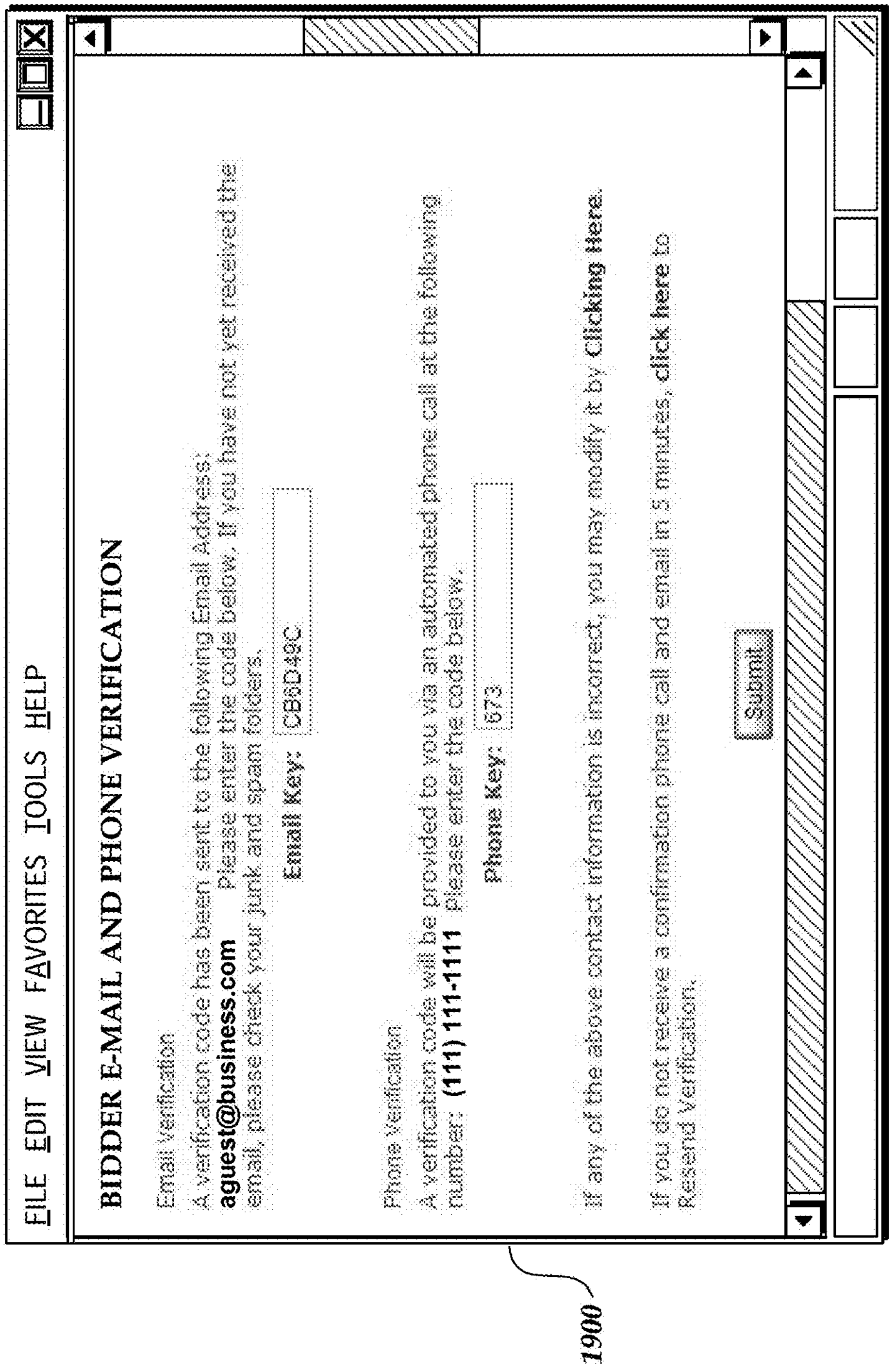
FIG. 19 depicts an illustrative user interface that may be used to enter verification codes for bidder verification.

Subsequent to the bidding process being opened up to bidding, a bidder may connect to project supervisor system 102 through bidder system 108 or other device and bid on the project. Illustratively, accessing project supervisor system 102 to bid may result in one or more interface options being presented to the potential bidder. For, example, a user interface may have an interface tab that allows bidder information verification, an interface tab to access bond issuance and creation functionality, an interface tab to access the bidding process and enter a bid, and/or any number of other bidding tools or functionalities. In one embodiment, all functionality may be accessed at any time. In another embodiment, a bidder must enter and verify bidder information, seek issuance of a bid bond, or any other activity in a specific order. FIGS. 17-19 depict illustrative user interfaces that may be used in the entry and verification of bidder information. FIG. 17 depicts an illustrative user interface 1700 that may be used to enter bidder information for bidder verification. Illustratively, the user interface 1700 may be provided by project supervisor system 102 and/or accessible through a browser running on a device or component associated with a bidder or bidder system 108. Illustratively, user interface 1700 may include various sorts of bidder information as described above with reference to FIGS. 3 and 9. User interface 1700 may further allow a potential bidder to enter account information, and may require the payment of one or more fees. Illustratively, these fees may be account fees or bidding fees, or may be refundable payments for the purpose of verification as described above with reference to FIG. 9. FIG. 18 depicts an illustrative user interface 1800 that may be used to enter bidder authorization payment information.

After providing payment information for verification, a bidder may be required to verify an electronic mail address and/or a telephone number as described above with reference to FIG. 9. Illustratively, a bidder may receive codes or other verification information at an electronic message mailbox and/or telephone number. FIG. 19 depicts an illustrative user interface 1900 that may be used to enter verification codes for bidder verification.

Figure 20:
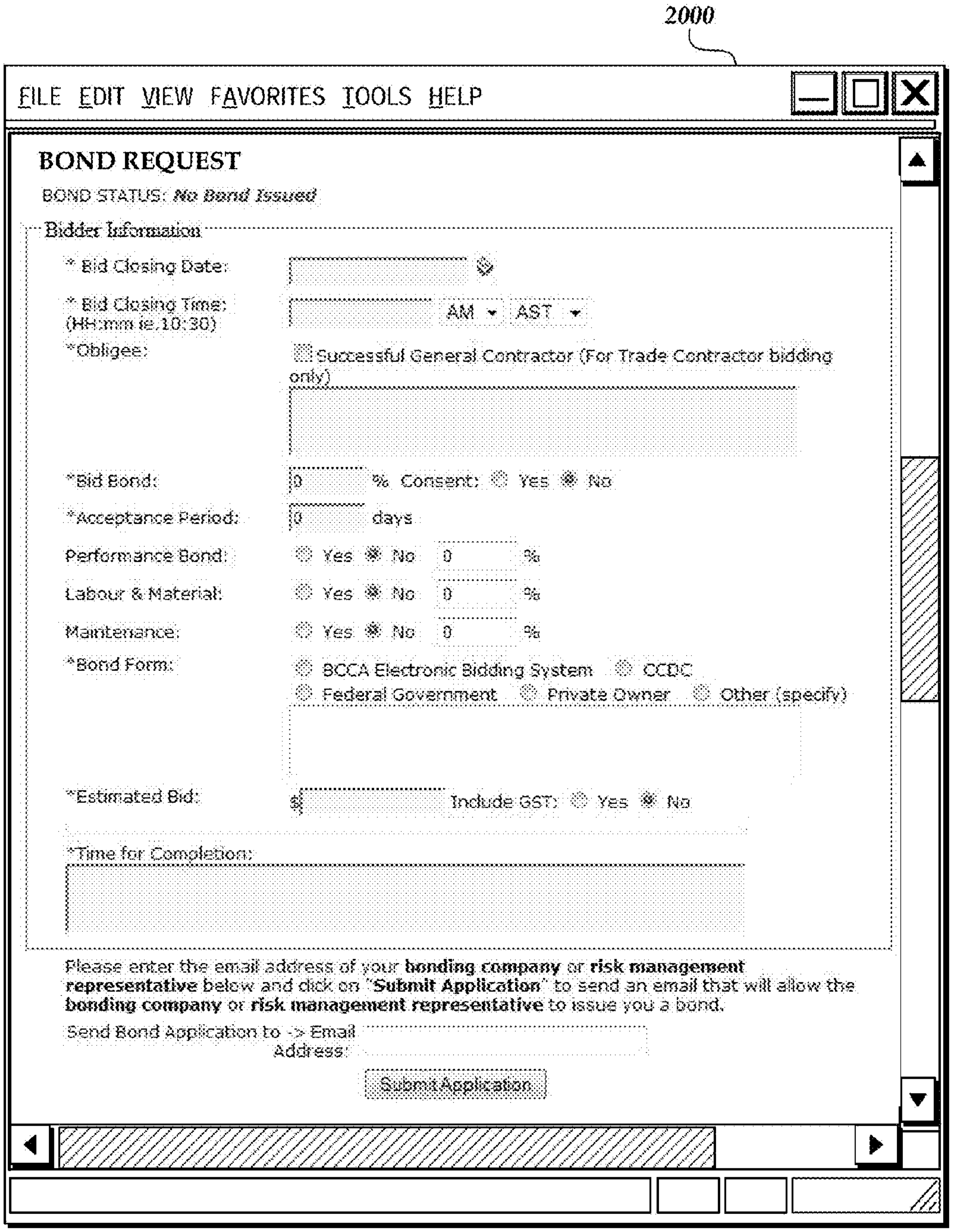
FIG. 20 depicts an illustrative user interface that may be used to enter bond request information for bid bond issuance.
Figure 21:
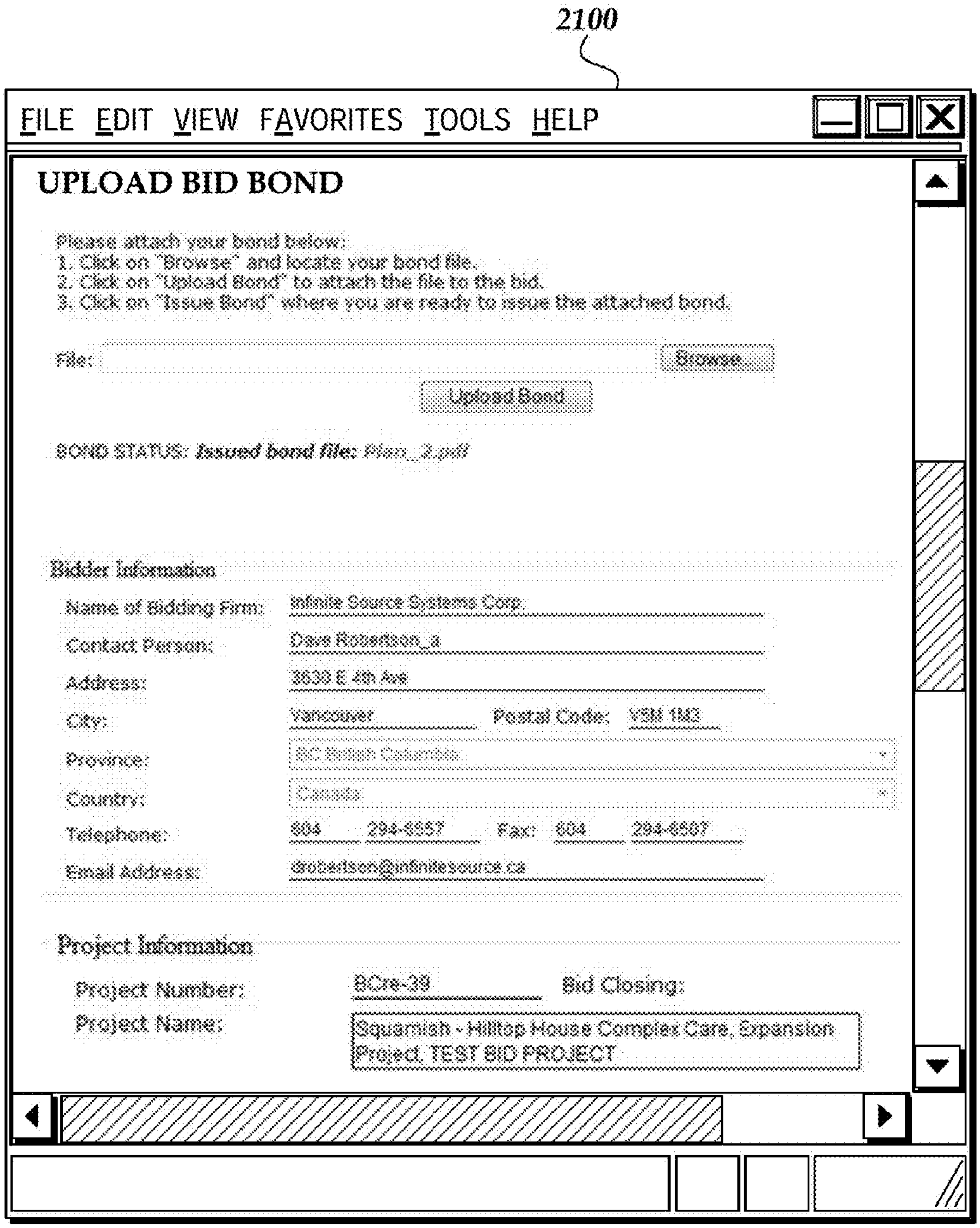
FIG. 21 depicts an illustrative user interface that may be used to upload an issued bid bond.

Subsequent to bidder information being verified, a bidder may bid on the project. Illustratively, as described above with reference to FIGS. 4 and 10, a bidding process may require a bid bond in addition to any other bid requirements defined by the project supervisor. FIGS. 20 and 21 depict illustrative user interfaces that may be used in bid bond issuance and creation. FIG. 20 depicts an illustrative user interface 2000 that may be used to enter bond request information for bid bond issuance. Illustratively, the user interface 2000 may be provided by project supervisor system 102 and/or accessible through a browser running on a device or component associated with a bidder or bidder system 108. In one embodiment, when submitted, a bond request notification and/or bond request information may be sent from the project supervisor system 102 to a bonding agent system 104. After receiving a bond request notification, a bonding agent may obtain various aspects of the bond request information and upload or otherwise provide an electronic copy of an issued bond to the project supervisor system 102. FIG. 21 depicts an illustrative user interface 2100 that may be used to view bond request information and upload an issued bid bond. Illustratively, the user interface 2100 may be provided by project supervisor system 102 and/or accessible through a browser running on a device or component associated with a bonding agent or bonding agent system 104.

Figure 22:
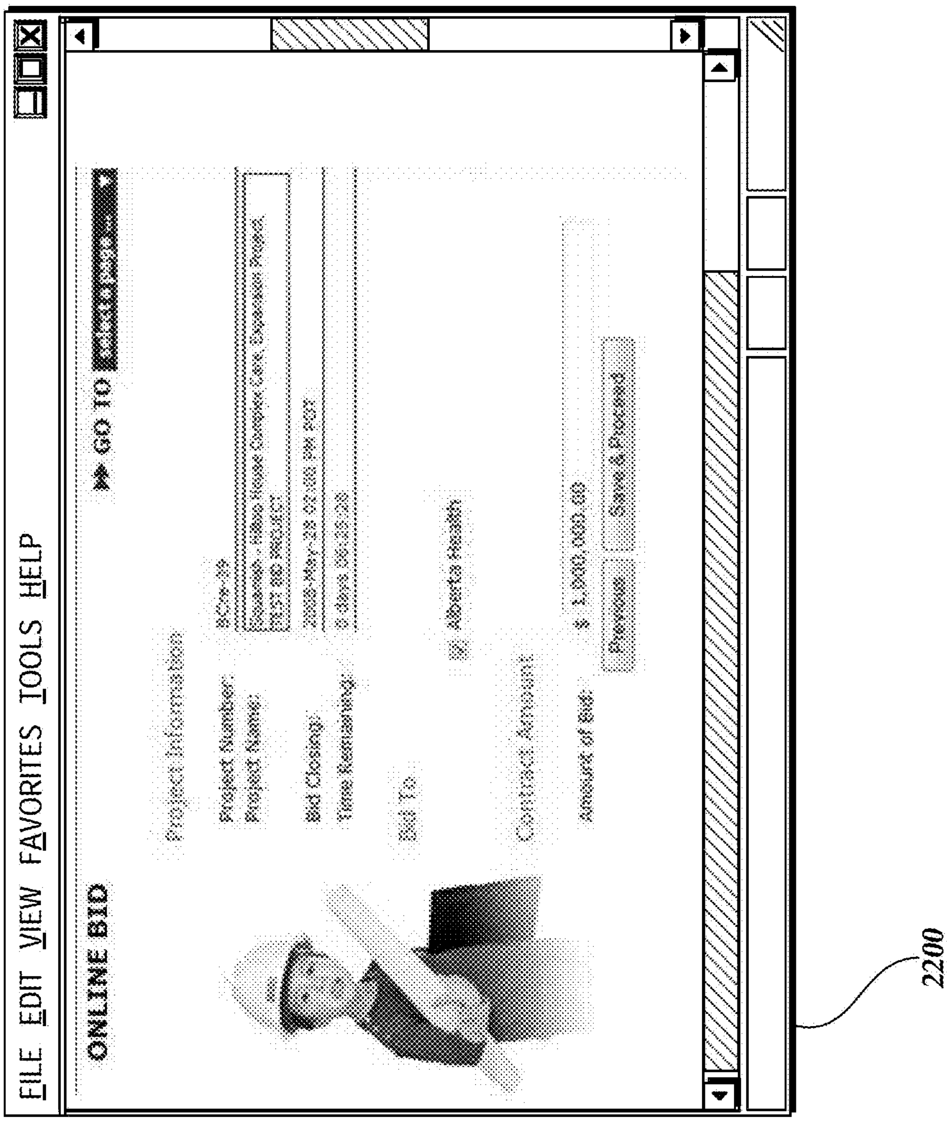
FIG. 22 depicts an illustrative user interface that may be used to enter base bid information.
Figure 23:
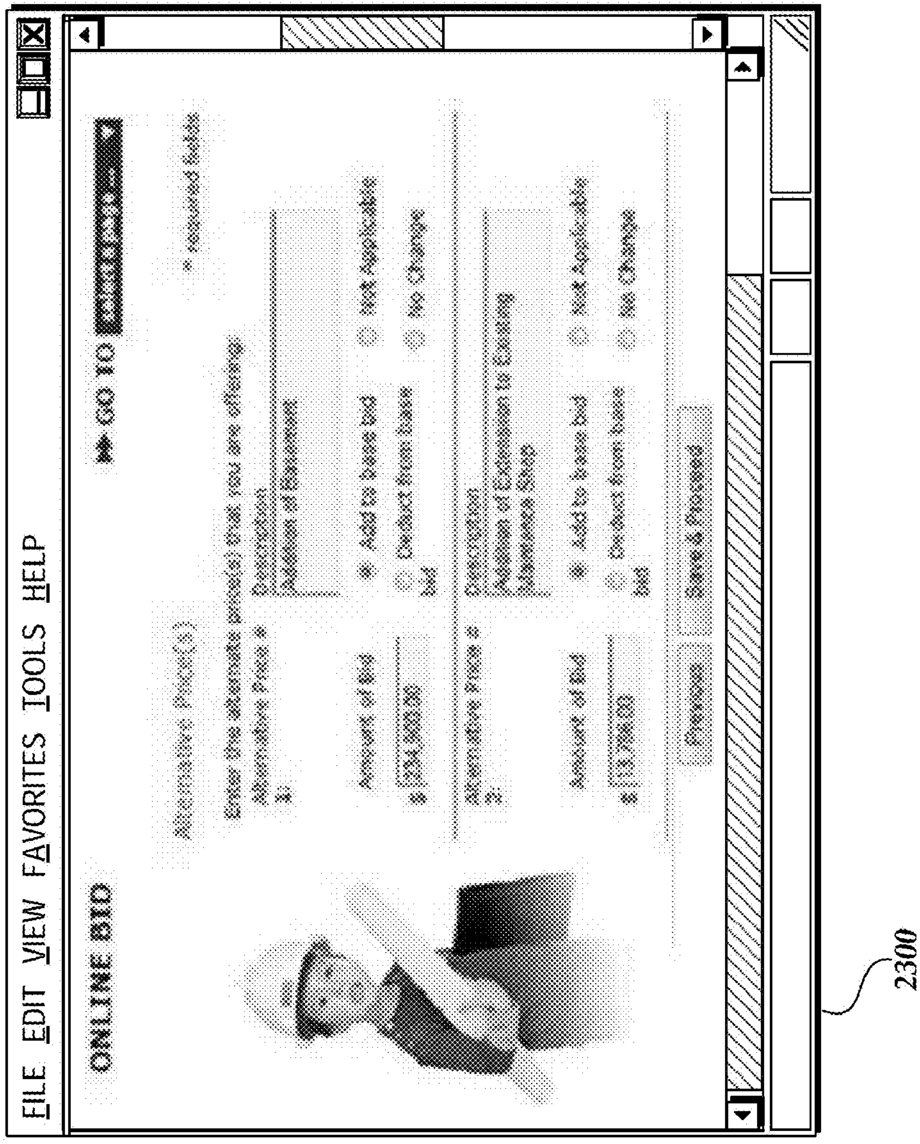
FIG. 23 depicts an illustrative user interface that may be used to enter special price information.
Figure 24:
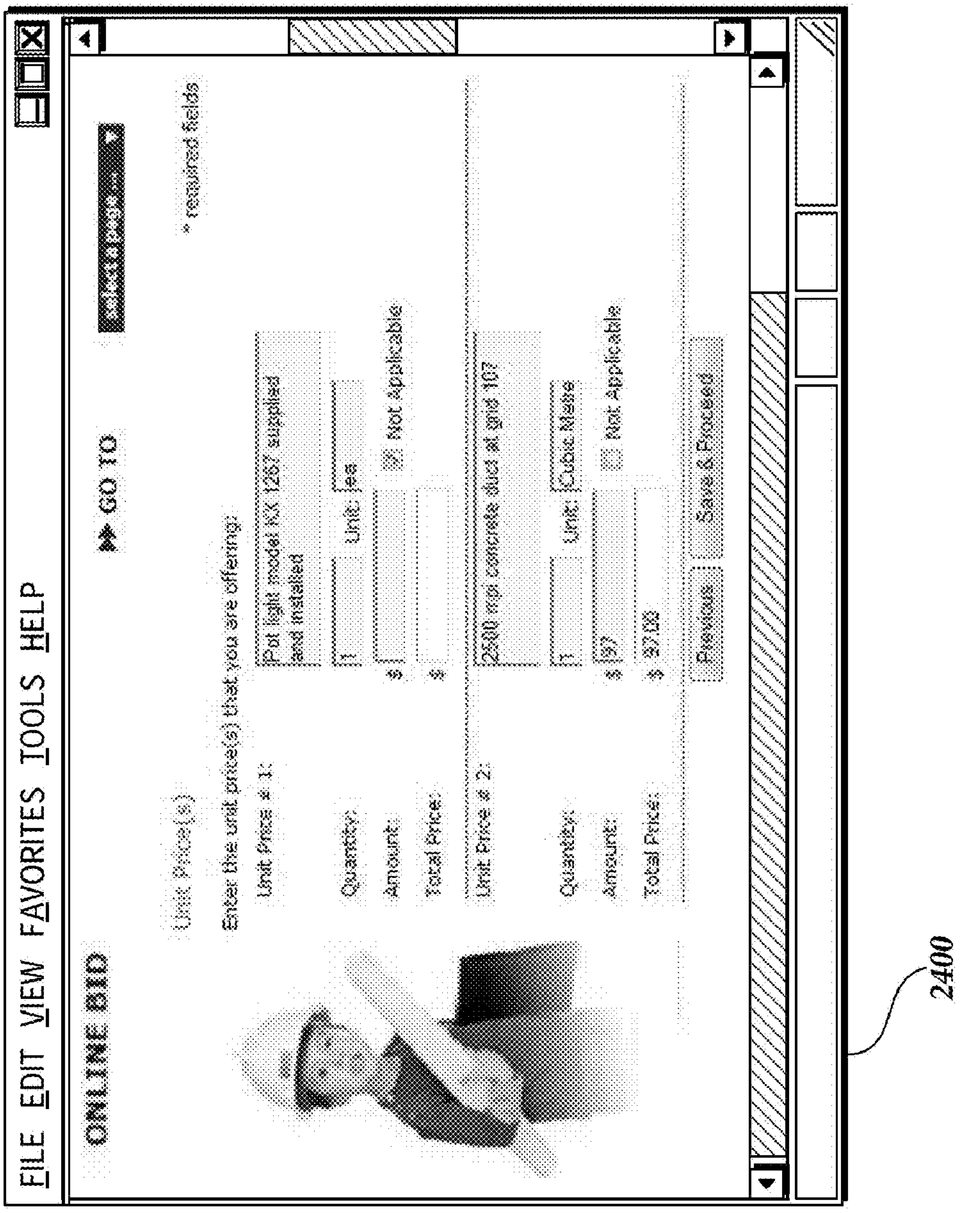
FIG. 24 depicts an illustrative user interface that may be used to enter unit price information.
Figure 25:
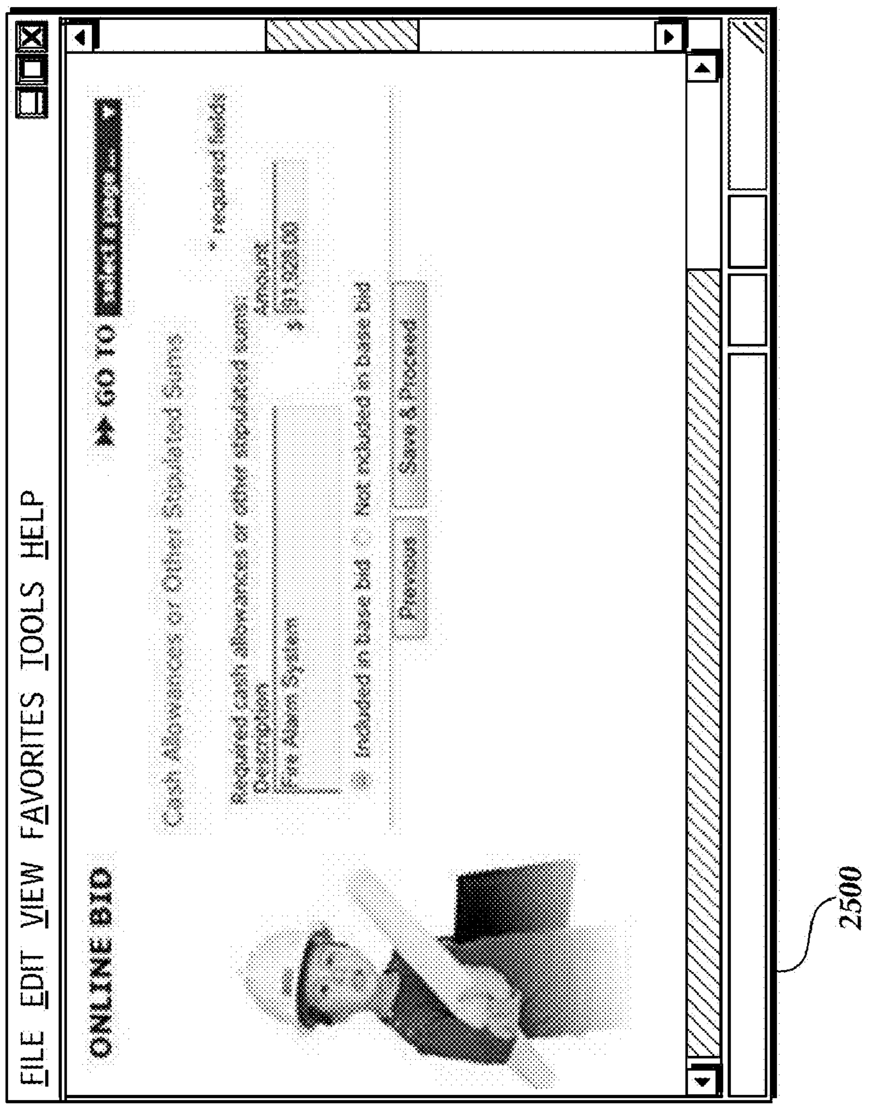
FIG. 25 depicts an illustrative user interface that may be used to enter stipulated sum information.
Figure 26:
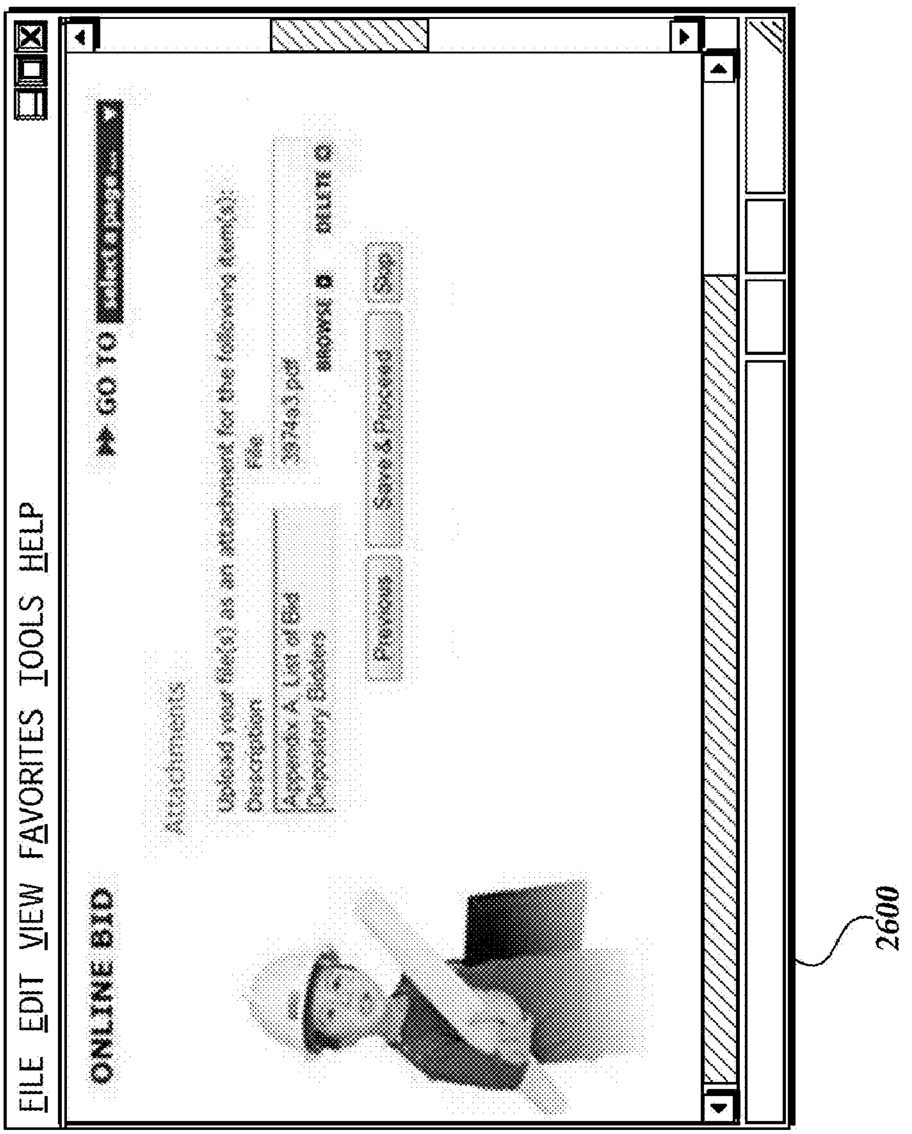
FIG. 26 depicts an illustrative user interface that may be used to upload additional bid documents.

FIGS. 22-29 depict illustrative user interfaces that may be used to enter bid information for a bidding process as described in FIGS. 3 and 8 above. Illustratively, the user interfaces described with reference to FIGS. 22-29 may be provided by project supervisor system 102 and/or accessible through a browser running on a device or component associated with a bidder or bidder system 108. In one embodiment, a bidder may initially enter base bid information corresponding to a base contract amount. FIG. 22 depicts an illustrative user interface 2200 that may be used to enter base bid information. A bidder may subsequently enter more detailed bidding information in any of a number of aspects or categories as described in FIGS. 3 and 8. FIG. 23 depicts an illustrative user interface 2300 that may be used to enter special price information. FIG. 24 depicts an illustrative user interface 2400 that may be used to enter unit price information. FIG. 25 depicts an illustrative user interface 2500 that may be used to enter stipulated sum information. FIG. 26 depicts an illustrative user interface 2600 that may be used to upload additional bid documents.

Figure 27:
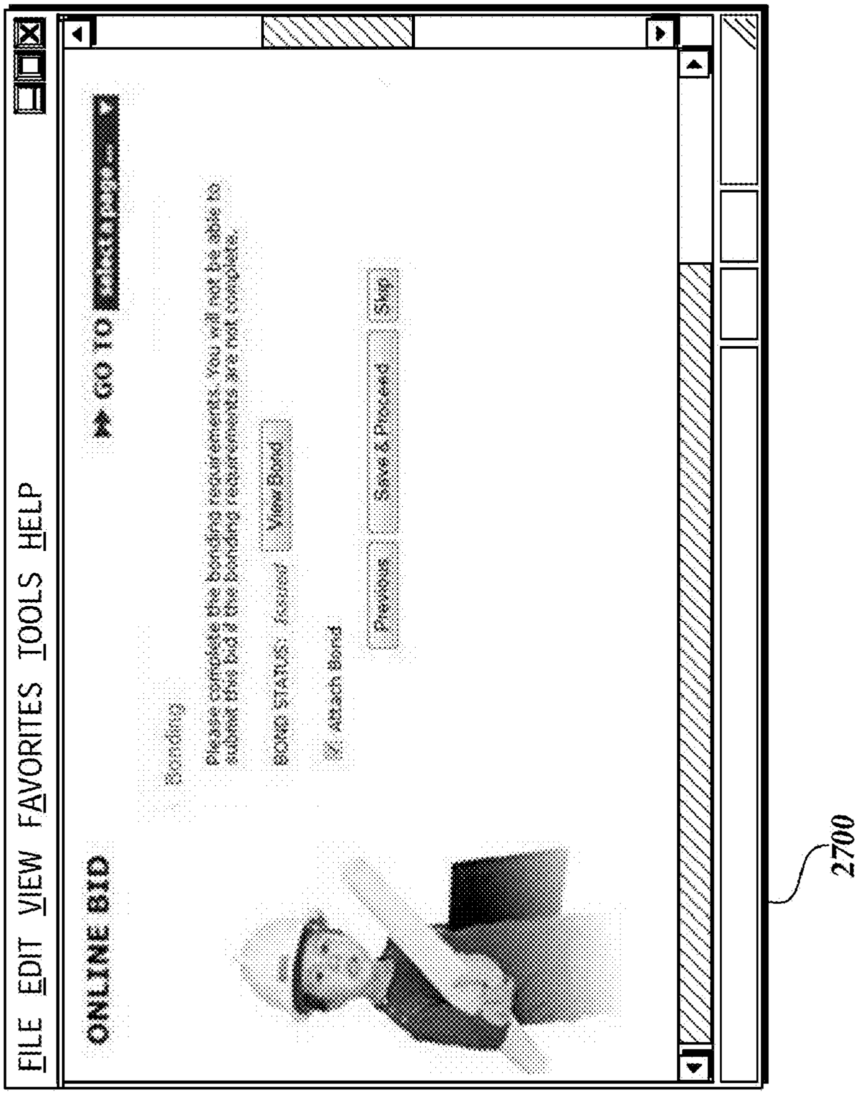
FIG. 27 depicts an illustrative user interface that may be used to associate bond information with a bid.

FIG. 27 depicts an illustrative user interface 2700 that may be used to associate bond information with a bid. Illustratively, an issued bond may be uploaded or otherwise provided to the project supervisor system 102 by a bonding agent as described above with reference to FIGS. 4 and 10. The issued bond may be associated with the bidder at the project supervisor system and attached to a bid through an illustrative user interface 2700. In one embodiment, a bidder may also be able to view the bond through a separate interface or by downloading an electronic copy. Illustratively, managing the issued bond through the project supervisor system 102 allows the project supervisor system 102 to ensure that the bond has been issued directly by the bonding agent, and has not been tampered with by a bidder or other party. In another embodiment, a bidder may alternatively be able to upload or otherwise provide a bid bond without a requirement that the bonding agent issue the bond directly to project supervisor system 102.

Figure 28:
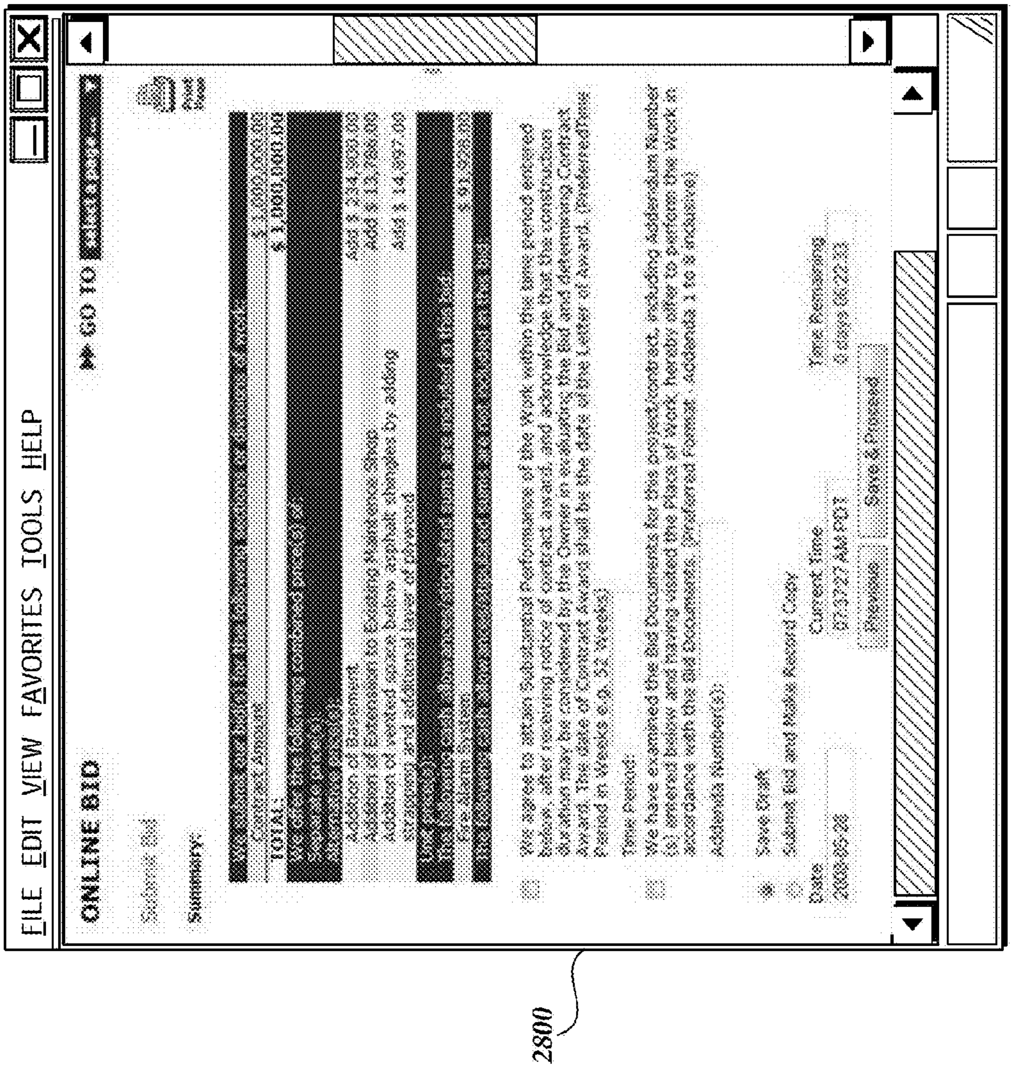
FIG. 28 depicts an illustrative user interface that may be used to submit a completed bid.

Subsequent to providing all bidding information and meeting all bid requirements associated with the bidding process, a bidder may confirm and submit the completed bid. FIG. 28 depicts an illustrative user interface 2800 that may be used to submit a completed bid. Illustratively, user interface 2800 may display any information or a summary of any information provided as part of the bidding process. Additionally, user interface 2800 may include any legal text such as contractual conditions or other addenda that a bidder may be required to read and/or agree to as a condition of entering a bid. Illustratively, a bidder may have the option to save a draft of the bid for later submission, submit the bid, and/or forward an unsubmitted bid to another user (e.g., a supervisor) for submission. In one embodiment, if all required information has not been included by a bidder as part of the bidding process the one or more interface options may be unavailable.

It will be appreciated by those skilled in the art and others that all of the functions described in this disclosure may be embodied in software executed by one or more processors of the disclosed components and mobile communication devices. The software may be persistently stored in any type of non-volatile storage. It will further be appreciated that, although aspects of the above disclosure deal with construction project bidding, the processes and functionality described herein may apply to bidding between contractors and subcontractors, suppliers, or trades, and bidding and/or project management in any number of different areas of commerce in addition to construction.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Computer-implemented systems and methods are disclosed which facilitate construction project bidding, document distribution, and project management over a computer network. The project supervisor system 100 may be implemented as a computer system that comprises one or more physical computers or computing devices, which may be programmed with executable code. Some of the functionally of the system 100 may alternatively be implemented in application-specific hardware. In some cases, the functionality of the system 100 may be distributed across multiple computing devices or nodes, including nodes that are distributed geographically. In one embodiment, one or more physical computing devices or components may be connected directly or through the network 138 through a physical medium such as wiring or cabling (e.g., Ethernet or coaxial cable, telephone line, serial cable, USB, etc.) or may be linked directly or through the network 138 by means of a wireless connection (e.g., Wi-Fi, WiMAX, Bluetooth, cellular network, etc.). In various embodiments, each logical system 102, 110, 114, and 118 may correspond to one or more hardware components or executable software processes running on any number of computing devices connected locally or over a network. For example, any component or functionality described herein may be implemented in software and/or configured to run on or be implemented by any type of hardware device, which may include one or more physical processors, volatile and/or nonvolatile memories, storage devices, input/output components, computer readable media drives, and/or any other hardware component. In various embodiments, information or data provided to or from any component, module, device, or system may be transmitted in any unsecured format, or in a secure form using any technology know in the art, including, but not limited to, secure shell protocol (SSH), secure file transfer protocol (SFTP), secure sockets layer (SSL), transport layer security (TLS), HyperText Transmission Protocol, Secure (HTTPS), secure transfer protocol (STP), or any other secure communications protocol, encryption scheme, or transfer protocol known in the art. In various embodiments, information or data provided to or from any component, module, device, or system may be verified, encrypted, or authenticated using any form of digital authentication, including SSL, digital signatures, digital certificates, electronic seals, or any other verification, encryption, or authentication protocol, technology, or scheme as known in the art.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternative implementations are included within the scope of the embodiments described herein in which elements or functions may be omitted, executed out of order from that shown or discussed, including substantially concurrently or in reverse order, depending on the functionality involved, as would be understood by those skilled in the art. It will further be appreciated that the data and/or components described above may be stored on one or more computer-readable media. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method implemented by a project supervisor system to verify a potential construction project bidder, the method comprising:

obtaining, by the project supervisor system, a request to bid on a construction project from a bidder system associated with the potential construction project bidder;

obtaining bidder information corresponding to the potential construction project bidder from the bidder system, the bidder information including at least payment information, an electronic mail address and a telephone number, wherein the payment information includes at least financial account information and identifying information sufficient to process a payment from the potential construction project bidder;

verifying one or more aspects of the payment information, wherein verifying one or more aspects of the payment information comprises causing the processing of a payment based on the payment information;

providing a first verification code by electronic message to the electronic mail address, wherein the first verification code comprises an alphanumeric code;

obtaining the first verification code submitted by the potential construction project bidder;

communicating a second verification code to the potential construction project bidder via a telephone call placed to the telephone number;

obtaining the second verification code submitted by the potential bidder; and responsive to the verification of one or more aspects of the payment information and the obtaining of the first and second verification codes, providing bidding process information associated with the construction project to the bidder system, the bidding process information specifying one or more requirements for a valid bid on the construction project;

obtaining bidding information from the bidder system, wherein the bidding information comprises a bid on the construction project, and wherein the bidding information is based on the bidding process information provided to the bidder system;

obtaining bond application information from a bidder system, wherein the bond application information includes at least one of information associated with the potential construction project bidder and construction project information, and wherein the bond application information further includes an electronic mail address of a bonding agent;

providing a bond request notification to the electronic mail address of the bonding agent, wherein the bond request notification comprises a reference to the project supervisor system;

providing the bond application information to a bonding agent system associated with the bonding agent, wherein the bond application information is provided responsive to the bonding agent system following the reference to the project supervisor system;

obtaining bond information from the bonding agent system, the bond information comprising information identifying a bid bond associated with a prospective bid by the potential construction project bidder on the construction project; and associating the bond information with the potential construction project bidder.

2. The method of claim 1 further comprising causing the payment to be refunded to the potential construction project bidder subsequent to the verification of one or more aspects of the payment information.

3. The method of claim 1 further comprising:

obtaining new account information from the bidder system;

creating a bidder account based on the new account information; and associating at least one of the electronic mail address, the telephone number, and the one or more aspects of payment information with the bidder account.

4. The method of claim 3 further comprising:

obtaining a second request to bid on a second construction project from a bidder system;

obtaining login information from the bidder system;

determining that the login information corresponds to the bidder account; and responsive to the determination that the login information corresponds to the bidder account, providing second bidding process information associated with the second construction project to the bidder system.

5. The method of claim 1 further comprising causing one or more aspects of the bidder information corresponding to the potential construction project bidder to be provided to a third-party authenticator.

6. A system for managing bidding on a construction project, the system comprising:

one or more computer processors;

at least one computer memory accessible by at least one of the one or more computer processors;

a bidding manager implemented by at least one of the one or more computer processors, the bidding manager operable to obtain a bid request from a bidder system associated with a potential construction project bidder and, at least partially in response to verification of the construction project bidder, provide bidding process information to the bidder system, wherein the bidding process information comprises one or more requirements for a valid bid on the construction project; and a verification manager implemented by at least one of the one or more computer processors, the verification manager operable to verify the potential construction project bidder, wherein verifying the potential construction project bidder comprises verifying bidder information associated with the potential construction project bidder, the bidder information including at least one of an electronic mail address and a telephone number, wherein verifying the electronic mail address comprises obtaining a first verification code submitted by the potential construction project bidder, the first verification code having been provided to the electronic mail address, wherein verifying the telephone number comprises obtaining a second verification code submitted by the potential construction project bidder, the second verification code having been communicated to the bidder via a telephone call placed to the telephone number, wherein verifying the potential construction project bidder includes obtaining bond information associated with the potential construction project bidder, and wherein the bond information comprises information identifying a bid bond associated with a prospective bid on the construction project by the potential construction project bidder; and the verification manager further operable to:

obtain bond application information from a bidder system, wherein the bond application information includes at least one of information associated with the potential construction project bidder and construction project information, and wherein the bond application information further includes contact information of a bonding agent;

provide the bond application information to a bonding agent system associated with the bonding agent based on the contact information;

obtain bond information from the bonding agent system, the bond information comprising information identifying a bid bond associated with a prospective bid by the potential construction project bidder on the construction project; and associate the bond information with the potential construction project bidder.

7. The system of claim 6, wherein the bidder information further includes payment information.

8. The system of claim 7, wherein verifying the payment information further comprises causing the processing of a payment based on the payment information.

9. The system of claim 8, wherein the verification manager is further operable to cause the payment to be refunded to the potential construction project bidder subsequent to the verification of the payment information.

10. The system of claim 8, wherein the payment comprises a fee for bidding on the construction project.

11. The system of claim 8, wherein verifying bidder information associated with the potential construction project bidder comprises verifying each of the electronic mail address, the telephone number, and the payment information associated with the potential construction project bidder.

12. The system of claim 8, wherein the verification manager is further operable to:

obtain new account information from the bidder system;

create a bidder account based on the new account information; and associate at least one of the electronic mail address, the telephone number, and the payment information with the bidder account.

13. The system of claim 12, wherein the bidding manager is further operable to:

obtain a second request to bid on a second construction project from a bidder system;

obtain login information from the bidder system;

determine that the login information corresponds to the bidder account.

14. The system of claim 12, wherein verifying each of the electronic mail address, the telephone number, and the payment information associated with the potential construction project bidder includes obtaining at least one of the electronic mail address, the telephone number, and the payment information associated with the bidder account.

15. The system of claim 6, wherein the verification manager is further operable to cause one or more aspects of the bidder information to be provided to a third-party authenticator.

16. The system of claim 6, wherein the verification manager is further operable to:

provide a bond request notification to the bonding agent based on the contact information, wherein the bond request notification comprises a reference to a project supervisor system; and provide the bond application information to a bonding agent system associated with the bonding agent responsive to the bonding agent system following the reference to the project supervisor system.

17. A computer-implemented method for managing bidding on a construction project, the method comprising:

obtaining, by a project supervisor system, bidder information from a bidder system associated with a potential bidder on the construction project, the bidder information including at least an electronic mail address and a telephone number;

verifying the electronic mail address, wherein verifying the electronic mail address comprises obtaining a first verification code from the bidder system, the first verification code having been provided to the electronic mail address by electronic message;

verifying the telephone number, wherein verifying the telephone number comprises obtaining a second verification code from the bidder system, the second verification code having been transmitted as an audio message to a device associated with the telephone number;

at least partially in response to verifying at least one of the electronic mail address and the telephone number, providing bidding process information to the bidder system, the bidding process information comprising one or more requirements for a valid bid on the construction project;

obtaining bond application information from the bidder system, wherein the bond application information includes at least one of information associated with the potential construction project bidder and construction project information, and wherein the bond application information further includes contact information of a bonding agent;

providing the bond application information to a bonding agent system associated with the bonding agent based on the contact information;

obtaining bond information from the bonding agent system, the bond information comprising information identifying a bid bond associated with a prospective bid by the potential construction project bidder on the construction project; and associating the bond information with the potential construction project bidder.

18. The computer-implemented method of claim 17, wherein the bidder information includes at least payment information.

19. The computer-implemented method of claim 18 further comprising verifying one or more aspects of the payment information, wherein verifying one or more aspects of the payment information comprises causing the processing of a payment based on the payment information.

20. The computer-implemented method of claim 19 further comprising causing the payment to be refunded to the potential construction project bidder subsequent to the verification of the payment information.

21. The computer-implemented method of claim 19, wherein the payment comprises a fee for bidding on the construction project.

22. The computer-implemented method of claim 19 further comprising:

obtaining a second request to bid on a second construction project from a bidder system;

responsive to obtaining a second request to bid on a second construction project from a bidder system, verifying at least one piece of bidder information in addition to payment information, an electronic mail address, and a telephone number.

23. The computer-implemented method of claim 19 further comprising:

obtaining new account information from the bidder system;

creating a bidder account based on the new account information; and associating at least one of the electronic mail address, the telephone number, and the payment information with the bidder account.

24. The computer-implemented method of claim 23 further comprising:

obtaining a third request to bid on a third construction project from a bidder system;

obtaining login information from the bidder system;

determining that the login information corresponds to the bidder account.

25. The computer-implemented method of claim 23, wherein verifying each of the electronic mail address, the telephone number, and the payment information associated with the potential construction project bidder includes obtaining at least one of the electronic mail address, the telephone number, and the payment information associated with the bidder account.

26. The computer-implemented method of claim 17 further comprising causing one or more aspects of the bidder information to be provided to a third-party authenticator.

27. The computer-implemented method of claim 17, wherein providing the bond application information to a bonding agent system associated with the bonding agent based on the contact information comprises:

providing a bond request notification to the bonding agent based on the contact information, wherein the bond request notification comprises a reference to the project supervisor system; and providing the bond application information to a bonding agent system associated with the bonding agent responsive to the bonding agent system following the reference to the project supervisor system.

* * * * *